(12) United States Patent
Washio et al.

(10) Patent No.: US 9,099,088 B2
(45) Date of Patent: Aug. 4, 2015

(54) UTTERANCE STATE DETECTION DEVICE AND UTTERANCE STATE DETECTION METHOD

(75) Inventors: Nobuyuki Washio, Kawasaki (JP); Shouji Harada, Kawasaki (JP); Akira Kamano, Kawasaki (JP); Naoshi Matsuo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 903 days.

(21) Appl. No.: 13/064,871

(22) Filed: Apr. 21, 2011

(65) Prior Publication Data

US 2011/0282666 A1    Nov. 17, 2011

(30) Foreign Application Priority Data

Apr. 22, 2010 (JP) ................................ 2010-098936
Mar. 31, 2011 (JP) ................................ 2011-081133

(51) Int. Cl.
    G10L 15/00     (2013.01)
    G10L 17/26     (2013.01)
    G10L 25/48     (2013.01)
    G10L 21/00     (2013.01)
    G10L 13/00     (2006.01)
    G08B 23/00     (2006.01)

(52) U.S. Cl.
    CPC .............. *G10L 17/26* (2013.01); *G10L 25/48* (2013.01)

(58) Field of Classification Search
    USPC ......... 704/254, 246, 209, 266, 500, 226, 256, 704/273, 250, 233, 235, 275; 600/301; 340/573.1
    See application file for complete search history.

(56) References Cited

U.S. PATENT DOCUMENTS

| | | | | | |
|---|---|---|---|---|---|
| 5,826,230 | A | * | 10/1998 | Reaves | 704/233 |
| 5,937,374 | A | * | 8/1999 | Bartkowiak et al. | 704/209 |
| 6,006,175 | A | * | 12/1999 | Holzrichter | 704/208 |
| 6,324,502 | B1 | * | 11/2001 | Handel et al. | 704/226 |
| 6,718,302 | B1 | * | 4/2004 | Wu et al. | 704/233 |
| 6,873,953 | B1 | * | 3/2005 | Lennig | 704/253 |
| 7,739,107 | B2 | * | 6/2010 | Kim | 704/215 |

(Continued)

FOREIGN PATENT DOCUMENTS

| | | |
|---|---|---|
| JP | 5-273992 | 10/1993 |
| JP | 7-92989 | 4/1995 |

(Continued)

OTHER PUBLICATIONS

Japanese Office Action mailed Jul. 15, 2014 in corresponding Japanese Patent Application No. 2011-081133.

(Continued)

*Primary Examiner* — Pierre-Louis Desir
*Assistant Examiner* — Neeraj Sharma
(74) *Attorney, Agent, or Firm* — Staas & Halsey LLP

(57) ABSTRACT

An utterance state detection device includes an user voice stream data input unit that gets user voice stream data of an user, a frequency element extraction unit that extracts high frequency elements by frequency-analyzing the user voice stream data, a fluctuation degree calculation unit that calculates a fluctuation degree of the high frequency elements thus extracted every unit time, a statistic calculation unit that calculates a statistic every certain interval based on a plurality of the fluctuation degrees in a certain period of time, and an utterance state detection unit that detects an utterance state of a specified user based on the statistic obtained from user voice stream data of the specified user.

17 Claims, 34 Drawing Sheets

(56) References Cited

U.S. PATENT DOCUMENTS

| | | | |
|---|---|---|---|
| 8,069,039 B2 * | 11/2011 | Yoshioka | 704/213 |
| 8,386,257 B2 | 2/2013 | Irie et al. | |
| 2002/0116177 A1 * | 8/2002 | Bu et al. | 704/200.1 |
| 2002/0194002 A1 * | 12/2002 | Petrushin | 704/270 |
| 2004/0249637 A1 * | 12/2004 | Baker | 704/239 |
| 2006/0122834 A1 * | 6/2006 | Bennett | 704/256 |
| 2007/0055514 A1 * | 3/2007 | Beattie et al. | 704/235 |
| 2007/0150287 A1 * | 6/2007 | Portele et al. | 704/275 |
| 2008/0077400 A1 * | 3/2008 | Yamamoto et al. | 704/211 |
| 2008/0270123 A1 * | 10/2008 | Levanon et al. | 704/200.1 |
| 2009/0043586 A1 * | 2/2009 | MacAuslan | 704/270 |
| 2009/0076814 A1 * | 3/2009 | Lee | 704/233 |
| 2009/0138260 A1 * | 5/2009 | Terao | 704/219 |
| 2009/0210220 A1 * | 8/2009 | Mitsuyoshi et al. | 704/207 |
| 2009/0313018 A1 * | 12/2009 | Degani et al. | 704/250 |
| 2009/0313019 A1 * | 12/2009 | Kato et al. | 704/254 |
| 2010/0121634 A1 * | 5/2010 | Muesch | 704/224 |
| 2010/0217595 A1 * | 8/2010 | Kim et al. | 704/250 |
| 2010/0280833 A1 * | 11/2010 | Yamanashi et al. | 704/500 |
| 2011/0208525 A1 * | 8/2011 | Inoue et al. | 704/249 |

FOREIGN PATENT DOCUMENTS

| | | |
|---|---|---|
| JP | 11-119791 | 4/1999 |
| JP | 2002-91482 | 3/2002 |
| JP | 2003-99084 | 4/2003 |
| JP | 2005-352154 | 12/2005 |
| JP | 2007-286097 | 11/2007 |
| JP | 2009-3162 | 1/2009 |
| JP | 2010-11409 | 1/2010 |
| WO | 01/16570 | 3/2001 |
| WO | 2007/148493 A1 | 12/2007 |
| WO | 2008/032787 | 3/2008 |

OTHER PUBLICATIONS

Japanese Office Action dated Mar. 3, 2015 in corresponding Japanese Patent Application No. 2011-081133.

* cited by examiner

| REPLY VOCABULARY | FREQUENCY | PROBABILITY |
|---|---|---|
| YES | 23 | 2.3% |
| WELL | 274 | 27.4% |
| YA | 145 | 14.5% |
| HUH | 321 | 32.1% |
| OH | 124 | 12.4% |
| UM | 4 | 0.4% |
| OK | 109 | 10.9% |
| SUMMATION | 1000 | |

| REPLY VOCABULARY | FREQUENCY | PROBABILITY |
|---|---|---|
| YES | 23 | 2.3% |
| WELL | 274 | 27.4% |
| YA | 145 | 14.5% |
| HUH | 321 | 32.1% |
| OH | 124 | 12.4% |
| UM | 4 | 0.4% |
| OK | 109 | 10.9% |
| SUMMATION | 1000 | |

| REPLY VOCABULARY | FREQUENCY | PROBABILITY |
|---|---|---|
| YES | 23 | 2.3% |
| WELL | 280 | 27.6% |
| YA | 155 | 15.3% |
| HUH | 321 | 31.6% |
| OH | 124 | 12.2% |
| UM | 4 | 0.4% |
| OK | 109 | 10.7% |
| SUMMATION | 1016 | |

FIG.18
| REPLY VOCABULARY | FREQUENCY | PROBABILITY |
|---|---|---|
| YES | 23 | 2.3% |
| WELL | 274 | 27.4% |
| YA | 145 | 14.5% |
| HUH | 321 | 32.1% |
| OH | 124 | 12.4% |
| UM | 4 | 0.4% |
| OK | 109 | 10.9% |
| SUMMATION | 1000 | |
| REPLY VOCABULARY | FREQUENCY | PROBABILITY |
|---|---|---|
| YES | 23 | 2.3% |
| WELL | 280 | 27.6% |
| YA | 155 | 15.3% |
| HUH | 321 | 31.6% |
| OH | 124 | 12.2% |
| UM | 4 | 0.4% |
| OK | 109 | 10.7% |
| SUMMATION | 1016 | |
| REPLY VOCABULARY | FREQUENCY | PROBABILITY |
|---|---|---|
| YES | 22.6 | 2.26% |
| WELL | 275.6 | 27.56% |
| YA | 152.6 | 15.26% |
| HUH | 315.9 | 31.59% |
| OH | 122.0 | 12.20% |
| UM | 3.9 | 0.39% |
| OK | 107.3 | 10.73% |
| SUMMATION | 1000 | |

FIG.22

| ITEM | μ: AVERAGE [SECOND] | σ: STANDARD DEVIATION |
|---|---|---|
| REPLY INTERVAL LENGTH | 9.7 | 5.1 |
| LENGTH BETWEEN REPLIES | 3.1 | 0.9 |
| TOTAL REPLY INTERVAL LENGTH | 25.3 | 9.3 |
| REPLY DURATION RATIO | 0.29 | 0.21 |

FIG.23

| ITEM | μ: AVERAGE [SECOND] | σ: STANDARD DEVIATION |
|---|---|---|
| REPLY INTERVAL LENGTH | 9.7 | 5.1 |
| LENGTH BETWEEN REPLIES | 3.3 | 0.9 |
| TOTAL REPLY INTERVAL LENGTH | 26.8 | 9.5 |
| REPLY DURATION RATIO | 0.31 | 0.22 |

FIG.25

| NAME | TARO TOKKYO (WRITTEN IN KANJI CHARACTERS) | |
|---|---|---|
| READING | TARO TOKKYO | |
| TELEPHONE NUMBER | 044-def-ghij | REGISTERED DATE 2000.01.15 |
| NAME | HANAKO TOKKYO (WRITTEN IN KANJI CHARACTERS) | |
| READING | HANAKO TOKKYO | |
| TELEPHONE NUMBER | 03-3def-ghij | REGISTERED DATE 2010.11.28 |

FIG.26

| HOLIDAY | |
|---|---|
| HOUR-ZONE | DANGEROUS DEGREE |
| 0:00 TO 07:00 | 0% |
| 07:00 TO 17:00 | 10% |
| 17:00 TO 24:00 | 0% |

FIG.27

| HOLIDAY | |
|---|---|
| HOUR-ZONE | DANGEROUS DEGREE |
| 0:00 TO 07:00 | 0% |
| 07:00 TO 09:00 | 10% |
| 09:00 TO 10:00 | 20% |
| 10:00 TO 15:00 | 100% |
| 15:00 TO 19:00 | 20% |
| 19:00 TO 24:00 | 0% |

| DAYS AFTER REGISTRATION | DANGEROUS DEGREE |
|---|---|
| 0 DAYS (CURRENT DAY) | 50% |
| 1 DAY TO 3 DAYS | 100% |
| 4 DAYS TO 7 DAYS | 90% |
| 8 DAYS TO 14 DAYS | 70% |
| 15 DAYS TO 30 DAYS | 20% |
| 31 DAYS TO 99 DAYS | 5% |
| 100 DAYS OR LONGER | 0% |

| NO. | ESTIMATED DATE | ESTIMATED HOME ADDRESS |
|---|---|---|
| 1 | 2011.1.5 | 1-2-3, D-CHOME, C-KU, B-CITY, A PREFECTURE (JAPAN) |
| 2 | 2011.1.12 | 1-2-3, D-CHOME, C-KU, B-CITY, A PREFECTURE (JAPAN) |
| 3 | 2011.1.19 | 1-2-3, H-CHOME, G-KU, F-CITY, E PREFECTURE (JAPAN) |
| 4 | 2011.1.26 | 1-2-3, D-CHOME, C-KU, B-CITY, A PREFECTURE (JAPAN) |
| ⋮ | ⋮ | ⋮ |

UTTERANCE STATE DETECTION DEVICE AND UTTERANCE STATE DETECTION METHOD

CROSS-REFERENCE TO RELATED APPLICATIONS

This application is based upon and claims the benefit of priority of the prior Japanese Patent Application No. 2010-98936, filed on Apr. 22, 2010 and Japanese Patent Application No. 2011-081133, filed on Mar. 31, 2011, the entire contents of which are incorporated herein by reference.

FIELD

The embodiments discussed herein are directed to an utterance state detection device and an utterance state detection method that detect an utterance state of an user, for example.

BACKGROUND

Recently, techniques have been known that analyze voice data and detect a state, such as an emotion, of an user. For example, a method is known in which intensity, speed, tempo, intonation representing intensity change patterns of utterance, and the like are detected based on a voice signal, and then, an emotional state, such as sadness, anger, and happiness, is produced from their change amounts (for example, refer to Patent Document 1). For another example, a method is known in which a voice signal is subjected to lowpass filtering to extract a feature, such as intensity and pitch, of a voice signal so as to detect an emotion (for example, refer to Patent Document 2). For still another example, a method is known in which a feature relating to a phonologic spectrum is extracted from voice information, and an emotional state is determined based on a state determination table provided in advance (for example, refer to Patent Document 3). Furthermore, a device is known that extracts a periodical fluctuation of amplitude envelope of a voice signal, and determines whether an user is making an utterance in a forceful state from the fluctuation so as to detect anger or irritation of the user (for example, refer to Patent Document 4).

Patent Document 1: Japanese Laid-open Patent Publication No. 2002-091482.
Patent Document 2: Japanese Laid-open Patent Publication No. 2003-099084.
Patent Document 3: Japanese Laid-open Patent Publication No. 2005-352154.
Patent Document 4: Japanese Laid-open Patent Publication No. 2009-003162.

In most of the related art emotion detection techniques as described above, specified user reference information indicating a state of a specified user is prepared in advance as reference information for each user from a feature amount individualizing an user of voice data, such as voice pitch, voice volume, and prosody information. An emotion of the user is then detected by comparing each feature amount of voice data serving as a detection target with the specified user reference information. In this way, reference information is prepared in advance for each specified user in the related art techniques.

However, the preparation of reference information for each specified user in advance rises a problem in that the application of a technique is limited to a specified user, and cumbersome work is needed to produce reference information every introduction of the technique.

Taking into such a problem into consideration, the technique disclosed herein aims to provide an utterance state detection device and an utterance state detection method that can detect an utterance state without preparing reference information for each specified user in advance.

SUMMARY

According to an aspect of an embodiment of the invention, an utterance state detection device, comprising:
an user voice stream data input unit that acquires user voice stream data of an user;
a frequency element extraction unit that extracts high frequency elements by frequency-analyzing the user voice stream data;
a fluctuation degree calculation unit that calculates a fluctuation degree of the extracted high frequency elements every unit time;
a statistic calculation unit that calculates a statistic every certain interval based on a plurality of the fluctuation degrees in a certain period of time; and
an utterance state detection unit that detects an utterance state of a specified user based the statistic obtained from user voice stream data of the specified user.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is an exemplary operational chart of processing to produce an utterance state detection parameter in an utterance state detection program 24a;

FIG. 7 is an exemplary operational chart of processing to detect an utterance state of a specified user in the utterance state detection program 24a;

FIG. 12 is an exemplary operational chart of processing to detect an utterance state of a specified user in the utterance state detection program 24a;

FIG. 18 is a schematic illustrating an example of updating data of the reply model storage unit;

FIG. 22 is a schematic illustrating exemplary data stored in the reply model storage unit of a sixth embodiment;

FIG. 23 is a schematic illustrating an exemplary update of data stored in the reply model storage unit of the sixth embodiment;

FIG. 25 is a schematic illustrating exemplary data stored in a phonebook storage unit of the seventh embodiment;

FIG. 26 is a schematic illustrating exemplary data stored in an hour-zone classified dangerous degree storage unit of the seventh embodiment;

FIG. 27 is a schematic illustrating exemplary data stored in the hour-zone classified dangerous degree storage unit of the seventh embodiment;

DESCRIPTION OF EMBODIMENT(S)

Preferred embodiments of an utterance state detection device, an utterance state detection program, and an utterance state detection method of the present invention will be explained below with reference to accompanying drawings.

1. First Embodiment

[1-1. Functional Blocks]

Figure 1:
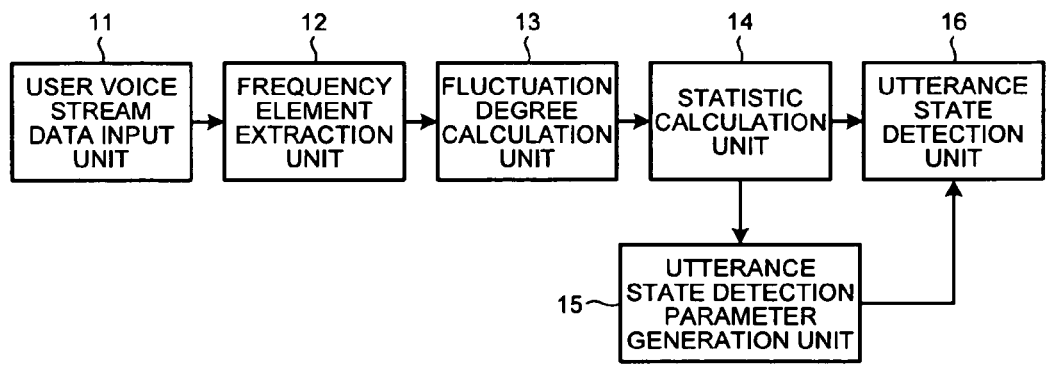
FIG. 1 is a schematic illustrating exemplary functional blocks of an utterance state detection device 1.

FIG. 1 is a schematic illustrating exemplary functional blocks of an utterance state detection device 1 according to a first embodiment of the invention. The utterance state detection device 1 includes at least an user voice stream data input unit 11, a frequency element extraction unit 12, a fluctuation degree calculation unit 13, a statistic calculation unit 14, an utterance state detection parameter generation unit 15, and an utterance state detection unit 16.

In the utterance state detection device 1, the user voice stream data input unit 11 acquires user voice stream data generated by an user. The user voice stream data may be acquired through a microphone, by reading out recorded user voice stream data from a hard disk, or received through a network, for example.

The frequency element extraction unit 12 extracts high frequency elements from a result of frequency analysis on the acquired user voice stream data. For example, an utterance period of user voice stream data is spectrally analyzed per frame (64 msec) so as to decompose the user voice stream data into frequency elements. Then, frequencies in a predetermined band is extracted as a high frequency including high frequency elements.

The fluctuation degree calculation unit 13 calculates fluctuation degrees every unit time of the extracted high frequency elements. For example, fluctuation degrees per frame (64 msec) are calculated. The fluctuation degree is preferably an index capable of evaluating flatness of a spectrum representing high frequency elements, for example. The evaluation index is described later in detail.

The statistic calculation unit 14 calculates a statistic every predetermined interval based on a plurality of the fluctuation degrees in a predetermined period of time. For example, a statistic is calculated on the basis of an interval including 500 samples of the calculated fluctuation degree data as an analysis interval. The statistic is a statistical representative value based on elements of the calculated fluctuation degree data. For example, the statistic can be calculated using a median, an average, a variance, a mode, or a quartile of a plurality of fluctuation degrees.

The utterance state detection parameter generation unit 15 produces an utterance state detection parameter to detect an utterance state based on a plurality of calculated statistics. For example, the utterance state detection parameter generation unit 15 calculates a threshold capable of detecting an utterance state of a specified user from a statistic calculated based on user voice stream data of an unspecified user whose state is known whether the unspecified user is an ordinary state or an unordinary state. The threshold is used as an utterance state detection parameter. The utterance state detection parameter generation unit 15 is not an indispensable component of the utterance state detection device 1.

The utterance state detection unit 16 detects an utterance state of a specified user based on the statistic obtained from user voice stream data generated by the specified user making an utterance. The utterance state indicates a psychic or physical state of an user who is making an utterance.

The detection of an utterance state is carried out by the following exemplary manner. An utterance state detection parameter is recorded in advance that is produced based on a statistic calculated based on user voice stream data of unspecified users (e.g., 1000 people) in an ordinary state or an unordinary state. A statistic is calculated based on user voice stream data acquired from a specified user. Then, a determination is made of whether the statistic indicates an ordinary state or an unordinary state of the specified user, by using the utterance state detection parameter as a threshold.

It is appreciated that it is difficult to determine an utterance state based on user voice stream data alone because in general user voice stream data differs in individuals and a human's emotion or physiological state is difficult to be quantitatively indicated. What the inventor of the present invention has focused on is the fluctuation degrees of the high frequency elements. The result of experiment whether a property indicating an utterance state is found in the fluctuation degrees of high frequency elements has revealed that a determination of an utterance state (e.g., a determination whether an user is in an ordinary state or an unordinary state) can be made with high probability by comparing statistics obtained from the fluctuation degrees of the high frequency elements with each other.

In this way, an utterance state of a specified user is detected based on a statistic obtained from user voice stream data of an unspecified user. As a result, an utterance state of a specified user can be detected without preparing reference information on each specified user in advance.

In the utterance state detection device 1, the utterance state detection unit 16 preferably detects whether an utterance state of the specified user is an ordinary state or an unordinary state by using an utterance state detection parameter calculated based on the statistic obtained from user voice stream data generated when unspecified users are making utterances in their known utterance states. As a result, an utterance state of a specified user can be detected with high accuracy based on user voice stream data generated when unspecified users are making utterances in their known utterance states. Furthermore, even if a large amount of user voice stream data is generated when unspecified users are making utterances in their known utterance states, an utterance state of a specified user can be detected without lowering processing speed. In the above description, an utterance state of a specified user can be detected by using both an utterance state detection parameter calculated in advance and an utterance state detection parameter calculated by a different device from the utterance state detection device 1.

The utterance state detection device 1 may further include an utterance state detection parameter generation unit that produces the utterance state detection parameter based on the statistic obtained from user voice stream data generated when unspecified users are making utterances in their known utterance states. As a result, an utterance state detection parameter is produced inside the utterance state detection device 1, and an utterance state of a specified user can be detected.

In the utterance state detection device 1, the high frequency elements are preferably extracted so as not to include a first formant. For example, a plurality of peaks temporally move in a voice spectrum of a person making an utterance. The peaks are generally called as formants composed by a first formant, a second formant, . . . , in order of the lowest frequency. The frequency of the formant relates to a vocal tract shape. Individual difference and gender difference also cause a difference in the formant. The first formant may be determined by carrying out short time Fourier transformation (STFT) on a digitally recorded (sampled) voice signal on a sound spectrogram, for example. A sonagraph, a sound spectrograph, or the like may be used to determine the first formant.

The reason why the high frequency elements are extracted so as not to include the first formant is that an effect of an utterance content (e.g., whether a vowel sound is included) can be effectively eliminated. In addition, an effect of individual difference such as the gender or the age of an user can also be eliminated at the same time.

In the utterance state detection device 1, frequency elements having a frequency of 2 kHz or higher are preferably extracted as the high frequency elements. This is because it is highly likely that the frequency elements having a frequency of 2 kHz or higher do not include the first formant. In further preferable, frequency elements within a range of 2 kHz to 3 kHz are extracted as the high frequency elements. The limitation of the range of the high frequency elements as described above enables processing to be efficiently carried out by using only high frequency elements effective for detecting an utterance state.

In general, a so-called forceful phonation frequently appears in an utterance of a person who is in a state in which the person is less tired or stressed (defined as an ordinary state). In contrast, an occurrence rate of the so-called forceful phonation becomes relatively lower in an utterance of a person who is in a state in which the person is tired or stressed (defined as an unordinary state). Based on such knowledge, the occurrence rate of the high frequency elements in user voice stream data of an user can be used for determining an utterance state of the user, for example. The inventor has found, by using a statistical technique, the following utterance state detection rules applicable in common to unspecified users.

In the utterance state detection device 1, the fluctuation degree calculation unit 13 preferably calculates the fluctuation degree based on the following formula: fluctuation degree=log (a geometric mean of power spectra of high frequency elements)/log (an arithmetic mean of power spectrum of high frequency elements).

In the utterance state detection device 1, the fluctuation degree calculation unit 13 may calculate the fluctuation degree based on the following formula: fluctuation degree=log (a geometric mean of residual power spectra of high frequency elements)/log (an arithmetic mean of residual power spectrum of high frequency elements).

In the utterance state detection device 1, the fluctuation degree calculation unit 13 may calculate the fluctuation degree based on the following formula: fluctuation degree=a geometric mean of power spectra of high frequency elements/ an arithmetic mean of power spectrum of high frequency elements.

In the utterance state detection device 1, the fluctuation degree calculation unit 13 may calculate the fluctuation degree based on a variance of residual power spectra of high frequency elements.

In the utterance state detection device 1, the fluctuation degree calculation unit may calculate the fluctuation degree based on a quartile range of power spectra of high frequency elements.

The functional units (11 to 16) illustrated in FIG. 1 include functions of a central processing unit (CPU) and the functions are realized by a program. The examples of the program include not only a program that can be directly executed by a CPU but also a source program, a compressed program, and an encrypted program.

[1-2. Hardware Structure]

Figure 2:
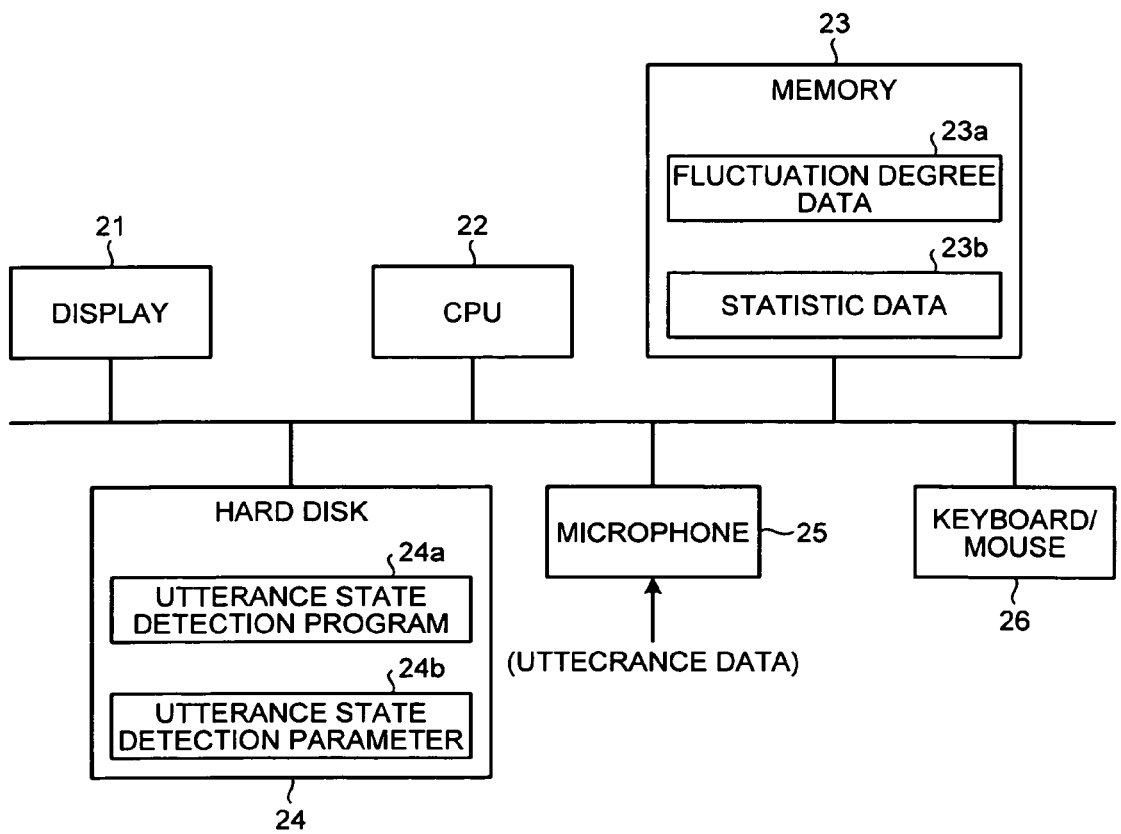
FIG. 2 is a schematic illustrating an exemplary hardware structure of the utterance state detection device 1 realized by using a computer.

FIG. 2 is a schematic illustrating an exemplary hardware structure of the utterance state detection device 1 of the first embodiment of the invention realized by a computer device including a CPU. Any device including another processor, e.g., a micro processing unit (MPU), or ICs, e.g., an application specified integrated circuit (ASIC) may be used instead of a CPU 22. The utterance state detection device 1 may be structured by using electronic equipment such as a cell-phone and a smartphone.

The utterance state detection device 1 includes at least a display 21, the CPU 22, a memory 23, a hard disk 24, a microphone 25, and a keyboard/mouse 26. The hard disk 24 records an operating system (OS, not illustrated), an utterance state detection program 24a and an utterance state detection parameter 24b, for example. The CPU 22 executes processing based on the OS and the utterance state detection program 24a, for example. The utterance state detection parameter 24b is described later. The memory 23 temporarily stores therein fluctuation degree data 23a and statistic data 23b when the CPU 22 executes processing based on the utterance state detection program 24a, for example. The fluctuation degree data 23a and the statistic data 23b are described later.

The user voice stream data input unit 11, the frequency element extraction unit 12, the fluctuation degree calculation unit 13, the statistic calculation unit 14, the utterance state detection parameter generation unit 15, and the utterance state detection unit 16 that are included in the utterance state detection device 1 illustrated in FIG. 1 are realized by executing the utterance state detection program 24a in the CPU 22.

Processing based on the utterance state detection program 24a is described below. The utterance state detection program 24a enables the CPU 22 to execute the following processing: processing (1) to produce an utterance state detection parameter from user voice stream data generated when unspecified users are making utterances, and processing (2) to detect an utterance state of a specified user based on user voice stream data generated when the specified user is making an utterance by using the produced utterance state detection parameter.

[1-3. Processing to Produce Utterance State Detection Parameter]

Figure 3:
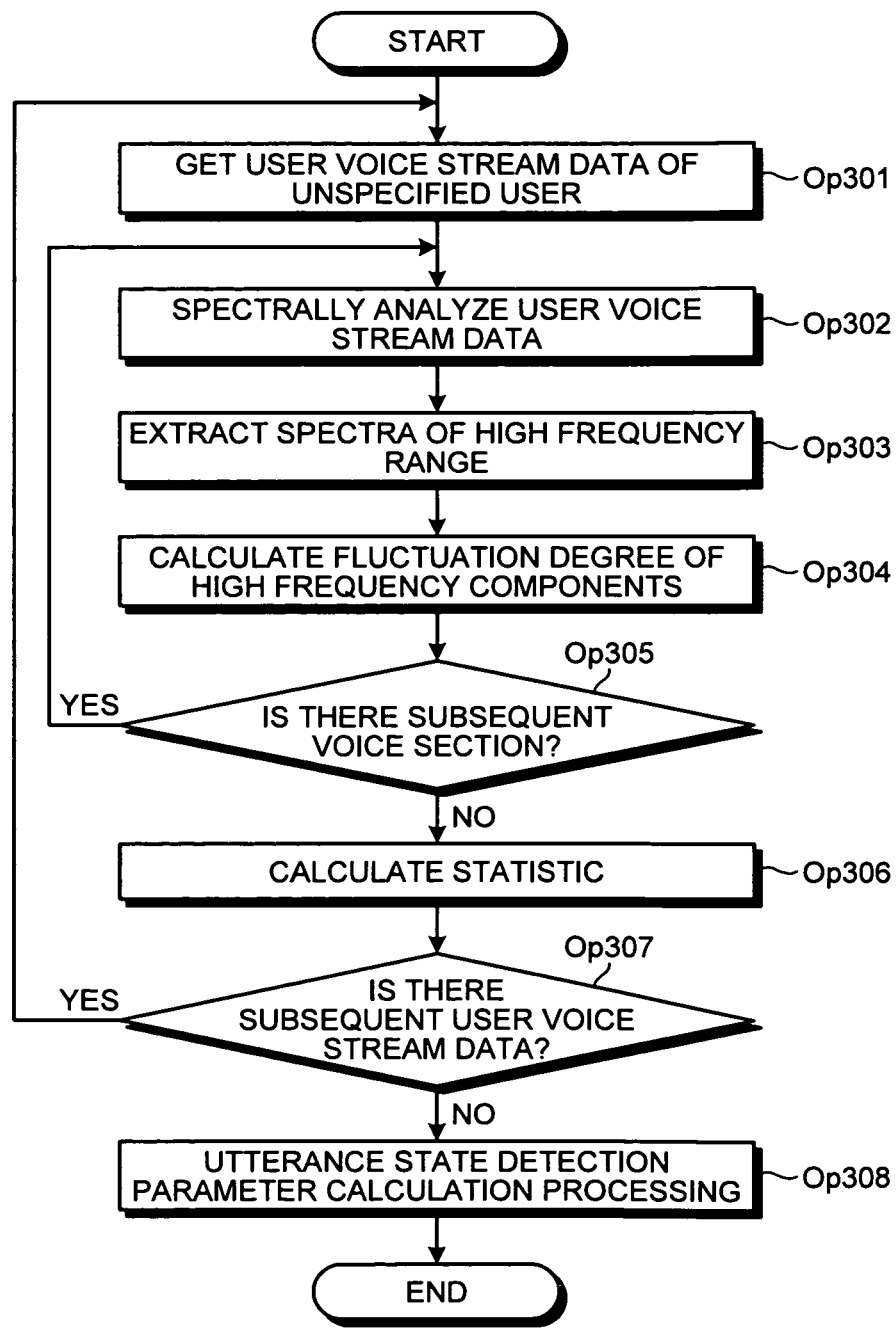

FIG. 3 is an exemplary operational chart of the processing (1) to produce an utterance state detection parameter from user voice stream data generated when unspecified users are making utterances (processing to produce an utterance state detection parameter) in the utterance state detection program 24a. The processing to produce an utterance state detection parameter is preferably executed at least once prior to execution of the processing (2) to detect an utterance state of a specified user based on user voice stream data generated when the specified user is making an utterance by using the produced utterance state detection parameter (processing to detect an utterance state of a specified user). The processing to produce an utterance state detection parameter may be carried out by a device other than the utterance state detection device 1.

The CPU 22 that executes the processing to produce an utterance state detection parameter acquires utterance (voice) data made by an unspecified user (Op 301). For example, the CPU 22 acquires digital voice data that is analog-to-digital (A/D) converted from a voice signal input from an unspecified user through the microphone 25 (e.g., the digital voice data obtained by sampling the voice signal with a sampling frequency of 8 kHz and quantized in 16 bits) as user voice stream data. For example, an effective voice section period may be defined by determining a starting point and an ending point with reference to power of user voice stream data. The CPU 22 may acquire user voice stream data recorded in advance in the memory 23 or the hard disk 24.

The CPU 22 spectrally analyzes user voice stream data of one frame (e.g., data in a duration of 64 msec) (Op 302). For example, the spectral analysis may be carried out by digital Fourier analysis (DFT) on user voice stream data (digital voice data) of one frame.

The CPU 22 extracts a spectrum of a high frequency range (Op 303). Specifically, the CPU 22 extracts only a spectrum of a high frequency range out of frequency elements obtained by the spectral analysis carried out at Op 302. More specifically, a spectrum of frequency elements having a frequency from 2 kHz to 3 kHz are extracted as being in the high frequency range, for example. The reason why the high frequency range is set to 2 kHz to 3 kHz is described as above, i.e., it is highly likely that the frequency elements having a frequency of 2 kHz or higher do not include the first formant. In addition, this is because processing is efficiently carried out by using only high frequency elements effective for detecting an utterance state by limiting the range of the frequency elements from 2 kHz to 3 kHz.

The CPU 22 calculates a fluctuation degree of the high frequency elements based on the extracted spectrum (Op 304). For example, a fluctuation degree of the high frequency elements is calculated per frame by using the following formula. Fluctuation degree=log (a geometric mean of power spectra of high frequency elements)/log (an arithmetic mean of power spectra of high frequency elements) where the geometric mean means an average based on multiplying each power spectrum value of one frame while the arithmetic mean means an average based on adding each power spectrum value of one frame.

Figure 4:
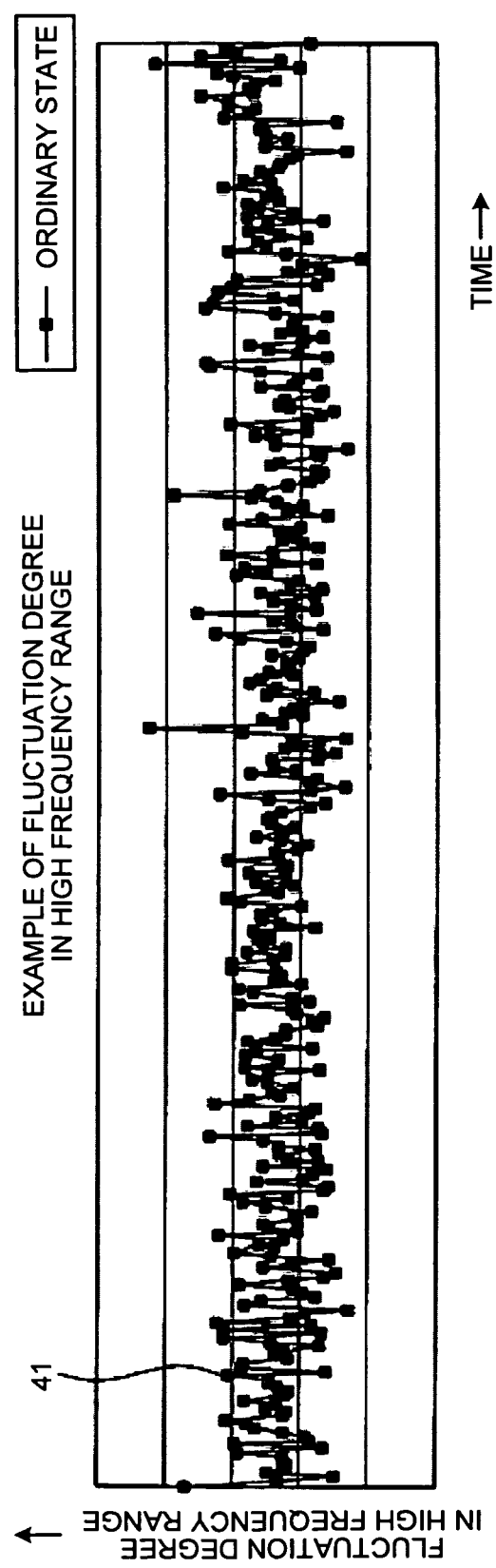
FIG. 4 is an exemplary graph illustrating fluctuation degrees calculated based on user voice stream data made in an ordinary state.

FIG. 4 is an exemplary graph illustrating fluctuation degrees calculated based on user voice stream data made in an ordinary state. In the graph, the ordinate axis represents the fluctuation degree of the high frequency elements while the abscissas axis represents elapsed time. In the graph, one plotted point represents a value of a fluctuation degree calculated from one frame. An amplitude of a fluctuation degree series (a set of a plurality of element data each of which is the fluctuation degree in unit time) in a broken line 41 representing the fluctuation degree in an ordinary state is larger than an amplitude of a fluctuation degree series representing the fluctuation degree in an unordinary state. In other words, the graph in an unordinary state has higher flatness than the graph in an ordinary state. The fluctuation degrees calculated as described above are stored in the memory 23 as the fluctuation degree data 23a.

As described above, the fluctuation degree is preferably an index capable of evaluating flatness of a spectrum representing high frequency elements. Therefore, the fluctuation degree may be calculated as described in the following examples.

For example, the fluctuation degree may be calculated by the following formula. Fluctuation degree=log (a geometric mean of residual power spectra of high frequency elements)/log (an arithmetic mean of residual power spectra of high frequency elements) where the residual power spectrum is a residual signal obtained by inversely filtering the spectrum.

For example, the fluctuation degree may be calculated by the following formula. Fluctuation degree=a geometric mean of power spectra of high frequency elements/an arithmetic mean of power spectra of high frequency elements.

For example, the fluctuation degree may be calculated based on a variance of residual power spectra of high frequency elements.

For example, the fluctuation degree may be calculated based on a quartile range of residual power spectra of high frequency elements. For example, the fluctuation degree may be calculated based on a difference between 25 percentile and 75 percentile of values of power spectra of high frequency elements (the difference between the smallest value in the upper 25 percent of the values of power spectra and the largest value in the lower 25 percent of the values of power spectra when the values of power spectra are sorted in the order from the largest to smallest).

The CPU 22 repeats processing from Op 302 to Op 304 on each voice section until all of the voice sections of voice data are processed (Op 305).

If calculation of fluctuation degrees on all of the voice sections of user voice stream data is completed (No at Op 305), the CPU 22 calculates a statistic based on a fluctuation degree series of a predetermined analysis section for each predetermined analysis section (Op 306). For example, let an section including 500 samples of element data of the fluctuation degree be an analysis section. A median of the elements of the fluctuation degree existing in the analysis section is calculated so as to be a statistic. A variance or a quartile may be calculated so as to be a statistic instead of the median.

In this case, a plurality of statistics are calculated from a plurality of analysis sections by shifting the analysis section by increasing and decreasing 10 elements as follows: a first analysis section is set by including elements from the 1st to the 500th, and a second analysis section is set by including elements from 11th to 510th, and so on.

Figure 5:
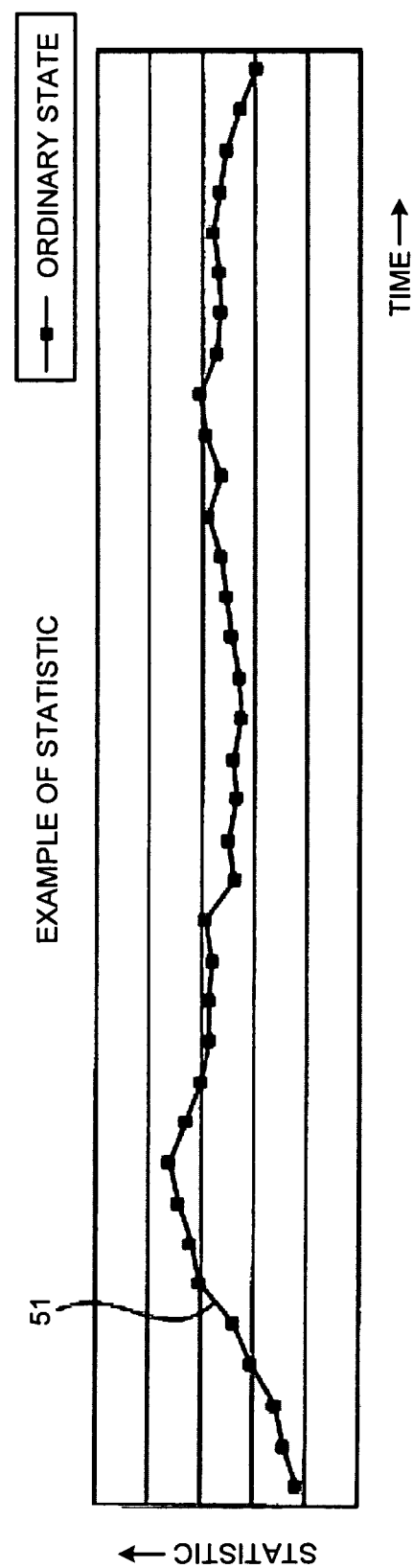
FIG. 5 is an exemplary graph illustrating statistics calculated based on fluctuation degrees of user voice stream data made in an ordinary state.

FIG. 5 is an exemplary graph illustrating statistics calculated based on fluctuation degrees of user voice stream data made in an ordinary state. In the graph, the ordinate axis represents the size of the statistic (unit is the same as that of the fluctuation degree) while the abscissas axis represents elapsed time. An amplitude of a statistic series (a set of elements each of which is the statistic of a predetermined section) in a broken line 51 representing the statistics in an ordinary state is larger than an amplitude of a statistic series representing the statistics in an unordinary state. In other words, the graph in an unordinary state has higher flatness than the graph in an ordinary state. The statistics calculated as described above are stored in the memory 23 as the statistic data 23b.

The CPU 22 repeats processing from Op 301 to Op 306 on each user voice stream data until all of the user voice stream data of unspecified users is processed (Op 307).

At Op 308, the CPU carries out processing to calculate an utterance state detection parameter. For example, in the processing to calculate an utterance state detection parameter, statistics are calculated by using each user voice stream data as described above. It is known whether each data is generated in an ordinary state or an unordinary state. Based on each calculated statistic, utterance state detection parameters t1 and t2 are calculated that are used for detecting an utterance state of a specified user based on user voice stream data. The use of the utterance state detection parameters t1 and t2 enables a statistic relating to a specified user and a statistic relating to unspecified users to be compared in utterance state detection processing as described later.

For example, the utterance state detection parameter t1 is determined by finding the 75 percentile (the smallest value in the upper 25 percent of the statistics when the statistics are sorted in the order from the largest to smallest) of all of the statistics calculated from user voice stream data generated in an ordinary state. Then, a ratio of statistic elements exceeding the utterance state detection parameter t1 to all of the statistic elements (element ratio) is determined as the utterance state detection parameter t2. Any representative value may be used as the utterance state detection parameter t1 besides the 75 percentile of all of the statistics.

Figure 6:
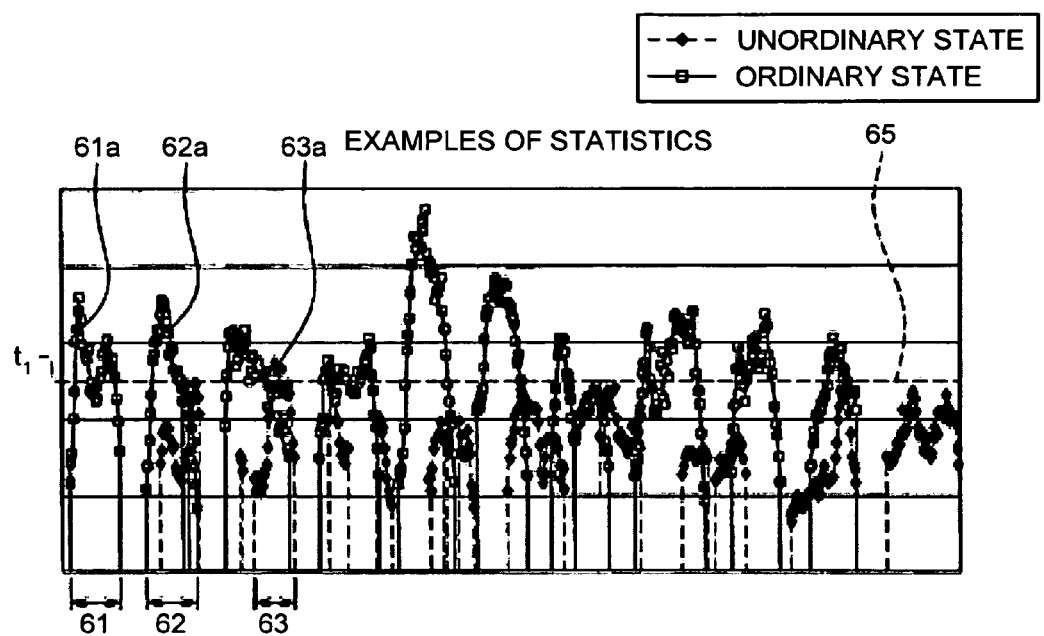
FIG. 6 is a graph illustrating a relationship between statistics and an utterance state detection parameter t1.

FIG. 6 is a graph illustrating a relationship between statistics and the utterance state detection parameter t1. In FIG. 6, a broken line 65 indicates a value of the utterance state detection parameter t1. In FIG. 6, sections 61, 62, and 63 correspond to broken lines 61a, 62a, and 63a each of which indicates statistics of a plurality of elements (statistic series). The broken lines 61a and 62a indicate the statistics in an ordinary state while the broken line 63a indicates the statistics in an unordinary state.

In FIG. 6, the statistics calculated from user voice stream data generated in an unordinary state are indicated in the same graph. However, the statistics in an unordinary state may be used as follows. The 75 percentile of the statistic data in an unordinary state is obtained as an utterance state detection parameter t3. If a difference between t1 and t3 is a predetermined value or larger, t1 may be confirmed to be used. This procedure enables high accuracy utterance state detection parameters (t1 and t2) to be set by using unspecified user data that shows a definite difference between statistics in an ordinary state and an unordinary state.

The CPU 22 stores the utterance state detection parameters t1 and t2 that are calculated in the parameter calculation processing in the hard disk 24.

[1-4. Processing to Detect Utterance State of Specified User]

After the processing to produce the utterance state detection parameter ends, in the utterance state detection device 1, the CPU 22 executes processing to detect an utterance state of a specified user. As described above, the processing to produce the utterance state detection parameters (t1 and t2) may be carried out at least once prior to the processing to detect an utterance state of a specified user. If the utterance state detection device 1 can acquire the utterance state detection parameters (t1 and t2), the processing to determine an utterance state of a specified user can be executed without executing the processing to produce an utterance state detection parameter.

Figure 7:
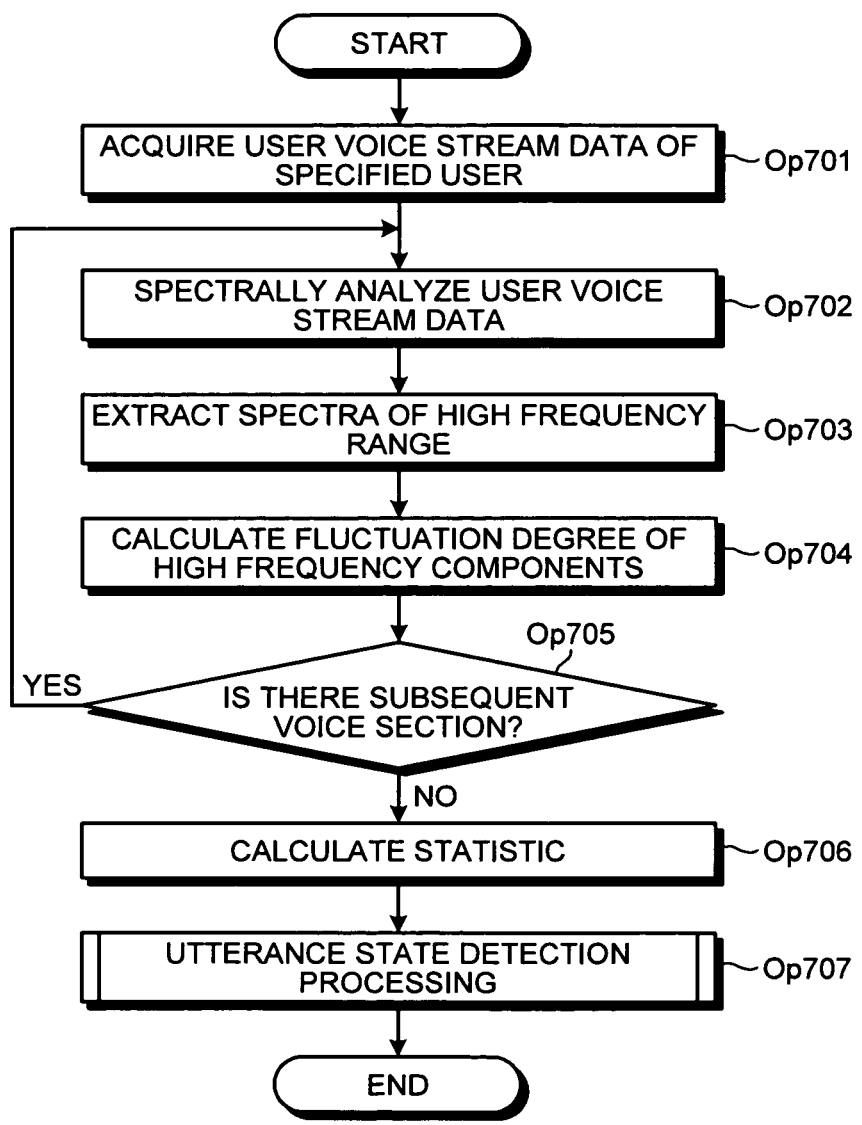

FIG. 7 is an exemplary operational chart of processing to detect an utterance state of a specified user in the utterance state detection program 24a.

The CPU 22 that executes the processing to detect an utterance state of a specified user gets user voice stream data made by a specified user (Op 701). For example, the CPU 22 carries out processing in the same manner as Op 301 illustrated in FIG. 3.

The CPU 22 spectrally analyzes user voice stream data of one voice section (one frame) (Op 702). For example, the CPU 22 carries out processing in the same manner as Op 302 illustrated in FIG. 3.

The CPU 22 extracts a spectrum of a high frequency band (Op 703). For example, the CPU 22 carries out processing in the same manner as Op 303 illustrated in FIG. 3.

The CPU 22 calculates a fluctuation degree of the high frequency elements based on the extracted spectrum (Op 704). For example, the CPU 22 carries out processing in the same manner as Op 304 illustrated in FIG. 3.

The CPU 22 repeats processing from Op 702 to Op 704 on each voice section until all of the voice sections of voice data are processed (Op 705).

If calculation of fluctuation degrees on all of the voice sections of user voice stream data is completed (No at Op 705), the CPU 22 calculates a statistic based on a fluctuation degree series of a predetermined analysis section for each predetermined analysis section (Op 706). For example, the CPU 22 carries out processing in the same manner as Op 305 illustrated in FIG. 3. In this processing, it is not known whether the utterance state of the specified user is an ordinary state or an unordinary state.

At Op 707, the CPU 22 carries out the processing to detect an utterance state of the specified user by using the utterance state detection parameter calculated at Op 308. Specifically, a statistic relating to the specified user and a statistic relating to unspecified users are compared by using the utterance state detection parameters t1 and t2 so as to detect an utterance state of the specified user. In other words, the detection of an utterance state is carried by evaluating the calculated statistic relating to the specified user with the utterance state detection parameters t1 and t2.

For example, a rule is set that "a state in which element data indicating forceful phonation frequently appears in a statistic series is an ordinary state while a state in which element data indicating forceful phonation do not appear in a statistic series is a tired state". The case in which element data indicating forceful phonation appears is defined as a case in which a statistic indicating element data is larger than the utterance state detection parameter t1.

Figure 8:
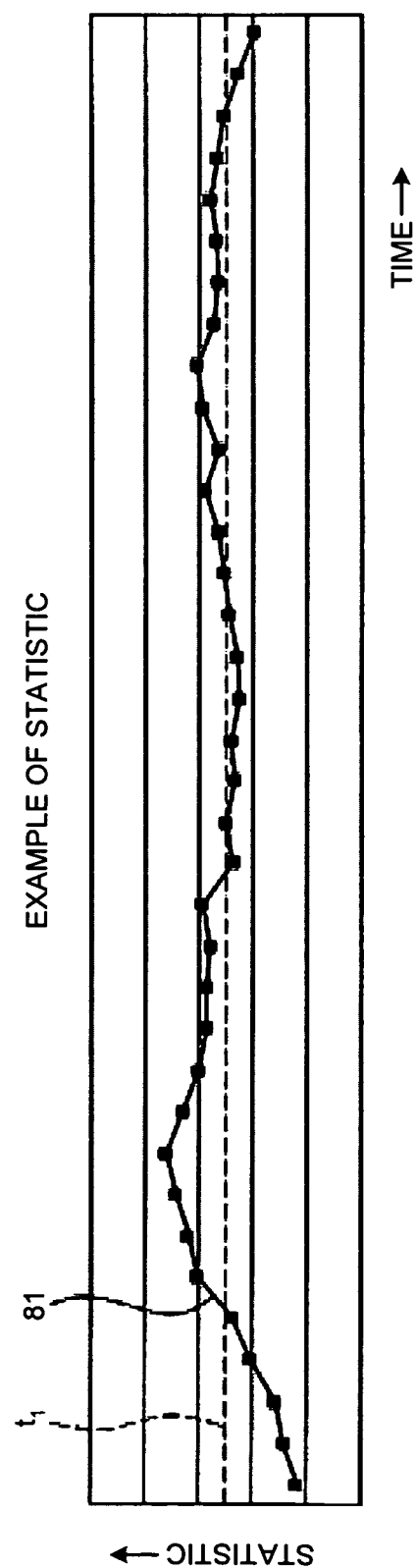
FIG. 8 is an exemplary graph illustrating statistics calculated based on fluctuation degrees of user voice stream data made by a specified user.

FIG. 8 is an exemplary graph illustrating statistics calculated based on fluctuation degrees of user voice stream data made by a specified user. For example, in FIG. 8, the broken line in the graph corresponds to the utterance state detection parameter t1. In other words, each element plotted above the broken line in the statistic series is the element indicating forceful phonation.

The case in which element data indicating forceful phonation frequently appears is defined as a case in which an appearance ratio of the elements indicating forceful phonation (a ratio of elements having a larger statistic than the utterance state detection parameter t1) is larger than the utterance state detection parameter t2. For example, in FIG. 8, most (about 65%) of the statistic elements indicating with a broken line 81 exceed the value of the utterance state detection parameter t1. In other words, it can be said that the appearance ratio of the element indicating forceful phonation is high if a ratio of the elements exceeding the utterance state detection parameter t1 to all of the elements in the statistic series is larger than the utterance state detection parameter t2. The statistic data having a high appearance ratio of the element indicating forceful phonation is detected as the data in an ordinary state.

[1-5. Effects of the First Embodiment]

As described above, the utterance state detection device 1 compares statistics obtained from user voice stream data generated when unspecified users are making utterances in their known utterance states with statistics obtained from user voice stream data generated when a specified user is making an utterance by using the utterance state detection parameters (t1 and t2) obtained based on the statistics obtained from user voice stream data generated when unspecified users are making utterances in their known utterance states so as to detect an utterance state of the specified user. Consequently, an utterance state of a specified user can be detected without preparing reference information on each specified user in advance.

In the embodiment, the user voice stream data input unit 11 includes the processing function of Op 301 of FIG. 3, for example. The frequency element extraction unit 12 includes the processing function of Op 303 of FIG. 3, for example. The fluctuation degree calculation unit 13 includes the processing function of Op 304 of FIG. 3, for example. The statistic calculation unit 14 includes the processing function of Op 306 of FIG. 3, for example. The utterance state detection parameter generation unit 15 includes the processing function of Op 308 of FIG. 3, for example.

2. Second Embodiment

In the processing to calculate an utterance state detection parameter (Op 308) of the utterance state detection device 1, as an example, the 75 percentile (the smallest value in the upper 25 percent of the statistics when the statistics are sorted in the order from the largest to smallest) of all of the statistics calculated from user voice stream data generated in an ordinary state is obtained so as to determine the utterance state detection parameter t1, and a ratio of the statistic elements exceeding the utterance state detection parameter t1 to all of the statistic elements (element ratio) is determined as the utterance state detection parameter t2.

However, the utterance state detection parameters (t1 and t2) may be determined taking into consideration statistics calculated from user voice stream data generated in an unordinary state in addition to statistics calculated from user voice stream data generated in an ordinary state. The determination of the utterance state detection parameters (t1 and t2) by taking into consideration statistics calculated from user voice stream data generated in an unordinary state enables the utterance state detection parameters (t1 and t2) to which the analysis result of the user voice stream data of unspecified users is further reflected to be used. As a result, the utterance state detection processing can be executed with further improved detection accuracy.

[2-1. Functional Blocks and Hardware Structure]

The utterance state detection device 1 according to a second embodiment of the invention can be structured by using electronic equipment such as a computer device, a cell-phone, and a smartphone in the same manner as the first embodiment. Examples of the functional blocks and the hardware structure of the utterance state detection device 1 according to the second embodiment are basically the same as those of the first embodiment described by using FIGS. 1 and 2.

[2-2. Processing to Produce Utterance State Detection Parameter]

Processing to produce an utterance state detection parameter in the utterance state detection program 24a of utterance state detection device 1 of the embodiment is basically the same as that of the first embodiment by using FIGS. 3 to 6. In the embodiment, however, processing to calculate an utterance state detection parameter is different from that described at Op 308.

Figure 9:
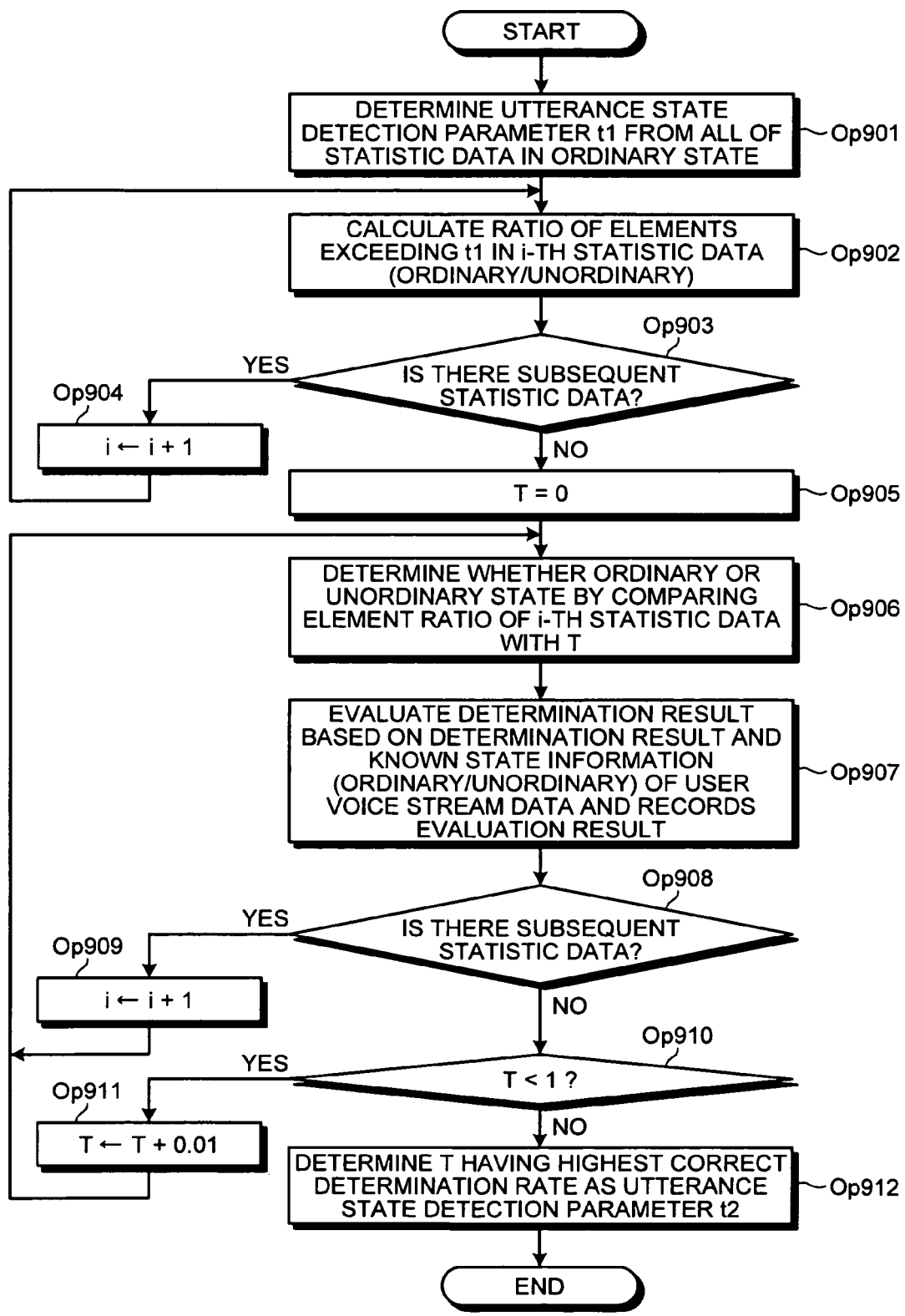
FIG. 9 is an exemplary operational chart of processing to calculate utterance state detection parameters according to a second embodiment.

FIG. 9 is an exemplary operational chart of processing to calculate an utterance state detection parameter according to the embodiment. For example, in the processing to calculate an utterance state detection parameter, statistics are calculated by using user voice stream data, and it is known whether each user voice stream data is generated in an ordinary state or an unordinary state.

The CPU 22 determines the utterance state detection parameter t1 from all statistic data in an ordinary state (Op 901). For example, the utterance state detection parameter t1 is determined by finding the 75 percentile (the smallest value in the upper 25 percent of statistics when the statistics are sorted in the order from the largest to smallest) of all of the statistics calculated from user voice stream data generated in an ordinary state. Any representative value may be used as the utterance state detection parameter t1 besides the 75 percentile of all of the statistics.

The CPU 22 calculates an element ratio of the i-th statistic data. Here, it is known whether the i-th statistic data is in an ordinary state or an unordinary state. The element ratio is the ratio of the elements exceeding the determined utterance state detection parameter t1 to all of the elements of the i-th statistic data (Op 902). For example, if 30 statistic data elements exceed the utterance state detection parameter t1 out of 50 statistic data elements, the element ratio is 0.6.

The CPU 22 repeats the processing of Op 902 on each statistic data until all statistic data is processed (Op 903 and Op 904).

If the calculation of the element ratio on all statistic data of user voice stream data in ordinary and unordinary states is completed (No at Op 903), the CPU 22 compares the element ratio of statistic data with T so as to determine whether the statistic data is in an ordinary state or an unordinary state (Op 905 and Op 906). T is a variable that changes within a range of $0 \leq T \leq 1$ by 0.01, and determines the utterance state detection parameter t2.

The CPU 22 executes the processing from Op 906 to Op 908 (described below) every time when T is changed by 0.01 from zero to one (Op 910 and Op 911).

The CPU 22 evaluates the determination result based on the determination result of Op 906 and known state information (information of whether the user voice stream data is in an ordinary state or an unordinary state, and the information is recorded in advance corresponding to user voice stream data) of the user voice stream data, and records the evaluation result (Op 907). For example, the utterance state detection parameter t2 corresponding to T is set to 0.5. The detection processing is carried out on statistic data that has an element ratio of 0.6 and indicates that the statistic data is in an ordinary state. It is determined that the statistic data is in an ordinary state because the element ratio (0.6) is larger than the utterance state detection parameter t2 (0.5).

Meanwhile it is evaluated that the determination result of Op 906 is correct because it is known that the statistic data is in an ordinary state. The CPU 22 records the evaluation result in the memory 23. For example, when the determination is correct, "1" may be recorded so as to correspond to statistic data while when the determination is incorrect, "0" may be recorded so as to correspond to statistic data.

As another example, if T is 0.7 and the element ratio is 0.6, it is determined that the statistic data is in an unordinary state because the element ratio (0.6) is equal to or smaller than the utterance state detection parameter t2 (0.7). However, if the known state of the statistic data is an ordinary state, it is evaluated that the determination of Op 906 is incorrect. In this case, "0" is recorded corresponding to the statistic data.

The CPU 22 calculates a correct determination rate of the determination results of Op 906 on each set T, and thereafter determines the T having the highest correct determination rate as the utterance state detection parameter t2 (Op 912).

The CPU 22 stores the utterance state detection parameters t1 and t2 that are calculated in the parameter calculation processing in the hard disk 24.

In the processing at Op 901, the utterance state detection parameter t1 is determined based on the 75 percentile of the statistic data in an ordinary state. The utterance state detection parameter t1 may be fluctuated in the same manner as the utterance state detection parameter t2, and thereafter the utterance state detection parameters t1 and t2 may be determined based on the highest correct determination rate. Consequently, higher accuracy utterance state detection parameters (t1 and t2) can be set.

[2-3. Processing to Detect Utterance State of Specified User]

Processing to detect an utterance state of a specified user of the embodiment is the same as that of the first embodiment. In other words, the CPU 22 acquires the utterance state detection parameters (t1 and t2), and executes the processing to detect an utterance state of a specified user. As described above, the processing to produce the utterance state detection parameters (t1 and t2) may be carried out at least once prior to the processing to detect an utterance state of a specified user. If the utterance state detection device 1 can acquire the utterance state detection parameters (t1 and t2), the processing to determine an utterance state of a specified user can be executed without executing the processing to produce an utterance state detection parameter.

3. Third Embodiment

The utterance state detection device 1 may further include a signal-noise (SN) ratio calculation unit that calculates a signal-noise ratio (SNR) on the user voice stream data, and the utterance state detection unit 16 may detect an utterance state when an SN ratio of user voice stream data exceeds a threshold in the predetermined section based on which a statistic is calculated. The evaluation of an utterance state by taking into consideration an SN ratio as described above enables detection processing to be carried out by eliminating utterances in an environment having relatively much noise, and detection accuracy drop to be prevented.

Figure 11:
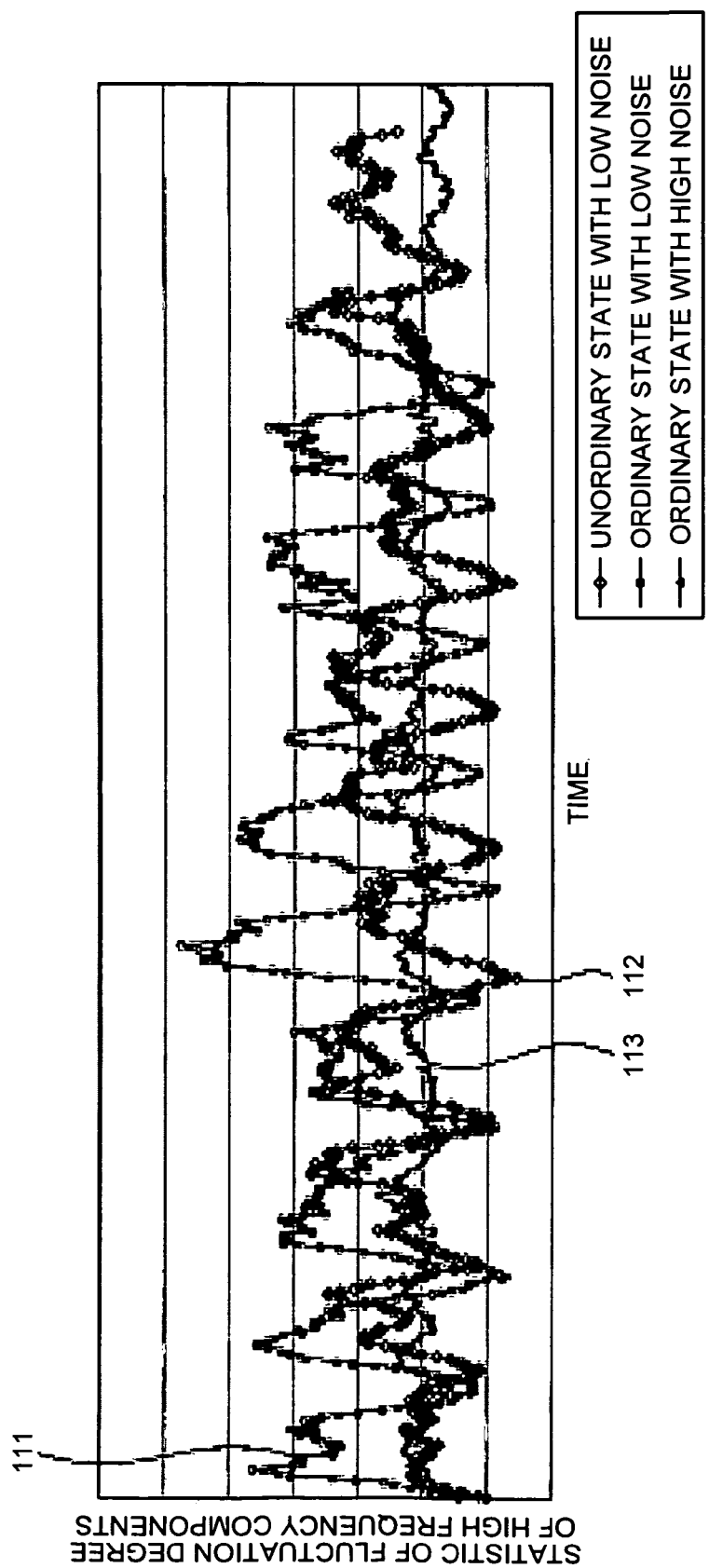
FIG. 11 is an exemplary graph illustrating statistics when user voice stream data having much noise and when user voice stream data having less noise.

FIG. 11 is an exemplary graph illustrating statistics when user voice stream data having much noise and when user voice stream data having less noise. As illustrated in FIG. 11, a broken line 111 indicates statistic data in an ordinary state when user voice stream data has less noise. A broken line 112 indicates statistic data in an unordinary state when user voice stream data has less noise. A broken line 113 indicates statistic data in an ordinary state when user voice stream data has much noise. As can be seen from FIG. 11, the flatness of the broken line 113 indicating the statistics in an ordinary state obtained from user voice stream data having much noise is higher than that in an unordinary state. Consequently, a forceful phonation is hardly detected from the statistic data indicated with the broken line 113.

In the embodiment, an example is described in which statistics obtained from user voice stream data having much noise are determined as those in an unordinary state even though the statistics obtained from user voice stream data having much noise are in an ordinary state so as to prevent an utterance state from being wrongly detected.

[3-1. Functional Blocks and Hardware Structure]

Figure 10:
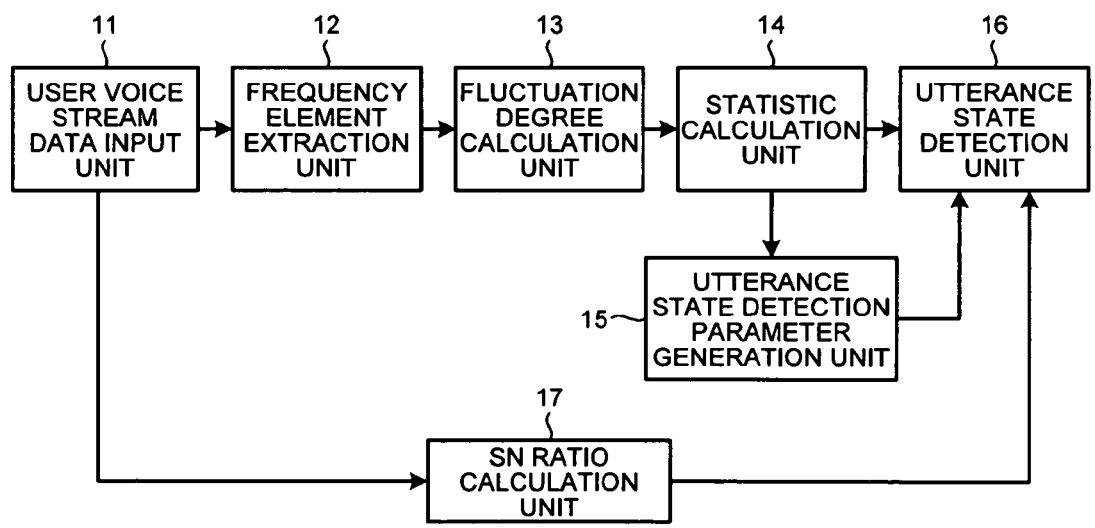
FIG. 10 is a schematic illustrating exemplary functional blocks of the utterance state detection device 1 according to a third embodiment.

The utterance state detection device 1 according to a third embodiment of the invention can be structured by using electronic equipment such as a computer device, a cell-phone and a smartphone in the same manner as the first embodiment. FIG. 10 is a schematic illustrating exemplary functional blocks of the utterance state detection device 1 according to the third embodiment. In FIG. 10, an SN ratio calculation unit 17 is further included in addition to the functional blocks of the utterance state detection device 1 illustrated in FIG. 1.

The SN ratio calculation unit 17 calculates an SN ratio on user voice stream data acquired by the user voice stream data input unit 11. The calculation of an SN ratio can be done by the following formula using a voice activity detector (VAD), for example. SN ratio=10 log (Σ(S+N)/ΣN) where S represents average power in a voice section and N represents average power in a silent section.

The example of the hardware structure of the utterance state detection device 1 according to the embodiment is basically the same as that of the first embodiment described by using FIG. 2.

[3-2. Processing to Produce Utterance State Detection Parameter]

Processing to produce an utterance state detection parameter of the embodiment is the same as that of the first or the second embodiment. In other words, in the same manner as the first embodiment, the 75 percentile (the smallest value in the upper 25 percent of statistics when the statistics are sorted in the order from the largest to smallest) of all of the statistics calculated from user voice stream data generated in an ordinary state may obtained so as to determine the utterance state detection parameter t1, and a ratio of the statistic elements exceeding the utterance state detection parameter t1 to all of the statistic elements (element ratio) may be determined as the utterance state detection parameter t2. Alternatively, in the same manner as the second embodiment, the utterance state detection parameters (t1 and t2) may be determined taking into consideration of statistics calculated from user voice stream data generated in an unordinary state in addition to statistics calculated from user voice stream data generated in an ordinary state.

[3-3. Processing to Detect Utterance State of Specified User]

The CPU 22 acquires the utterance state detection parameters (t1 and t2), and executes the processing to detect an utterance state of a specified user. As described above, the processing to produce the utterance state detection parameters (t1 and t2) may be carried out at least once prior to the processing to detect an utterance state of a specified user. If the utterance state detection device 1 can acquire the utterance state detection parameters (t1 and t2), the processing to determine an utterance state of a specified user can be executed without executing the processing to produce an utterance state detection parameter.

Figure 12:
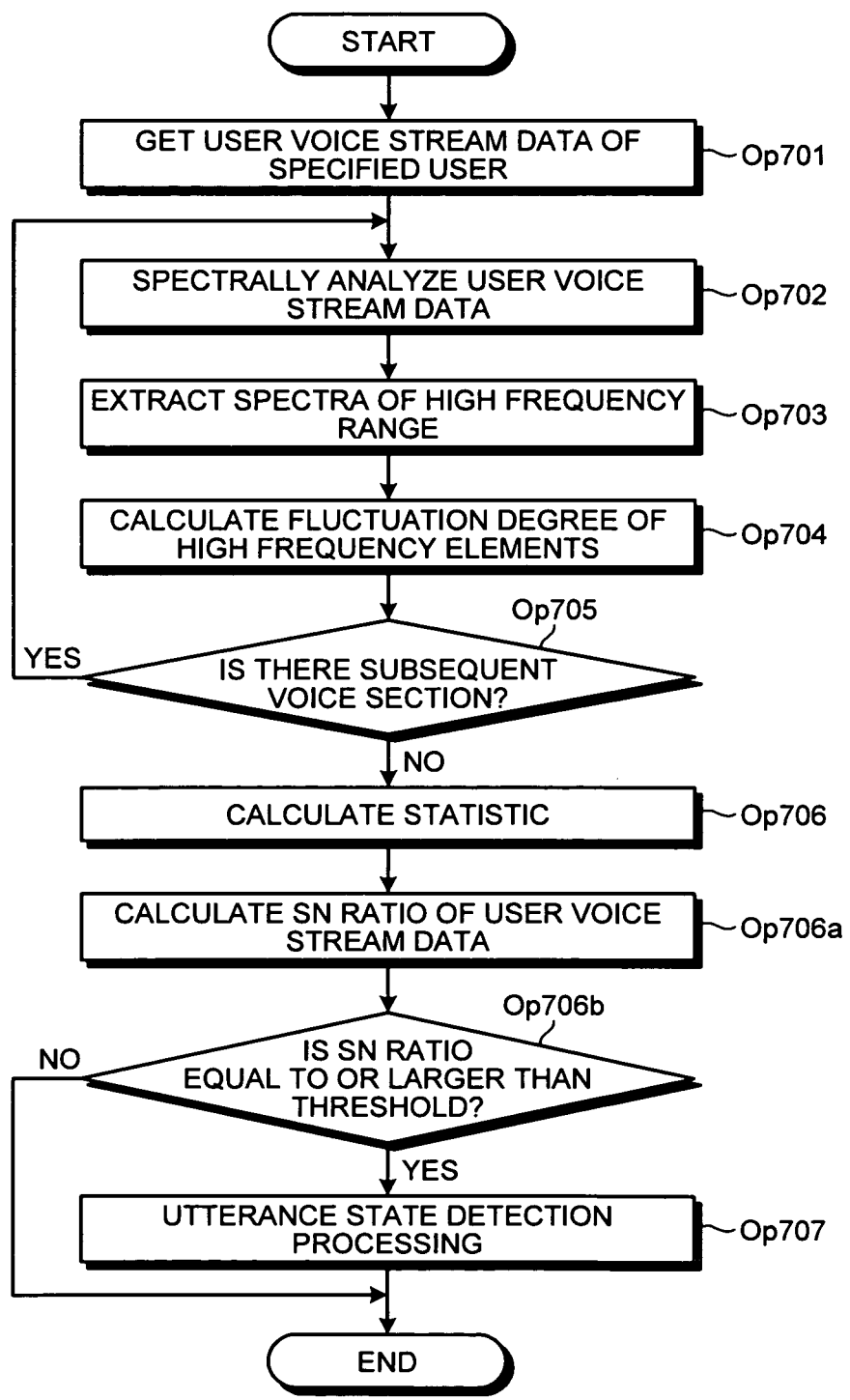

FIG. 12 is an exemplary operational chart of processing to detect an utterance state of a specified user in the utterance state detection program 24a. The processing from Op 701 to Op 706 is the same as that illustrated in FIG. 7.

At Op 706a in FIG. 12, the CPU 22 calculates an SN ratio on user voice stream data of a specified user. The calculation of the SN ratio may be done based on the VAD as described above.

Subsequently, the CPU 22 determines whether the calculated SN ratio is equal to or larger than a preset threshold (Op 706b). For example, when the threshold is set to 10 decibel (dB), the above-described utterance state detection processing (Op 707) is executed if the SN ratio is 15 dB.

In contrast, if the SN ratio is smaller than the threshold, the procedure ends without executing the utterance state detection processing (Op 707). In this case, it may displayed that the processing is skipped due to a small SN ratio, for example. In addition, a signal indicating the reason may be output.

With the above-described procedure, effectiveness of a detection processing result is determined before the utterance state detection processing is carried out on a specified user by using the calculated utterance state detection parameters (t1 and t2). As a result, false detection in the utterance state detection processing can be prevented preliminarily.

In the embodiment, the SN ratio calculation unit 17 includes the processing function of Op 706a of FIG. 12, for example.

4. Fourth Embodiment

In the above-described embodiments, the utterance state detection device 1 executes both the processing (1) to produce an utterance state detection parameter and the processing (2) to detect an utterance state of a specified user. However, an utterance state of a specified user may be detected by using an utterance state detection parameter calculated by another device. For example, an utterance state detection parameter may be acquired through a network such as the Internet.

More than one of part or the whole of the structures described in the first and the second embodiments may be combined.

In the first and the second embodiments, each of the functional blocks illustrated in FIG. 1 is realized by processing of the CPU executing software. Part or the whole of the functional blocks, however, may be realized by hardware such as a logic circuit. In addition, part of processing of a program may be carried out by an operating system (OS).

5. Fifth Embodiment

In the above-described embodiments, physical feature amounts and statistics are calculated from input voice data such as a call and processing to determine a state of an user is carried out based on the calculated physical feature amounts and statistics, without preparing reference information of each specified user in advance. However, it is difficult to calculate the physical feature amounts and the statistics when voice data amount which is available to be gotten is little, such as a case where replies are continuously made. As a result, a state of an user cannot be determined. In a fifth embodiment described below, processing is described in which a state of an user is determined even when the state of the user is hardly determined because little voice data of the user is available to be acquired such as a case where replies are continuously made.

[5-1. Functional Blocks]

Figure 13:
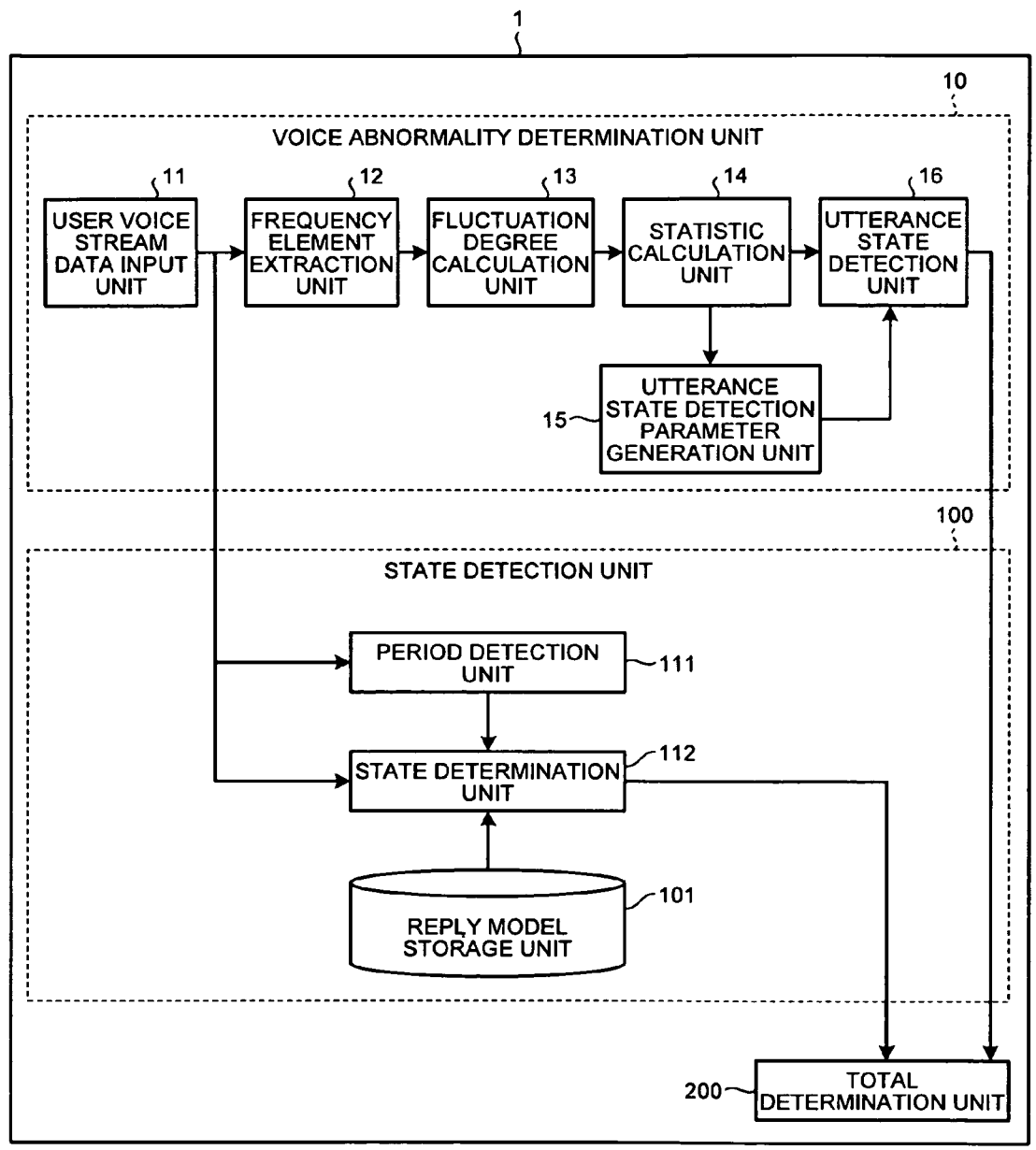
FIG. 13 is a schematic illustrating exemplary functional blocks of the utterance state detection device 1 according to a fifth embodiment.

FIG. 13 is a schematic illustrating exemplary functional blocks of the utterance state detection device 1 according to the fifth embodiment. The utterance state detection device 1 according to the fifth embodiment differs from those in the above-described embodiments in that a voice abnormality determination unit 10, a state detection unit 100, and a total determination unit 200 are included. The sound abnormality determination unit 10 corresponds to the function blocks 11 to 16 illustrated in FIG. 1.

As illustrated in FIG. 13, the state detection unit 100 includes a reply model storage unit 101, an period detection unit 111, and a state determination unit 112.

The reply model storage unit 101 is data obtained by statistically processing information relating to reply when an user is in a normal state. For example, the reply model storage unit 101 retains, on a word-to-word basis, an appearance frequency and a probability of appearance of a word (or vocabulary, hereinafter simply referred to as the "word") that is used by an user replies in a normal state such as daily circumstances. The reply model storage unit 101 is produced in advance based on dialogue data of a large number of unspecified users in daily circumstances. In this regard, whether the dialogue is made in daily circumstances can be determined by a person hearing the dialogue, or automatically determined by objective data, such as a pulse, simultaneously collected, or the methods of the above-described embodiments. For example, when objective data, such as a pulse, simultaneously collected is utilized, the daily circumstances may be determined when data is within ± about one variance of an average or a variance value of the objective data. If, for example, the gender and the age of a user are known in advance, data of the reply model storage unit 101 can be individually produced so as to be classified by gender and age. Exemplary data stored in the reply model storage unit 101 is described below with reference to FIG. 14.

Figures 14, 15:
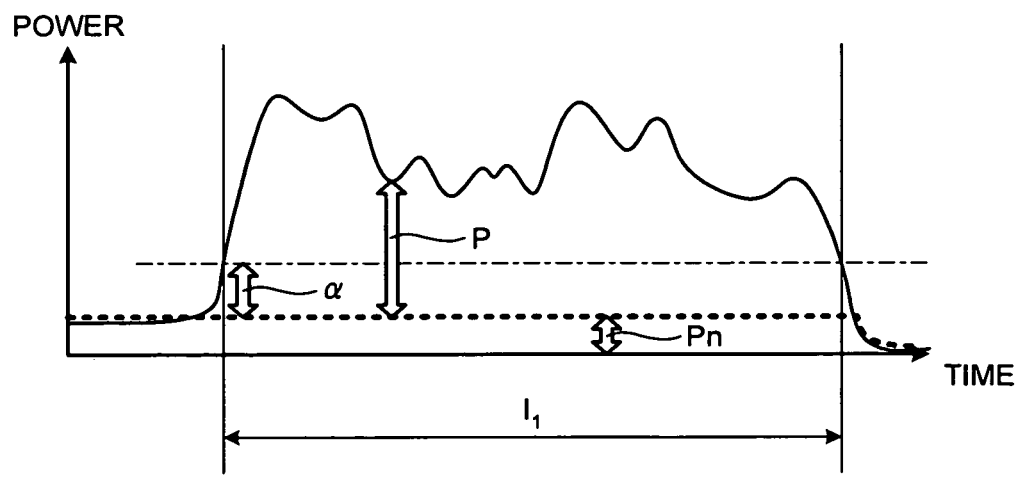
FIG. 14 is a schematic illustrating exemplary data stored in a reply model storage unit of the fifth embodiment.
FIG. 15 is a schematic illustrating an exemplary detection method of an utterance period.

FIG. 14 is a schematic illustrating exemplary data stored in the reply model storage unit 101 of the fifth embodiment. As illustrated in FIG. 14, a word (vocabulary) used in reply in daily circumstances, the appearance frequency (the number of times), and the probability of appearance correspond to each other on a word-to-word basis in the reply model storage unit 101. For example, in FIG. 14, a word "yes" corresponds to the appearance frequency of "23 (times)", and the probability of appearance of "2.3%". For example, in FIG. 14, a word "huh" corresponds to the appearance frequency of "321 (times)", and the probability of appearance of "32.1%". In other words, in daily circumstances, the word "yes" is less frequently used in reply while the word "yeah" is frequently used in reply. In FIG. 14, the summation of the frequencies (the number of times) of data stored in the reply model storage unit 101 is 1000. If the summation is larger than 1000, the summation may be normalized with 1000, or normalized with any predetermined value, such as 100 and 500. The data structure illustrated in FIG. 14 of the reply model storage unit 101 is an example. The data structure is not limited to the structure illustrated in FIG. 14.

The period detection unit 111 detects an utterance period in which an utterance is made from user voice stream data acquired by the user voice stream data input unit 11. For example, the period detection unit 111 detects an utterance period in each of frames shifted by 32 milliseconds or 24 milliseconds. An exemplary detection method of an utterance period by the period detection unit 111 is described below with reference to FIG. 15. FIG. 15 is a schematic illustrating an exemplary detection method of an utterance period.

As illustrated in FIG. 15, the period detection unit 111 successively estimates estimated background noise power $P_n$ by using input power P to a processed frame, and detects an period $I_1$ as an utterance period. In the period $I_1$, the input power P exceeds the estimated background noise power $P_n$ by a predetermined threshold α or more. The detection method of an utterance period is not limited to the method illustrated in FIG. 15. An utterance period may be detected by using a technique disclosed in Japanese Laid-open Patent Publication No. 07-92989.

Figure 16:
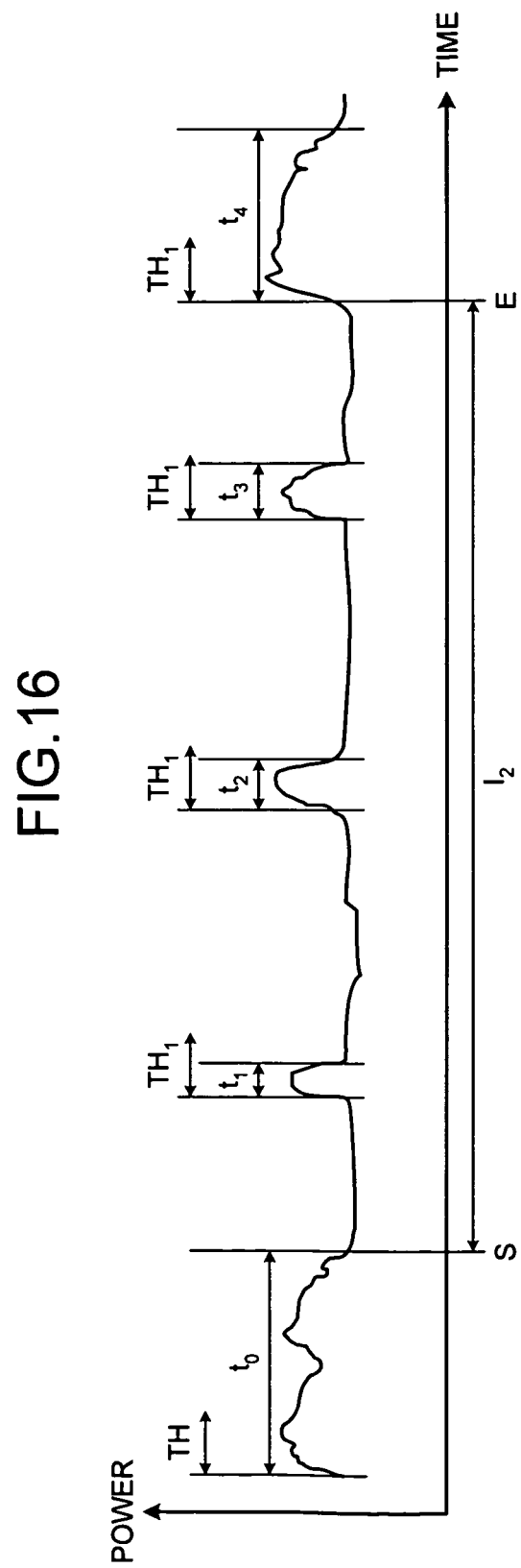
FIG. 16 is a schematic illustrating an exemplary detection method of a reply period.

In addition, the period detection unit 111 detects an period in which utterance periods estimated as replies and having only a short period of time are continuously found as a reply period. An exemplary detection method of a reply period by the period detection unit 111 is described below with reference to FIG. 16. FIG. 16 is a schematic illustrating an exemplary detection method of a reply period. In FIG. 16, period lengths $t_0$ to $t_4$ of the respective utterance periods, and a threshold $TH_1$ for detecting a reply are illustrated.

As illustrated in FIG. 16, the period detection unit 111 sequentially compares the threshold $TH_1$ with each of the period lengths ($t_0$ to $t_4$) of detected utterance periods. As a result of the comparison, if the period length of an utterance period is smaller than the threshold $TH_1$, it is determined that the utterances of the utterance period are replies. For example, in the example illustrated in FIG. 16, the period detection unit 111 determines that the utterance periods of the period lengths $t_0$ and $t_4$ are not replies while the utterance periods respectively having the period lengths $t_0$, $t_2$, and $t_3$ are replies. Then, the period detection unit 111 acquires a starting position S and an ending position E of an period in which utterance periods determined as being replies are continued on a time axis, and outputs the period as a reply period $I_2$. The period detection unit 111 properly updates the starting position S and the ending position E according to whether an utterance period is determined as a reply or no input voice is found (the end of the processed frame).

The state determination unit 112 determines whether a state of a person who makes a reply in a reply period detected by the period detection unit 111 is in a stable state such as daily circumstances or in an unstable state such as unordinary circumstances with reference to data stored in the reply model storage unit 101. For example, the state determination unit 112 carries out voice recognition on an utterance period determined as a reply in a reply period, and recognizes a word uttered as the reply. The state determination unit 112 prepares in advance a set of words used as replies, for example. Then the state determination unit 112 executes voice recognition processing on the set by using an existing voice recognition technique such as a word spotting technique and phoneme recognition processing. Subsequently, the state determination unit 112 determines a state of a person who makes a reply in a reply period by comparing a word of the voice-recognized reply with data of the reply model storage unit 101. For example, the state determination unit 112 determines that a reply is made in an unordinary state if the appearance frequency of the word used in reply is low in the data of the reply model storage unit 101 (e.g., the probability of appearance is smaller than 3%). For example, in the example illustrated in FIG. 14, the state determination unit 112 determines that a person who makes a reply in a reply period is in an unordinary state when the words used in reply are "yes" and "um". The state determination unit 112 determines whether reply is made in an ordinary state or reply is made in an unordinary state, on all of the replies in a reply period. When replies made in an unordinary state are continuously found as replies in the reply period, the state determination unit 112 determines that a person who makes replies in the reply period is in an unordinary state. A condition to determine that a person who makes a reply in a reply period is in an unordinary state can be properly changed and set according to a ratio of replies made in an ordinary state and replies made in an unordinary state in a reply period, for example.

Figure 17:
FIG. 17 is a schematic illustrating an example of updating data of the reply model storage unit.

In addition, the state determination unit 112 updates data of the reply model storage unit 101 according to the above-described determination result. As described above, data stored in the reply model storage unit 101 is produced in an initial stage based on dialogue data of a number of unspecified users in daily circumstances. However, if the data remains unchanged from the initial stage, processing may not carried out according to personal characters, such as mannerisms in making a reply and physiological fluctuation, of a user of the utterance state detection device 1. Therefore, the state determination unit 112 updates data of the reply model storage unit 101, every time when the above-described result is obtained, based on the determination result so that data of the reply model storage unit 101 is customized according to user's characteristics. Updating of data of the reply model storage unit 101 is described below with reference to FIGS. 17 and 18. FIGS. 17 and 18 are schematics illustrating examples of updating data of the reply model storage unit 101.

For example, when it is determined that a person who makes a reply in a reply period is in an ordinary state, the state determination unit 112 updates the appearance frequency and the probability of appearance of a word voice-recognized in the reply period so as to update data of the reply model storage unit 101. For example, let the state determination unit 112 recognize the word "well" six times and the word "ya" ten times in the reply period. In this case, the state determination unit 112 updates the appearance frequency of the word "well" stored in the reply model storage unit 101 from "274 to 280" according to the number of recognition times in the reply period, as illustrated in FIG. 17, for example. Likewise, the state determination unit 112 updates the appearance frequency of the word "ya" stored in the reply model storage unit 101 "from 145 to 155" according to the number of recognition times in the reply period. Subsequently, the state determination unit 112 updates the probability of appearance of the word "well" stored in the reply model storage unit 101 "from 27.4% to 27.6%" according to the updated appearance frequency. Likewise, the state determination unit 112 updates the probability of appearance of the word "ya" stored in the reply model storage unit 101 "from 14.5% to 15.3%" according to the updated appearance frequency. As a result, the state determination unit 112 completes the update processing.

When the summation of the appearance frequencies reaches a certain large number, the state determination unit 112 may normalize data of the reply model storage unit 101 in such a manner that the summation of the appearance frequencies becomes 1000. In other words, the intent of the normalization is to address that an increased number of data stored in the reply model storage unit 101 causes an update processing speed of data to be lowered. For example, as illustrated in FIG. 18, the state determination unit 112 changes the summation of the appearance frequencies stored in the reply model storage unit 101 "from 1016 to 1000", and in accordance with the change, normalizes the appearance frequency of the word "well" "from 280 to 275.6". Meanwhile, in accordance with the change of the summation of the appearance frequencies stored in the reply model storage unit 101 "from 1016 to 1000", the state determination unit 112 normalizes the probability of appearance of the word "well" "from 27.6 to 27.56". Likewise, as illustrated in FIG. 18, the state determination unit 112 normalizes the appearance frequency of the word "ya" "from 155 to 152.6" in accordance with the changes of the summation of the appearance frequencies stored in the reply model storage unit 101 "from 1016 to 1000". Meanwhile, the state determination unit 112 normalizes the probability of appearance of the word "ya" "from 15.3 to 15.26" in accordance with the change of the summation of the appearance frequencies stored in the reply model storage unit 101 "from 1016 to 1000".

The total determination unit 200 comprehensively determines a state of a person who is a user of the utterance state detection device 1 and makes a reply in a reply period by using a determination result of the sound abnormality determination unit 10 corresponding to the first to the fourth embodiments and a determination result of the state determination unit 112. For example, the total determination unit 200 determines that a user is in an unordinary state when both of the determination results of the sound abnormality determination unit 10 and the state determination unit 112 show that the user is in an unordinary state. Alternatively, the total determination unit 200 may determine that a user is in an unordinary state when a determination result of either the sound abnormality determination unit 10 or the state determination unit 112 shows that the user is in an unordinary state. Furthermore, when the determination results of the sound abnormality determination unit 10 and the state determination unit 112 are numerically converted into probability values, for example, the total determination may be made by comparing the weighted average of the probability values with a predetermined threshold.

[5-2. Hardware Structure]

Figure 19:
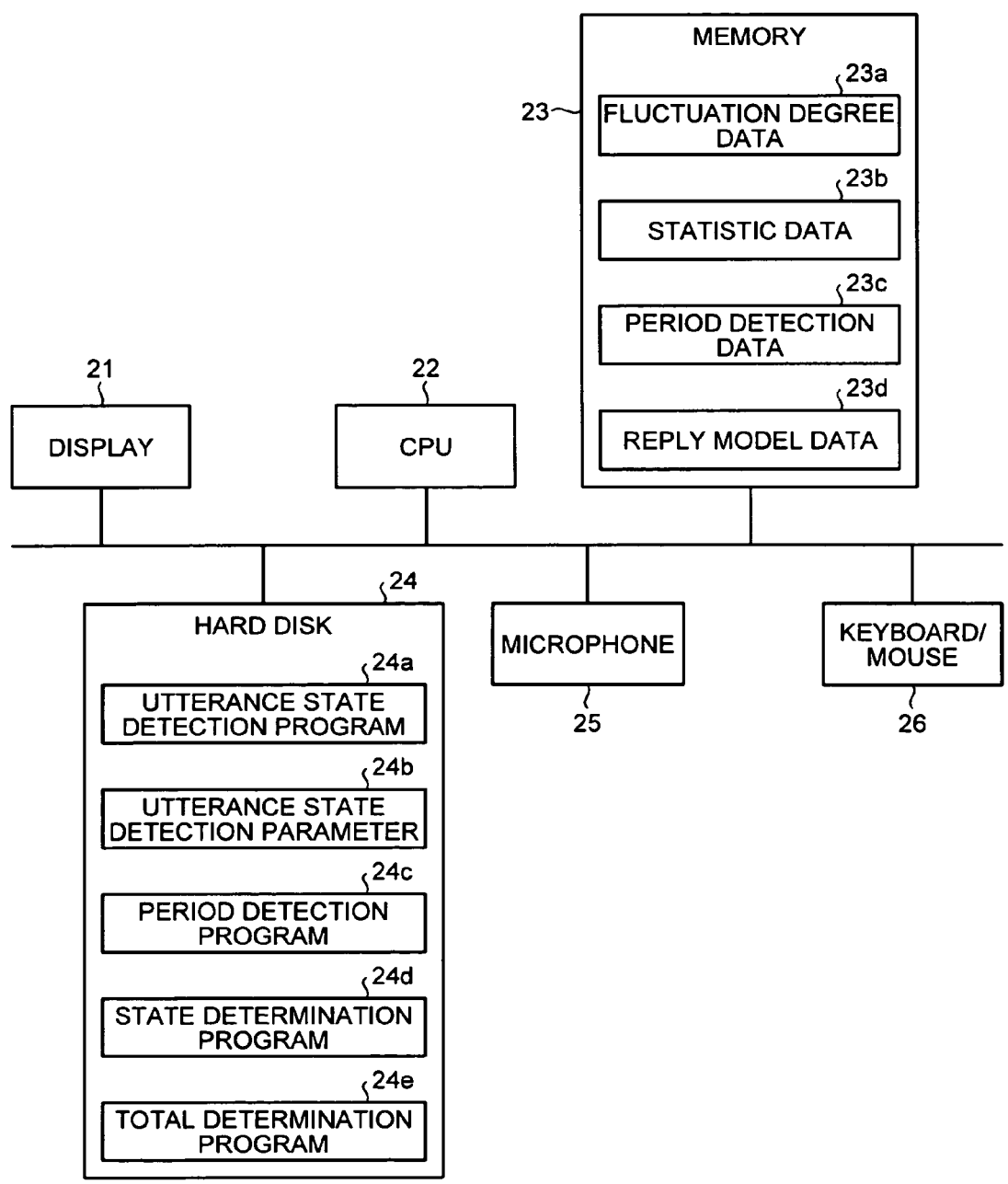
FIG. 19 is a schematic illustrating an exemplary hardware structure of the utterance state detection device 1 of the fifth embodiment realized by using a computer.

FIG. 19 is a schematic illustrating an exemplary hardware structure of the utterance state detection device 1 of the fifth embodiment realized by using a computer. The hardware structure of the utterance state detection device 1 of the fifth embodiment is basically the same as those of the above-described embodiments, but differs from those in the following points. In the same manner as the above-described embodiments, any device including another processor (e.g., MPU) or ICs (e.g., ASIC) may be used instead of the CPU 22. The utterance state detection device 1 may be realized by using electronic equipment such as a cell-phone and a smart-phone.

The utterance state detection device 1 includes at least the display 21, the CPU 22, the memory 23, the hard disk 24, the microphone 25, and the keyboard/mouse 26 in the same manner as the above-described embodiments. However, the following points are different from the above-described embodiments. The hard disk 24 additionally stores therein an period detection program 24c, a state determination program 24d, and a total determination program 24e. The memory 23 temporarily stores therein period detection data 23c and reply model data 23d when the CPU 22 executes processing according to the period detection program 24c or the total determination program 24e.

The processing functions of the period detection unit 111 and the state determination unit 112 included in the state detection unit 100 of the utterance state detection device 1 illustrated in FIG. 13 are realized by the period detection program 24c and the state determination program 24d that are executed by the CPU 22. In addition, the processing function of the total determination unit 200 of the utterance state detection device 1 illustrated in FIG. 13 is realized by the total determination program 24e executed by the CPU 22.

Processing based on the period detection program 24c and the state determination program 24d is described below. The period detection program 24c can cause the CPU 22 to execute utterance period detection processing to detect an utterance period from user voice stream data or reply period detection processing to detect an period in which replies are continued in an utterance period as a reply period. The above-described state determination program 24d can cause the CPU 22 to execute state determination processing to determine a state of a person who makes a reply in a detected reply period.

[5-3. Utterance Period Detection Processing]

Figure 20:
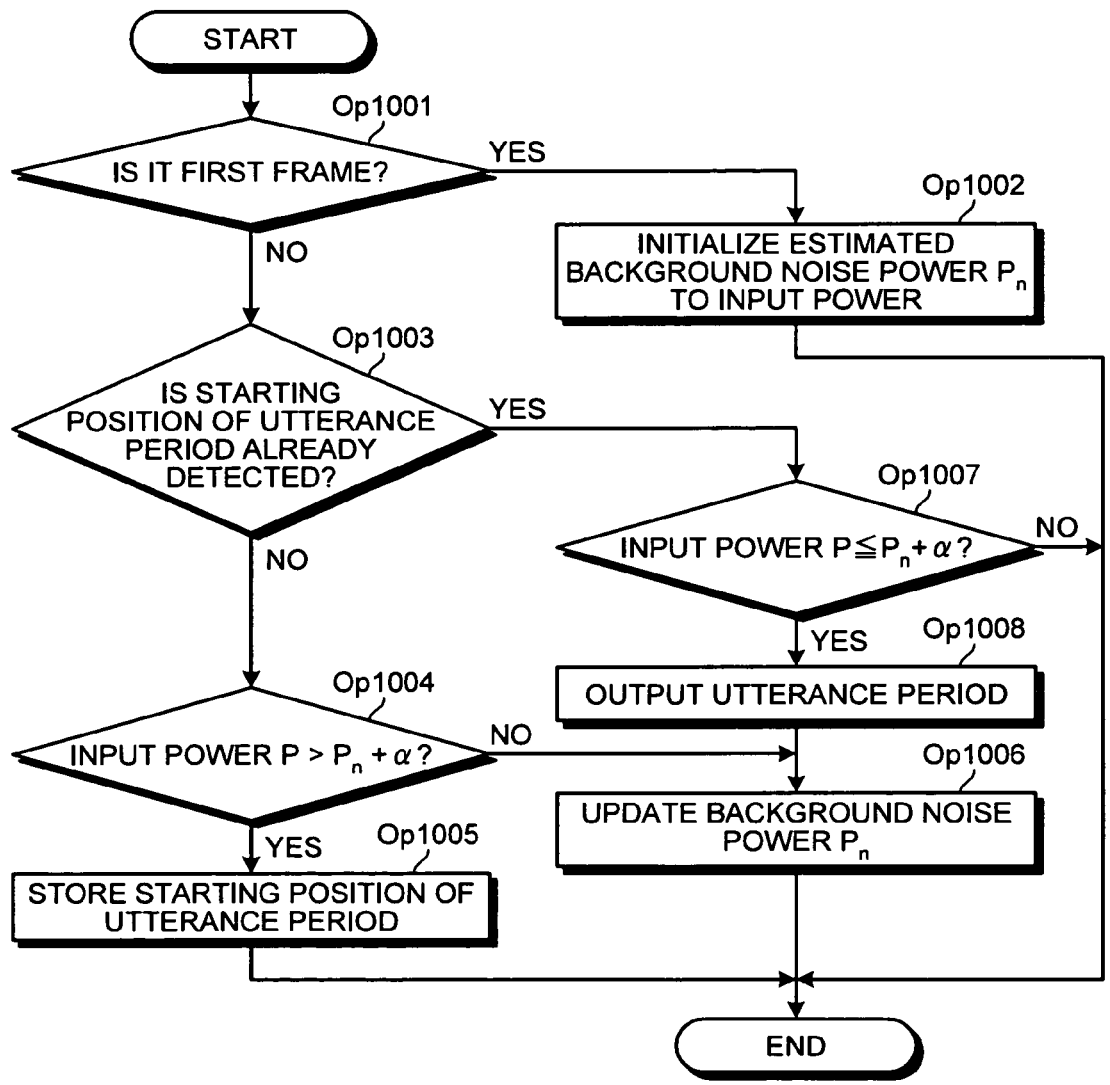
FIG. 20 is an exemplary operational chart of utterance period detection processing by an period detection program 24c.

FIG. 20 is an exemplary operational chart of the utterance period detection processing by the period detection program 24c. The processing illustrated in FIG. 20 is executed, every input frame, on user voice stream data frames shifted by 32 milliseconds or 24 milliseconds.

As illustrated in FIG. 20, the CPU 22 that executes the utterance period detection processing determines whether an input frame of acquired user voice stream data is the first frame (Op 1001). If the frame of the acquired user voice stream data is the first frame (Yes at Op 1001), the CPU 22 initializes the estimated background noise power $P_n$ to input power P (Op 1002), and ends the processing of the current input frame.

In contrast, if the input frame of the acquired data is not the first frame (No at Op 1001), the CPU 22 determines whether a starting position of an utterance period is already detected (Op 1003). If the starting position of the utterance period is not detected (No at Op 1003), the CPU 22 determines whether the input power P>the estimated background noise power $P_n$+the threshold α (Op 1004). If the input power P>the estimated background noise power $P_n$+the threshold α (Yes at Op 1004), the CPU 22 stores the starting position of the utterance period (in the memory 23) (Op 1005), and then ends the processing of the current input frame. For example, the CPU 22 prepares a flag indicating that the starting position of the utterance period is already detected. In contrast, if it is not satisfied that the input power P>the estimated background noise power $P_n$+the threshold α (No at Op 1004), the CPU 22 updates the estimated background noise power $P_n$ to the input power P of the input frame (Op 1006), and ends the processing of the current input frame.

If a starting position of an utterance period is already detected (Yes at Op 1003), the CPU 22 determines whether the input power P≤the estimated background noise power $P_n$+the threshold α (Op 1007). If the input power P≤the estimated background noise power $P_n$+the threshold α (Yes at Op 1007), the CPU 22 outputs the utterance period (Op 1008). Then, the processing proceeds to Op 1006, at which the CPU 22 updates the estimated background noise power $P_n$ to the input power P of the input frame, and the CPU 22 ends the processing of the current input frame. In contrast, if it is not satisfied that the input power P≤the estimated background power noise $P_n$+the threshold α (No at Op 1007), the CPU 22 ends the processing of the current input frame without carrying out any processing.

[5-4. Reply Period Detection Processing]

Figure 21:
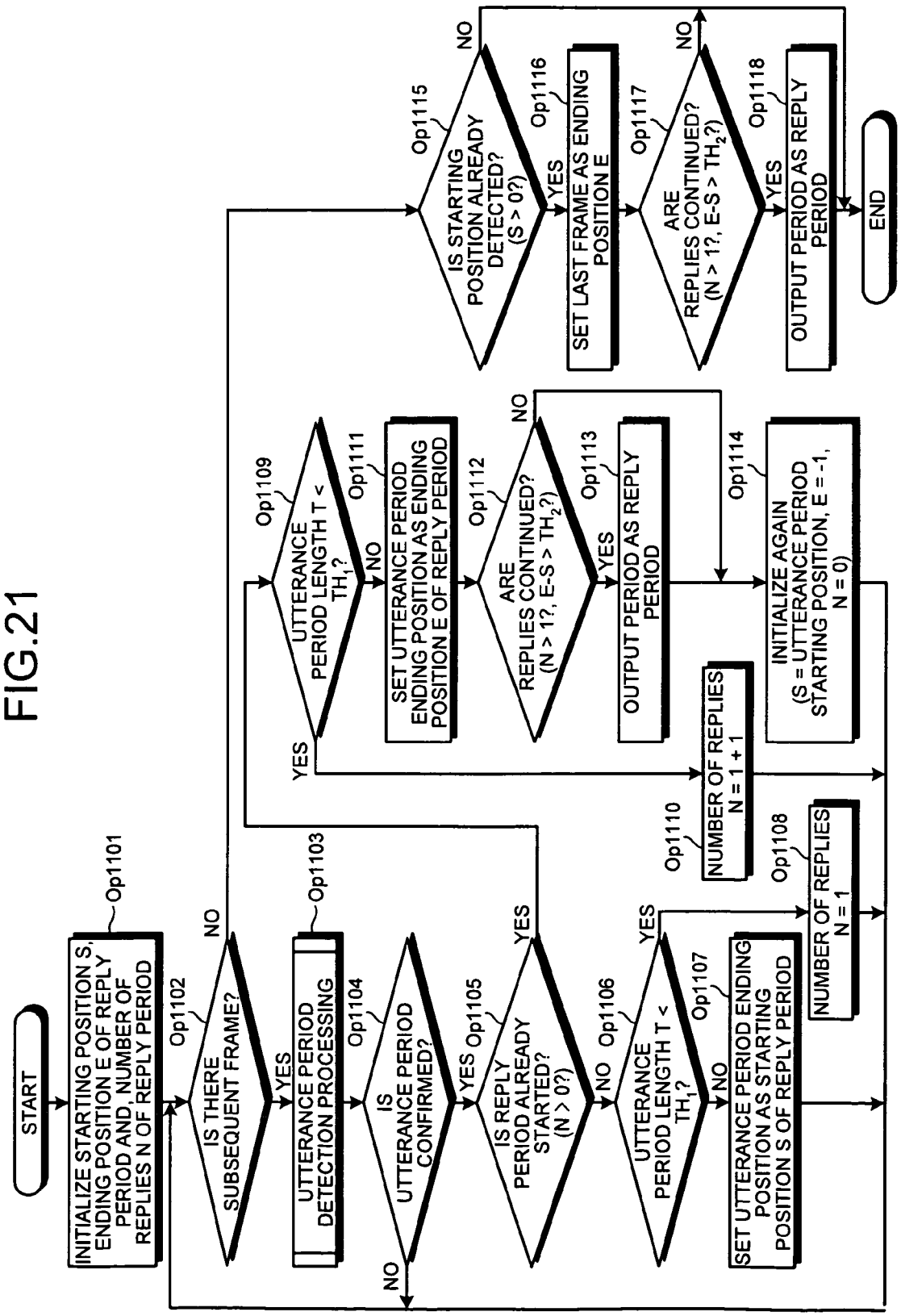
FIG. 21 is an exemplary operational chart of reply period detection processing by the period detection program 24c.

FIG. 21 is an exemplary operational chart of reply period detection processing by the period detection program 24c. The processing illustrated in FIG. 21 is executed, every input frame, on user voice stream data frames shifted by 32 milliseconds or 24 milliseconds.

As illustrated in FIG. 21, the CPU 22 that executes the reply period detection processing initializes the starting position S, the ending position E, and the number of replies N of a reply period (Op 1101). For example, the CPU 22 initializes the starting position S, the ending position E, and the number of replies N to S=0, E=−1, and N=0. Subsequently, the CPU 22 determines whether there is a subsequent input frame of user voice stream data (Op 1102). If there is a subsequent frame (Yes at Op 1102), the CPU 22 executes the above-described utterance period detection processing illustrated in FIG. 20 (Op 1103), and determines whether an utterance period is confirmed (Op 1104). For example, the CPU 22 determines whether the utterance period has been output as illustrated at Op 1008 of FIG. 20.

If the utterance period is confirmed (Yes at Op 1104), the CPU 22 determines whether a period handled as a reply period is already started (Op 1105). For example, the CPU 22 determines whether the number of replies N is one or larger (N>0). If an period handled as a reply period has not started (No at Op 1105), the CPU 22 determines whether a period length t of the utterance period is smaller than the threshold $TH_1$ (Op 1106). If the period length t of the utterance period is not smaller than the threshold $TH_1$ (No at Op 1106), the CPU 22 determines that user voice stream data of the current input frame is not a reply, and sets the ending position of the utterance period of the current input frame as the starting position S of the period handled as the reply period (Op 1107). For example, the CPU 22 sets the ending position of the utterance period having the period length $t_0$ as the starting position S of the period handled as the reply period. Thereafter, the processing returns to Op 1102, at which the CPU 22 determines whether there is a subsequent frame. In contrast, if the period length t of the utterance period is smaller than the threshold $TH_1$ (Yes at Op 1106), the CPU 22 determines that user voice stream data of the current input frame is a reply, sets the number of replies N to one (Op 1108), and determines whether there is a subsequent frame at Op 1102 after the processing returns to Op 1102.

If the reply period has stated (Yes at Op 1105), the CPU 22 determines whether the period length t of the utterance period is smaller than the threshold $TH_1$ (Op 1109), in the same manner as Op 1105. If the period length t of the utterance period is smaller than the threshold $TH_1$ (Yes at Op 1109), the CPU 22 determines that user voice stream data of the current input frame is a reply, sets the number of replies N to N+1 (Op 1110), and determines whether there is a subsequent frame at Op 1102 after the processing returns to Op 1102. In other words, at Op 1110, the number of replies N is incremented by one every time when as long as an utterance period of an period handled as a reply period is estimated as a reply.

In contrast, if the period length t of the utterance period is not smaller than the threshold $TH_1$ (No at Op 1109), the CPU 22 sets the starting position of the utterance period as the ending position E of the reply period (Op 1111). For example, the CPU 22 sets the starting position of the utterance period having the period length $t_4$ illustrated in FIG. 16 as the ending position E of the reply period. In other words, the reply period is confirmed by the processing at Op 1111.

Subsequently, the CPU 22 determines whether replies are continued in the period handled as the reply period (Op 1112). For example, the CPU 22 determines whether the number of replies N in the period handled as the reply period is larger than one (N>1), and the ending position E of the period handled as the reply period minus the starting position S of the period handled as the reply period is larger than $TH_2$. The reason why that the ending position E of the period handled as the reply period minus the starting position S of the period handled as the reply period is larger than $TH_2$ is taken into consideration is to eliminate, from a dialogue such as a call, an period in which a continuous reply such as "yes, yes" is made, for example. In other words, the intent is to eliminate an period in which replies superficially seem to continue due to mannerisms of a user in making a reply. Here, $TH_2$ is a predetermined period of time.

If replies are continued in the period handled as the reply period (Yes at Op 1112), the CPU 22 outputs the period as the reply period (Op 1113). For example, the CPU 22 outputs the period defined by the starting position S set at Op 1107 and the ending position E set at Op 1111 as the reply period. Subsequently, the CPU 22 initializes the starting position S, the ending position E, and the number of replies N of the reply period again (Op 1114), and determines whether there is a subsequent frame at Op 1102 after the processing returns to Op 1102.

If replies are not continued in the period handled as the reply period (No at Op 1112), the processing by the CPU 22 proceeds to Op 1114 without any processing. In other words, the above-described processing from Op 1102 to Op 1114 is based on an assumed situation in which an utterance, a reply, and an utterance are repeated in this order. In the processing, a reply period is sequentially detected in a dialogue.

If there is no subsequent frame (No at Op 1102), the CPU 22 determines whether the starting position S of the period handled as the reply period is already detected (Op 1115). For example, the CPU 22 determines whether S>0. If the starting position S of the period handled as the reply period is not yet detected (No at Op 1115), the CPU 22 determines that an utterance alone is made in a dialogue such as a call and no reply is made in the period, and ends the processing without carrying out processing. In contrast, if the starting position S of the period handled as the reply period is already detected (Yes at Op 1115), the CPU 22 sets the current input frame serving as the last frame (the end position of the last frame) as the ending position E of the period handled as the reply period (Op 1116).

Subsequently, the CPU 22 determines whether replies are continued in the period handled as the reply period in the same manner as Op 1112 (Op 1117). If replies are continued in the period handled as the reply period (Yes at Op 1117), the CPU 22 outputs the period as the reply period (Op 1118), and ends the processing. In contrast, if replies are not continued in the period handled as the reply period (No at Op 1117), the CPU 22 ends the processing without carrying out processing. In other words, processing from Op 1115 to Op 1118 is based on an assumed situation in which a dialogue such as a call ends in such a manner that an utterance is made and a reply is made corresponding to the utterance. In the processing, a reply period is detected in the dialogue.

[5-5. Effects of the Fifth Embodiment]

As described above, the state detection unit 100 of the utterance state detection device 1 detects an utterance period from user voice stream data and an period in which utterance periods estimated as replies and having only a short period of time are continued as a reply period. The state detection unit 100 verifies whether a word used in the reply period is frequently used in daily circumstances, with reference to data of the reply model storage unit 101. As a result of the verification, if the word is not frequently used in daily circumstances, the state detection unit 100 determines that a state of a person (a user of the utterance state detection device 1) who makes a reply in the reply period is in an unstable state such as unordinary circumstances. According to the fifth embodiment as described above, a state of a user can be determined from user voice stream data alone even if little user voice stream data is available to be acquired such as case where replies alone are continuously made and a state of the user is hardly determined by the first to the fourth embodiments.

In the above-described fifth embodiment, a case may occur in which a voice recognition score of a word used in reply differs depending on a physiological state of a person who makes a reply. For example, a voice recognition score may be higher than that in usual circumstances (daily circumstances) as a result of a clear phonation forcefully uttered than usual due to stresses. In contrast, a voice recognition score may be lower than that in usual circumstances as a result of an unclear phonation than usual due to a distracted state caused by stresses such as worries. Taking such a situation into consideration, a state of a person who makes a reply in a reply period can be determined with reference to a reply model as which a voice recognition score in a psychologically stable state such as daily circumstances is stored. An example of the embodiment in this case is described below.

The reply model storage unit 101 stores therein in advance a statistic such as an average, a variance, a maximum, and a minimum as a reply model when a reply made in daily circumstances is voice-recognized, for example. The state determination unit 112 compares a recognition score of a word (vocabulary) used in a reply period with the reply model. As a comparison result, if the recognition score of the word used in the reply period is in a rare range as compared with the reply model, e.g., in a range beyond ± one variance from an average, the state determination unit 112 determines that a person who makes a reply is in unordinary circumstances.

Alternatively, the reply model storage unit 101 stores therein in advance data that there is a difference of 10 scores or more, for example, between the recognition scores of a first-place word and a second-place word of a recognition result. The state determination unit 112 calculates a difference in score between the recognition scores of the first-place word and the second-place word of the recognition result of words used in the reply period, and compares the score difference with the data of the reply model storage unit 101. As a comparison result, if there is a large difference between the data of the reply model storage unit 101 and the score difference, e.g., a difference equal to a predetermined threshold or larger, the state determination unit 112 determines that a person who kames a reply is in unordinary circumstances.

6. Sixth Embodiment

In the above-described fifth embodiment, a state of a user is determined by verifying whether a word used in a reply period is frequently used in daily circumstances with reference to data of the reply model storage unit 101. In the fifth embodiment, a state of a user can be determined by using a reply period length, a length between replies in a reply period, a total reply period length, and a ratio of the total reply period length to a call duration, for example. In a sixth embodiment described below, processing is described in which a state of a user is determined by using a reply period length, a length between replies in an reply period, a total reply period length, and a ratio of the total reply period length to a call duration.

[6-1. Functional Blocks]

The functional blocks of the utterance state detection device 1 of the sixth embodiment has basically the same structure as the fifth embodiment illustrated in FIG. 13, but differs in the following points. The hardware structure of the utterance state detection device 1 of the sixth embodiment has the same as that of the fifth embodiment.

FIG. 22 is a schematic illustrating exemplary data stored in the reply model storage unit of the sixth embodiment. As illustrated in FIG. 22, the reply model storage unit 101 stores therein an average $\mu$ and a standard deviation $\sigma$ of each of a reply period length, a length between replies, a total reply period length, and a ratio of the total reply period length to a call duration (hereinafter, referred to as a reply duration ratio) of a user. The unit of the average $\mu$ is second. The reply period length represents a length (duration) of each reply period. The length between replies represents a length (duration) of each reply in a reply period. The total reply period length represents a summation of lengths (durations) of reply periods detected in a dialogue such as a call. The reply duration ratio represents a ratio of the total reply period length (duration) to a call duration of a dialogue such as a call.

The data of the reply model storage unit 101 illustrated in FIG. 22 is produced by extracting information on a duration of a reply from dialogue data generated by a number of unspecified users in daily circumstances in the same manner as the fifth embodiment. For example, data of each of four elements, i.e., the reply period length, the length between replies, the total reply period length, and the reply duration ratio, is calculated by using information on a duration of a reply extracted from dialogue data generated in daily circumstances. Subsequently, an average $\mu$ and a standard deviation $\sigma$ of each element is calculated on an assumption that data of four elements are represented by a normal distribution so as to produce the data of the reply model storage unit 101 illustrated in FIG. 22.

The state determination unit 112 determines a state of a user as follows. When a total reply period length H of a call is calculated, it is determined that a user is in an unordinary state if each element of the reply model storage unit 101 satisfies the relationship of the total reply period length H>average μ+standard deviation σ.

In addition, the state determination unit 112 updates data of the reply model storage unit 101 according to the above-described determination result. For example, when determining that a user is in an ordinary state, the state determination unit 112 stores therein information such as the reply period length, the length between replies, the total reply period length, and the call duration as statistical data for each call. Subsequently, the state determination unit 112 calculates a normal distribution from statistical data of 100 calls every collection of statistical data of 100 calls. The calculation of an average and a variation means that the statistical data is assumed as being expressed by a normal distribution. Then, the state determination unit 112 updates data of the reply model storage unit 101 by weighted-adding a normal distribution of the statistical data of 100 calls to a normal distribution of data stored in the reply model storage unit 101 with a ratio of 9:1. For example, as illustrated in FIG. 23, the state determination unit 112 updates data stored in the reply model storage unit 101. FIG. 23 is a schematic illustrating an exemplary update of data stored in the reply model storage unit of the sixth embodiment.

The total determination unit 200 acquires a call abnormal degree (unordinary degree) R calculated by the sound abnormality determination unit 10 corresponding to the first to the fourth embodiments. For example, a statistic of an input voice of a user of the utterance state detection device 1 is used as the call abnormal degree R. The statistic is calculated by the sound abnormality determination unit 10 with a predetermined parameter. The total determination unit 200 can calculate a total abnormal degree $R_t$ by formula (1) with the call abnormal degree R.

Total abnormal degree $R_t$=call abnormal degree $R*+$
$(1+Th*0.1),(0<Th)$ or

Total abnormal degree $R_t$=call abnormal degree $R*1.0,$
$(0 \geq Th)$     (1)

where $Th=(H-\mu)/\sigma$.

Alternatively, the total determination unit 200 may calculate the total abnormal degree $R_t$ by formula (2).

Total abnormal degree $R_t$=call abnormal degree $R*(1+Th2*0.1),(0<Th)$ or

Total abnormal degree $R_t$=call abnormal degree $R*1.0,$
$(0 \geq Th)$     (2)

Here, Th2 is calculated by initial values of average μ (μ') and standard deviation σ (σ') of the reply model storage unit 101 before being updated as follows. $Th2=(H-\mu'*2)/\sigma'$.

[6-2. Effects of the Sixth Embodiment]

According to the sixth embodiment as described above, a state of a user can be determined based on parameters including the reply period length, the length between replies, the total reply period length, and the reply duration ratio besides a word used in a reply period. Furthermore, according to the sixth embodiment, a state of a user can be determined by further reducing processing load than that of the fifth embodiment because recognition processing on a word used in a reply period is not executed.

7. Seventh Embodiment

For example, when a user is in a dialogue intending to lead a user into a fraud such as a so-called "billing fraud", the user is likely to be a repressed physiological state. The use of the above-described embodiments can detect a call intending to lead a user into a fraud if it is determined that the user is in an unordinary state such as a suppressed physiological state. However, the above-described embodiments may detect a call other than a call intending to lead a user into a fraud as a call relating to a fraud because an user is likely to be in a suppressed physiological state by a call other than a call intending to lead the user into a fraud. In a seventh embodiment, processing to detect a call intending to lead a user into a fraud with high accuracy is described below.

[7-1. Functional Blocks]

Figure 24:
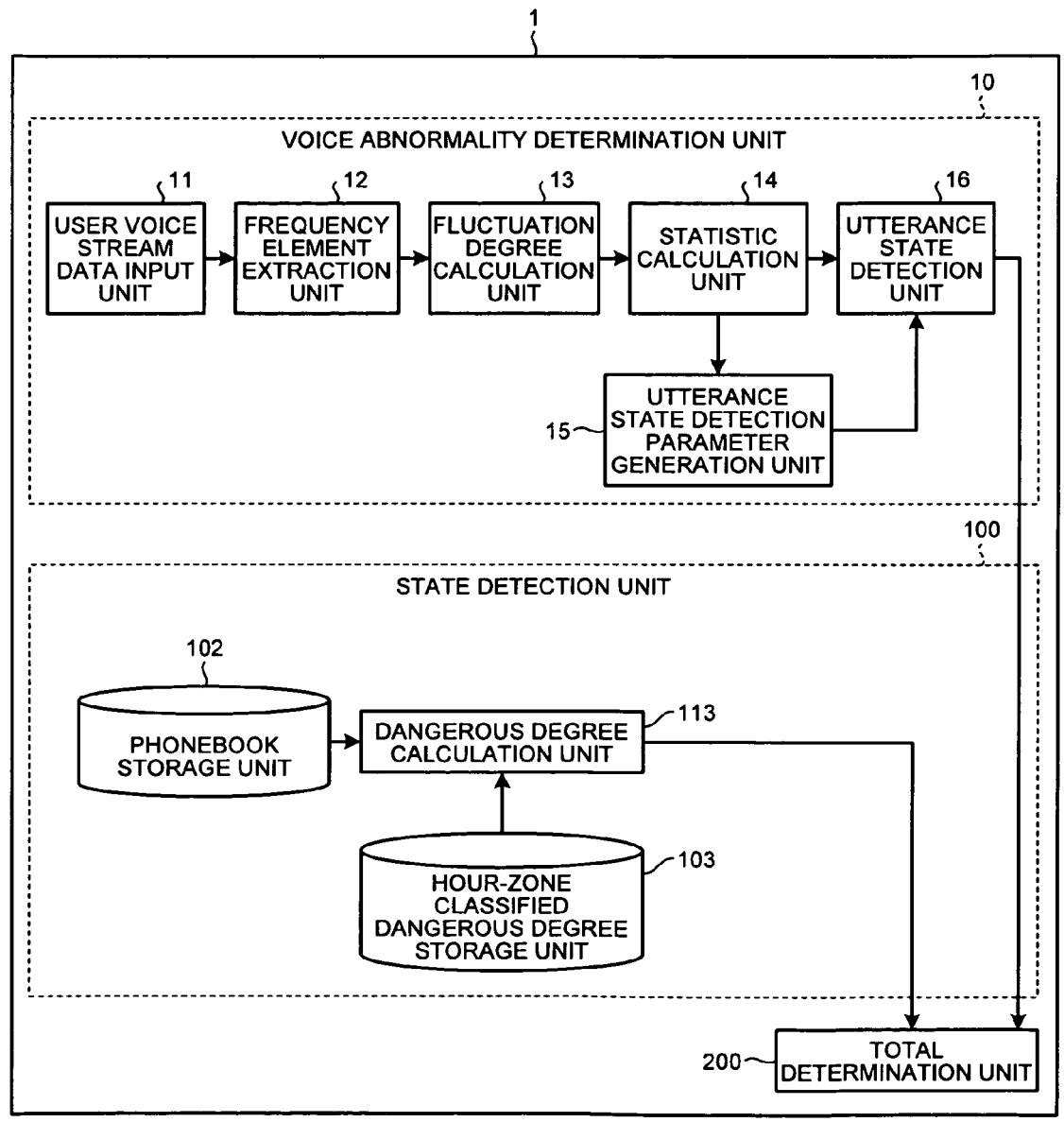
FIG. 24 is a schematic illustrating exemplary functional blocks of the utterance state detection device 1 according to a seventh embodiment.

FIG. 24 is a schematic illustrating exemplary functional blocks of the utterance state detection device 1 of the seventh embodiment. The utterance state detection device 1 according to the seventh embodiment differs from those in the above-described embodiments in that the state detection unit 100 includes a phonebook storage unit 102, an hour-zone classified dangerous degree storage unit 103, and a dangerous degree calculation unit 113. In FIG. 24, the state detection unit 100 may include the reply model storage unit 101, the period detection unit 111, and the state determination unit 112 that are described in the above-described embodiments.

A user of the utterance state detection device 1 of the seventh embodiment stores phonebook data in the phonebook storage unit 102. In the phonebook data, the names and the telephone numbers of other users whom the user of the utterance state detection device 1 makes a call correspond to each other. FIG. 25 is a schematic illustrating exemplary data stored in the phonebook storage unit of the seventh embodiment. As illustrated in FIG. 25, the phonebook storage unit 102 stores therein the names, the reading of the names, the telephone numbers, and the registered dates so as to correspond to each other. For example, as illustrated in FIG. 25, the phonebook storage unit 102 stores therein the name "Taro Tokkyo" (written in Kanji characters), the reading of the name "Taro Tokkyo", the telephone number "044-def-ghij", and the registered data "2000,01,15" so as to correspond to each other. Data stored in the phonebook storage unit 102 is referred to when processing to calculate a dangerous degree of a caller is executed, which is described later. The data structure illustrated in FIG. 25 of the phonebook storage unit 102 is an example. The data structure is not limited to the structure illustrated in FIG. 25.

The hour-zone classified dangerous degree storage unit 103 stores therein information indicating a dangerous degree of a call intending to lead a user into a fraud for each hour-zone in which a call is made for weekday and holiday, for example. FIGS. 26 and 27 are schematics illustrating exemplary data stored in the hour-zone classified dangerous degree storage unit of the seventh embodiment. As illustrated in FIG. 26, the hour-zone classified dangerous degree storage unit 103 stores therein dangerous degrees of making a call intending to lead a user into a fraud in each hour-zone for holiday. For example, as illustrated in FIG. 26, the hour-zone classified dangerous degree storage unit 103 stores therein the dangerous degree of "10%" corresponding to the hour-zone of "07:00 to 17:00". The hour-zone classified dangerous degree storage unit 103 stores therein dangerous degrees of making a call intending to lead a user into a fraud in each hour-zone for weekday. For example, as illustrated in FIG. 27, the hour-zone classified dangerous degree storage unit 103 stores therein the dangerous degree of "100%" corresponding to the hour-zone of "10:00 to 15:00".

As illustrated in FIG. 26, the dangerous degrees are low as a whole in holiday regardless of hour-zones. In contrast, as illustrated in FIG. 27, the highest dangerous degree is found in the hour-zone of "10:00 to 15:00" in weekday. In other words, the dangerous degree becomes the highest in hour-zone of "10:00 to 15:00" in weekday in which financial institutions are available because when a user is highly likely to use a financial institution when being involved in a fraud. Data stored in the hour-zone classified dangerous degree storage unit 103 is referred to when processing to calculate a dangerous degree of date and hour in which a call is made is executed, which is described later. The data structures illustrated in FIGS. 26 and 27 of the hour-zone classified dangerous degree storage unit 103 are examples. The data structure is not limited to the structures illustrated in FIGS. 26 and 27.

The dangerous degree calculation unit 113 calculates a dangerous degree that a call currently being made is a call intending to lead a user into a fraud with reference to data of the phonebook storage unit 102 and data of the hour-zone classified dangerous degree storage unit 103. Processing carried out by the dangerous degree calculation unit 113 is described later with reference to FIGS. 30 to 32.

The total determination unit 200 comprehensively determines a possibility that a user is involved in a fraud by using the abnormal degree R calculated by the sound abnormality determination unit 10 and a dangerous degree calculated by the dangerous degree calculation unit 113. A statistic of an input voice of a user of the utterance state detection device 1 is used as the abnormal degree R. The statistic is calculated by the sound abnormality determination unit 10 with a predetermined parameter in the same manner as the first embodiment. Processing carried out by the total determination unit 200 is described later with reference to FIG. 29. When the state detection unit 100 includes the state determination unit 112 described in the fifth embodiment, the total determination unit 200 comprehensively determines possibility that a user is involved in a fraud by adding a determination result of the state determination unit 112.

[7-2. Hardware Structure]

Figure 28:
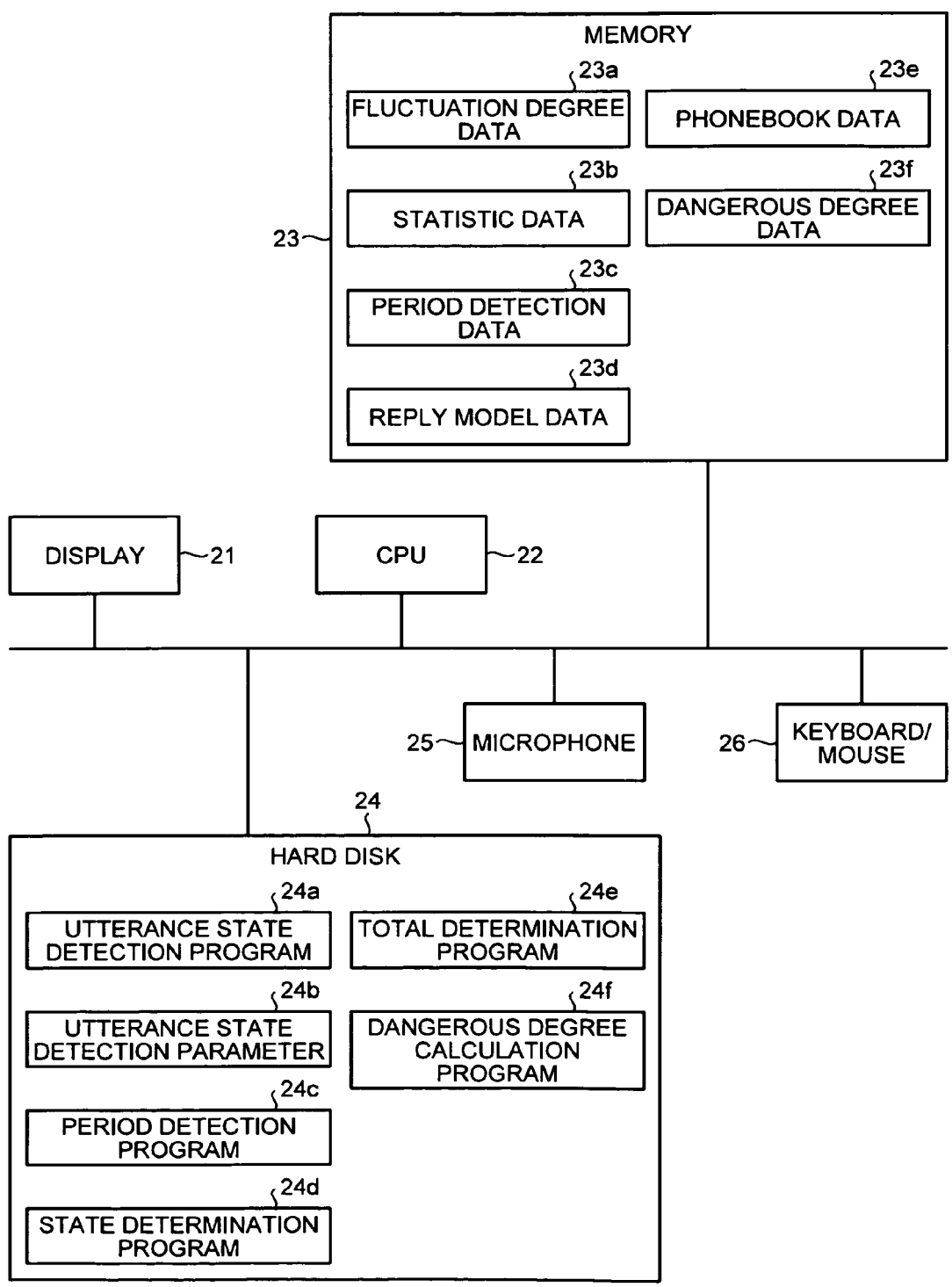
FIG. 28 is a schematic illustrating an exemplary hardware structure of the utterance state detection device 1 of the seventh embodiment realized by using a computer.

FIG. 28 is a schematic illustrating an exemplary hardware structure of the utterance state detection device 1 of the seventh embodiment realized by using a computer. The hardware structure of the utterance state detection device 1 of the seventh embodiment is basically the same as those of the above-described embodiments, but differs from those in the following points. In the same manner as the above-described embodiments, any device including another processor (e.g., MPU) or ICs (e.g., ASIC) may be used instead of the CPU 22. The utterance state detection device 1 of the seventh embodiment is structured by using at least electronic equipment having a telephone function capable of making a call. For example, electronic equipment such as a cell-phone, a smart-phone, and a personal handy-phone system (PHS) can be used.

The utterance state detection device 1 includes at least the display 21, the CPU 22, the memory 23, the hard disk 24, the microphone 25, and the keyboard/mouse 26 in the same manner as the above-described embodiments. However, the following points are different from the above-described embodiments. The hard disk 24 additionally records a dangerous degree calculation program 24f. The memory 23 temporarily stores therein phonebook data 23e and dangerous degree data 23f when the CPU 22 executes processing based on the dangerous degree calculation program 24f, for example. In FIG. 28, the period detection data 23c and the reply model data 23d are stored in the memory 23. The period detection data 23c and the reply model data 23d, however, are not indispensable to processing that is executed by the utterance state detection device 1 and described below with reference to FIGS. 29 to 34. In contrast, the period detection data 23c stored in the memory 23 is usable in processing described below with reference to FIGS. 35 and 36. In other words, the hardware structure of the utterance state detection device 1 illustrated in FIG. 28 corresponds to a structure when a state of a user is determined comprehensively taking into consideration the determination result on a user's state by the fifth embodiment and a result of determination described below with reference to FIGS. 29 to 37.

The processing function of the dangerous degree calculation unit 113 included in the state detection unit 100 of the utterance state detection device 1 illustrated in FIG. 24 is realized by the dangerous degree calculation program 24f executed by the CPU 22.

The overall flow of the processing by the utterance state detection device 1 according to the seventh embodiment is described first, and thereafter the processing based on the dangerous degree calculation program 24f is described. The dangerous degree calculation program 24f enables the CPU 22 to execute processing to calculate a dangerous degree of a caller and processing to calculate a dangerous degree of call date and time.

[7-3. Overall Flow of Processing]

Figure 29:
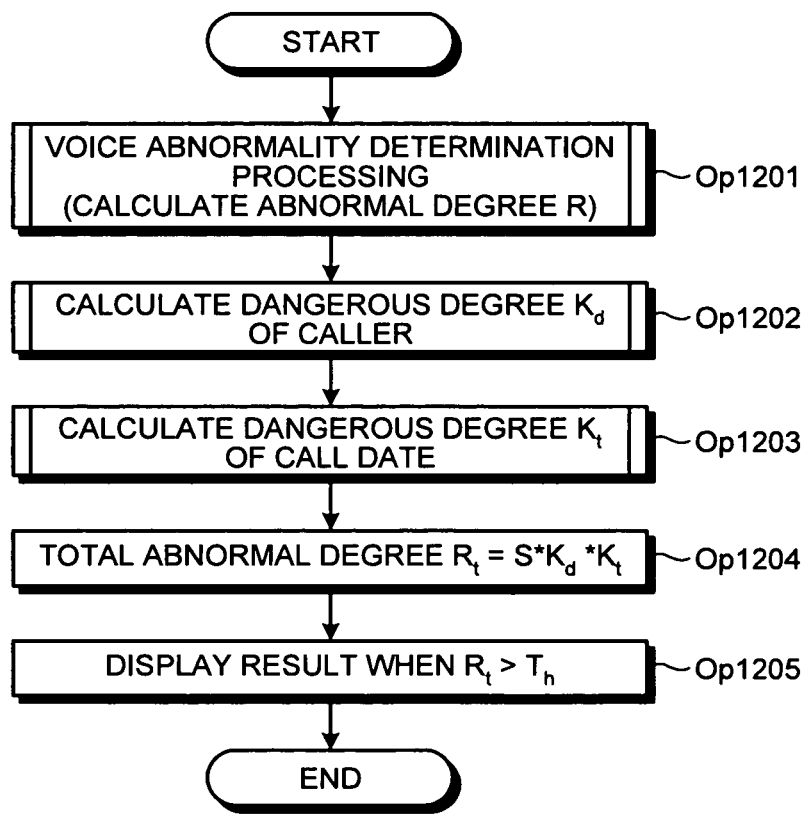
FIG. 29 is a flowchart illustrating an overall processing flow by the utterance state detection device according to the seventh embodiment.

FIG. 29 is a flowchart illustrating the processing by the utterance state detection device 1 according to the seventh embodiment. The processing by the utterance state detection device 1 according to the seventh embodiment is executed from a start to an end of a call.

As illustrated in FIG. 29, the sound abnormality determination unit 10 of the utterance state detection device 1 executes the voice abnormality determination processing corresponding to the first to the fourth embodiments until the end of a call, and calculates the abnormal degree R (Op 1201). Subsequently, the dangerous degree calculation unit 113 of the state detection unit 100 executes processing to calculate a dangerous degree of a caller so as to calculate a dangerous degree $K_d$ (Op 1202). Then, the dangerous degree calculation unit 113 of the state detection unit 100 executes processing to calculate a dangerous degree of a call time so as to calculate a dangerous degree $K_t$ (Op 1203). The total determination unit 200 calculates the total abnormal degree $R_t$ by using the abnormal degree R calculated by the sound abnormality determination unit 10, the dangerous degrees $K_d$ and $K_t$ that are calculated by the dangerous degree calculation unit 113 (Op 1204). For example, the total determination unit 200 calculates the total abnormal degree $R_t$ by multiplying the abnormal degree R by the dangerous degrees $K_d$ and $K_t$. The total determination unit 200 compares the total abnormal degree $R_t$ with a predetermined threshold ($T_h$), if the total abnormal degree $R_t$ is larger than the predetermined threshold, determines that a user is highly likely involved in a fraud, and provides a warning message to the user (Op 1205). For example, the total determination unit 200 outputs a warning message through a speaker, for example, at any operation timing such as the end of or during of a call so as to warn a user. Alternatively, the total determination unit 200 may output an alarm through a speaker, for example, or notify a registered destination registered by a user of a warning.

[7-4. Processing to Calculate Dangerous Degree of Caller]

Figure 30:
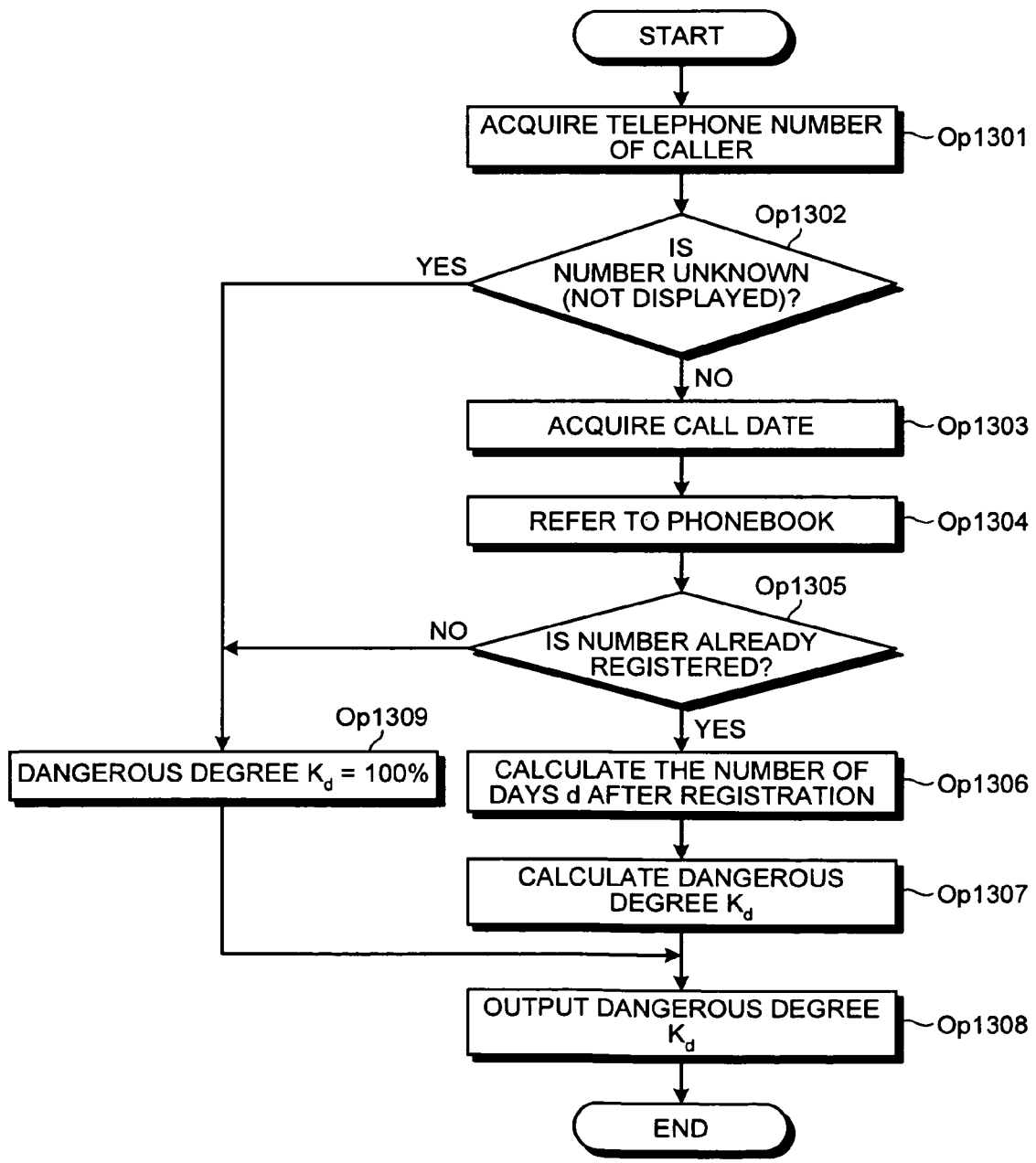
FIG. 30 is an exemplary operational chart of processing executed by a dangerous degree calculation program 24f to calculate a dangerous degree of a caller.

The processing based on the dangerous degree calculation program 24f to calculate a dangerous degree of a caller is described below. FIG. 30 is an exemplary operational chart of processing executed by the dangerous degree calculation program 24f to calculate a dangerous degree of a caller.

As illustrated in FIG. 30, the CPU 22 that executes the dangerous degree calculation program 24f acquires a telephone number of a caller (originator) when detecting a start of a call, for example (Op 1301). Subsequently, if the acquired telephone number is not unknown (telephone number is displayed) (No at Op 1302), the CPU 22 acquires a call date with reference to calendar information, for example, (Op 1303) and refers to data of the phonebook storage unit 102 (Op 1304). Then, if the telephone number is already registered in the phonebook storage unit 102 (Yes at Op 1305), the dangerous degree calculation unit 113 calculates the number of days d from the registration date of the telephone number to the day when the call is made (Op 1306).

Figures 31, 32:
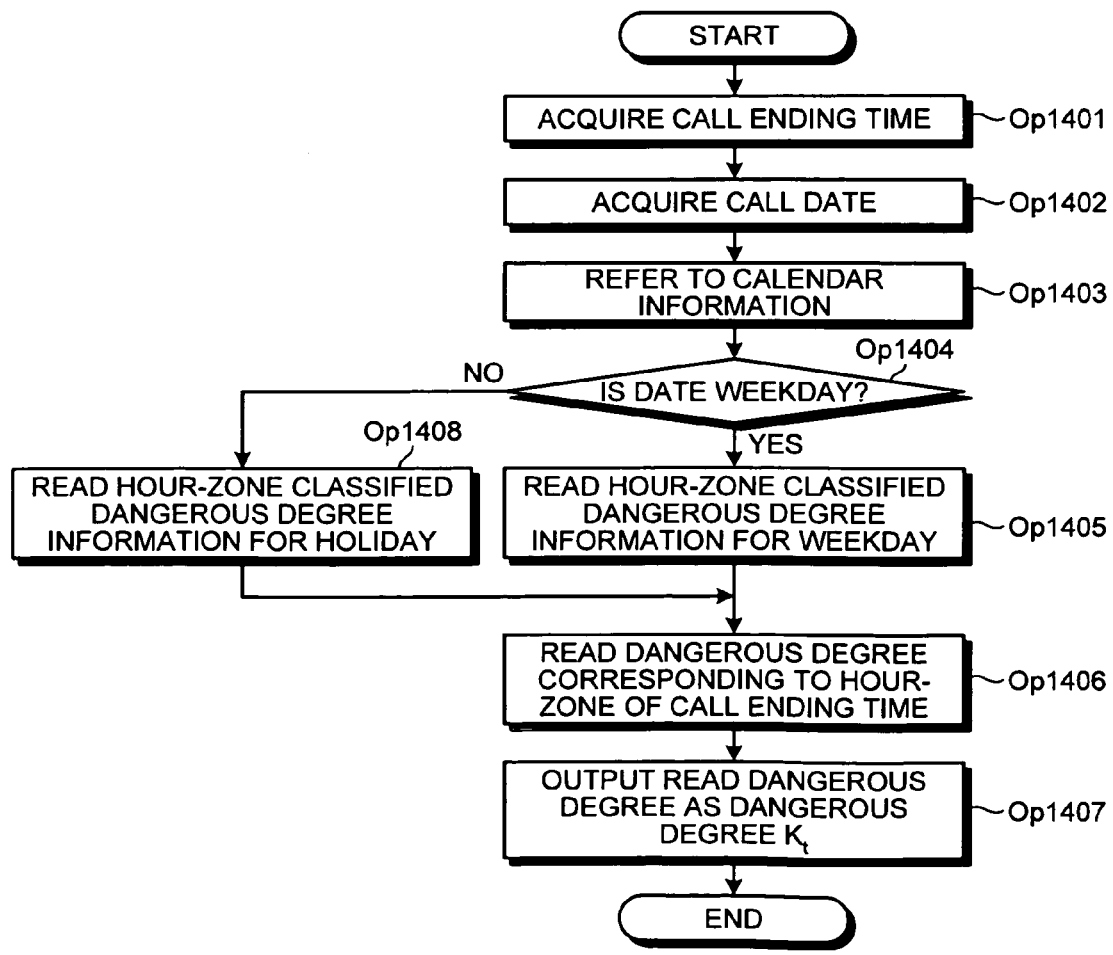
FIG. 31 is a schematic illustrating an exemplary dangerous degree calculation table.
FIG. 32 is an exemplary operational chart of processing executed by the dangerous degree calculation program 24f to calculate a dangerous degree of call time.

Next, the CPU 22 calculates the dangerous degree $K_d$ of the caller by using the number of days d from the registration date of the telephone number (Op 1307). The calculation of the dangerous degree $K_d$ of the caller is described below with reference to FIG. 31. FIG. 31 is a schematic illustrating an exemplary dangerous degree calculation table. For example, the CPU 22 refers to the dangerous degree calculation table illustrated in FIG. 31. As illustrated in FIG. 31, the numbers of days d after registration and the dangerous degrees correspond to each other in the dangerous degree calculation table. The higher dangerous degree corresponds to the smaller the number of days from the registration. For example, in the dangerous degree calculation table illustrated in FIG. 31, the number of days d after registration of "from 1 day to 3 days" and the dangerous degree of "100%" correspond to each other. In other words, this setting corresponds to a way in which a fraud is committed shortly after a user is caused to register the user's telephone number. The dangerous degree calculation table illustrated in FIG. 31 is prepared in advance and stored in the memory 23, for example. The CPU 22 acquires the dangerous degree corresponding to the number of days d calculated at Op 1307 from the dangerous degree calculation table illustrated in FIG. 31, and calculates the dangerous degree $K_d$ of the caller. Thereafter, the CPU 22 outputs the dangerous degree $K_d$ (Op 1308) and ends the processing.

If the telephone number of the caller (originator) is not registered in the phonebook storage unit 102 (No at Op 1305), the CPU 22 calculates the dangerous degree $K_d$ as 100% (Op 1309). Then, the processing proceeds to Op 1308, at which the CPU 22 outputs the dangerous degree $K_d$ and thereafter the CPU 22 ends the processing.

If the telephone number is unknown (telephone number is not displayed, an anonymous call) (Yes at Op 1302), the processing proceeds to Op 1309, at which the CPU 22 calculates the dangerous degree $K_d$ as 100%. Thereafter, the processing proceeds to Op 1308, at which the CPU 22 outputs the dangerous degree $K_d$ and thereafter the CPU 22 ends the processing.

[7-5. Processing to Calculate Dangerous Degree of Call Time]

The processing based on the dangerous degree calculation program 24f to calculate a dangerous degree of call time is described below. FIG. 32 is an exemplary operational chart of processing executed by the dangerous degree calculation program 24f to calculate a dangerous degree of call time.

As illustrated in FIG. 32, the CPU 22 that executes the dangerous degree calculation program 24f acquires call ending time (Op 1401) when detecting an end of a call, for example, and acquires a call date (Op 1402). Subsequently, the CPU 22 refers to calendar information, for example, (Op 1403), and determines whether the call date is a weekday (Op 1404).

If the call date is a weekday (Yes at Op 1404), the CPU 22 reads data for weekday from the hour-zone classified dangerous degree storage unit 103 (Op 1405). Subsequently, the CPU 22 reads a dangerous degree corresponding to the call ending time from the data for weekday read at Op 1405 (Op 1406). Then, the CPU 22 outputs the dangerous degree read at Op 1406 as the dangerous degree $K_t$ of the call time (Op 1407) and ends the processing.

If the call date is not a weekday, i.e., a holiday (No at Op 1404), the CPU 22 reads data for holiday from the hour-zone classified dangerous degree storage unit 103 (Op 1408). Then, the CPU 22 executes the same processing as Op 1406 and Op 1407, and ends the processing. In other words, the CPU 22 reads a dangerous degree corresponding to the call ending time from the data for holiday read at Op 1408, outputs the read dangerous degree as the dangerous degree $K_t$ of the call time, and ends the processing.

In FIG. 32, the CPU 22 acquires call ending time at Op 1401. However, call starting time, or mean time between the call starting time and the call ending time may be acquired, instead of call ending time.

[7-6. Information Upload Processing and Information Delivery Processing]

When warning notification is carried out as described above, data stored in the utterance state detection device 1 and the hour-zone classified dangerous degree storage unit 103 may be uploaded to a server totally controlling the data, and the data may be delivered from the server again. In formation upload processing from the utterance state detection device 1 to a server and information delivery processing from the server to the utterance state detection device 1 are described below.

(Information Upload Processing)

Figure 33:
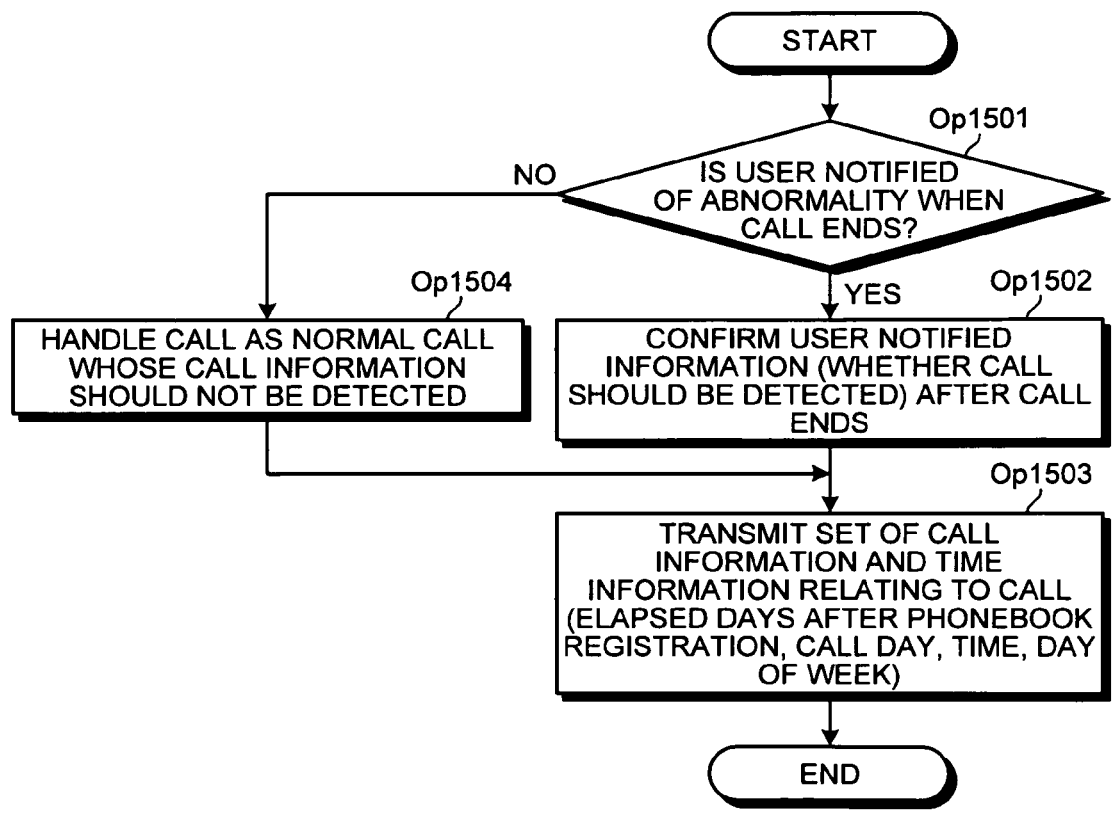
FIG. 33 is an exemplary operational chart illustrating information upload processing.

FIG. 33 is an exemplary operational chart illustrating information upload processing. As illustrated in FIG. 33, the CPU 22 determines whether a user is notified of abnormality, i.e., a user is warned that the user is likely to being involved in a fraud when a call ends, for example, (Op 1501). If a user is notified of abnormality (Yes at Op 1501), the CPU 22 confirms call information of the call with the user after the call ends (Op 1502). In other words, the CPU 22 outputs call information that causes a user to select whether a warning notification is correct, and receives a selected result of whether the warning notification is correct. Then, the CPU 22 transmits call information to which the user's selection result is reflected, and information relating to the call to which the warning notification is made to a server (Op 1503), and ends the processing. The information relating to the call includes elapsed days from phonebook registration, and the call date, time, and the day of the week.

If a user is not notified of abnormality (No at Op 1501), the CPU 22 handles the call as a normal call whose call information should not be detected (warning notification should not be made) (Op 1504). Then, the processing proceeds to Op 1503, at which the CPU 22 transmits the information to the server, and thereafter the CPU 22 ends the processing.

(Information Delivery Processing)

Figure 34:
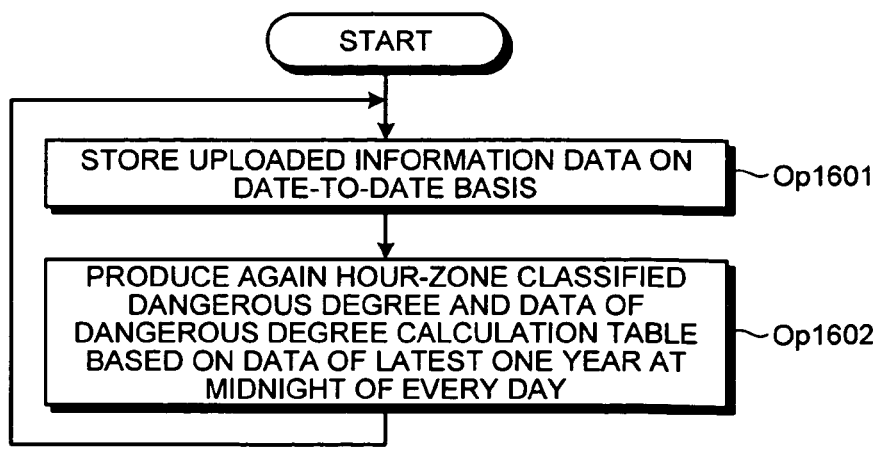
FIG. 34 is an exemplary operational chart illustrating information delivery processing.

FIG. 34 is an exemplary operational chart illustrating information delivery processing. The information delivery processing illustrated in FIG. 34 is repeatedly executed during operation of the server. As illustrated in FIG. 34, the server stores information data (call information and information relating to a call to which warning notification is carried out illustrated in FIG. 33) uploaded from each terminal (the utterance state detection device 1) in a memory on date-to-date basis, for example, (Op 1601). A control unit such as a CPU included in the server carries out the following processing. The control unit produces again data of the hour-zone classified dangerous degree storage unit 103 illustrated in FIGS. 26 and 27, and data of the dangerous degree calculation table illustrated in FIG. 31 based on stored data of the latest one year at midnight of every day, and delivers the data to each terminal (Op 1602).

[7-7. Detection Using Ratio of Utterance Duration to Call Duration]

In the utterance state detection device 1 according to the seventh embodiment, a call intending to lead a user into a fraud may be detected by using a ratio of an utterance duration (summation time of utterance period lengths) of the user to a call duration.

Figure 35:
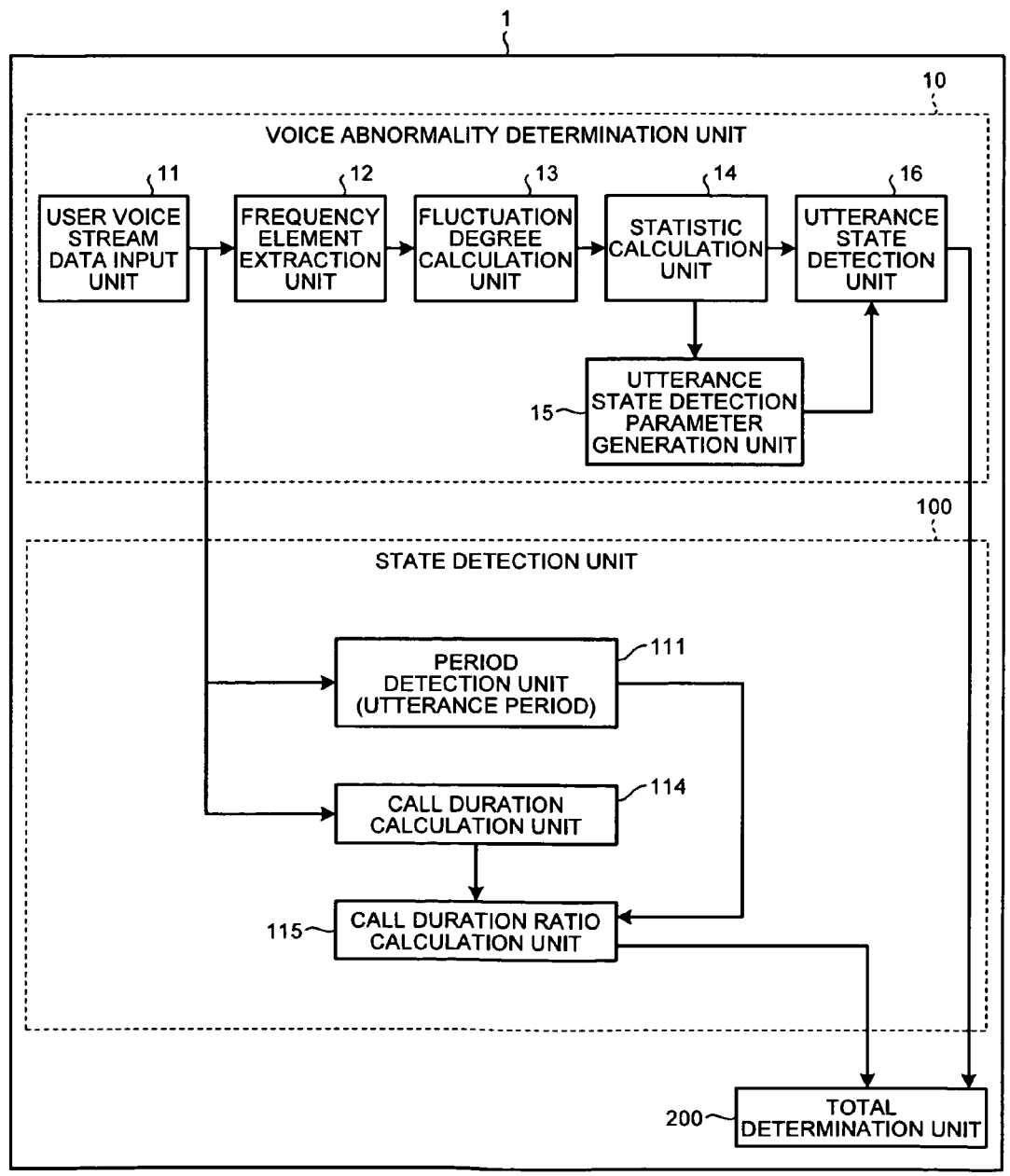
FIG. 35 is exemplary functional blocks of the utterance state detection device 1 that carries out detection by using a ratio of an utterance duration to a call duration.

FIG. 35 is exemplary functional blocks of the utterance state detection device 1 that carries out detection by using a ratio of an utterance duration to a call duration. The utterance state detection device 1 includes the period detection unit 111, a call duration calculation unit 114, and a call duration ratio calculation unit 115. The period detection unit 111 corresponds to the period detection unit 111 of the fifth embodiment, and detects an utterance period. The utterance state detection device 1 of the seventh embodiment may execute also processing of the state determination unit 112 of the fifth embodiment while the state determination unit 112 is not illustrated in FIG. 35.

The period detection unit 111 detects an utterance period by the method of the fifth embodiment. For example, the period detection unit 111 detects the period $I_1$ in which the input power P of call voice data (user voice stream data) exceeds the estimated background noise power $P_n$ by the predetermined threshold α or more as an utterance period (refer to FIG. 15).

The call duration calculation unit 114 calculates a call duration from summation of the input call voice data lengths.

The call duration ratio calculation unit 115 calculates an utterance duration ratio $R_b$ by using a ratio of an utterance duration $T_b$ that is summation of the utterance period durations detected by the period detection unit 111 to a call duration $T_a$ calculated by the call duration calculation unit 114 ($R_b = T_b/T_a$).

The total determination unit 200 calculates the total abnormal degree $R_t$ by using the abnormal degree R calculated by the sound abnormality determination unit 10, and the utterance duration ratio $R_b$ calculated by the call duration ratio calculation unit 115, and determines whether a user is likely to make a call intending to lead the user into a fraud. For example, the total determination unit 200 calculates the total abnormal degree $R_t$ by formula (3). In the calculation, a statistic of an input voice of a user of the utterance state detection device 1 is used as the call abnormal degree R. The statistic is calculated by the sound abnormality determination unit 10 with a predetermined parameter.

Total abnormal degree $R_t$=call abnormal degree $R*0.1$, $(0.8<R_b)$

=call abnormal degree $R*0.2,(0.7<R_b\leq0.8)$

=call abnormal degree $R*0.4,(0.5<R_b\leq0.7)$

=call abnormal degree $R*1.0,(0.3<R_b\leq0.5)$

=call abnormal degree $R*1.2,(R_b\leq0.3)$ (3)

In other words, the total determination unit 200 determines that a user has the initiative of a dialogue when the utterance duration ratio $R_b$ calculated by the call duration ratio calculation unit 115 is large and the user is less likely to make a call intending to lead the user into a fraud, as illustrated in formula (3). In contrast, the total determination unit 200 determines that a caller has the initiative of a dialogue when the utterance duration ratio $R_b$ calculated by the call duration ratio calculation unit 115 is small and the user is highly likely to make a call intending to lead the user into a fraud.

The call duration can be calculated from a difference from call starting time to call ending time with reference to timepiece information included in the utterance state detection device 1. When an utterance period of a caller is detected, a ratio of an utterance duration of a user to an utterance duration of the caller can be used as the utterance duration ratio.

[7-8. Detection Using Ratio of Reply Duration to Call Duration]

In the utterance state detection device 1 according to the seventh embodiment, a call intending to lead a user into a fraud may be detected by using a ratio of a reply duration (summation time of reply period) of a user to a call duration.

Figure 36:
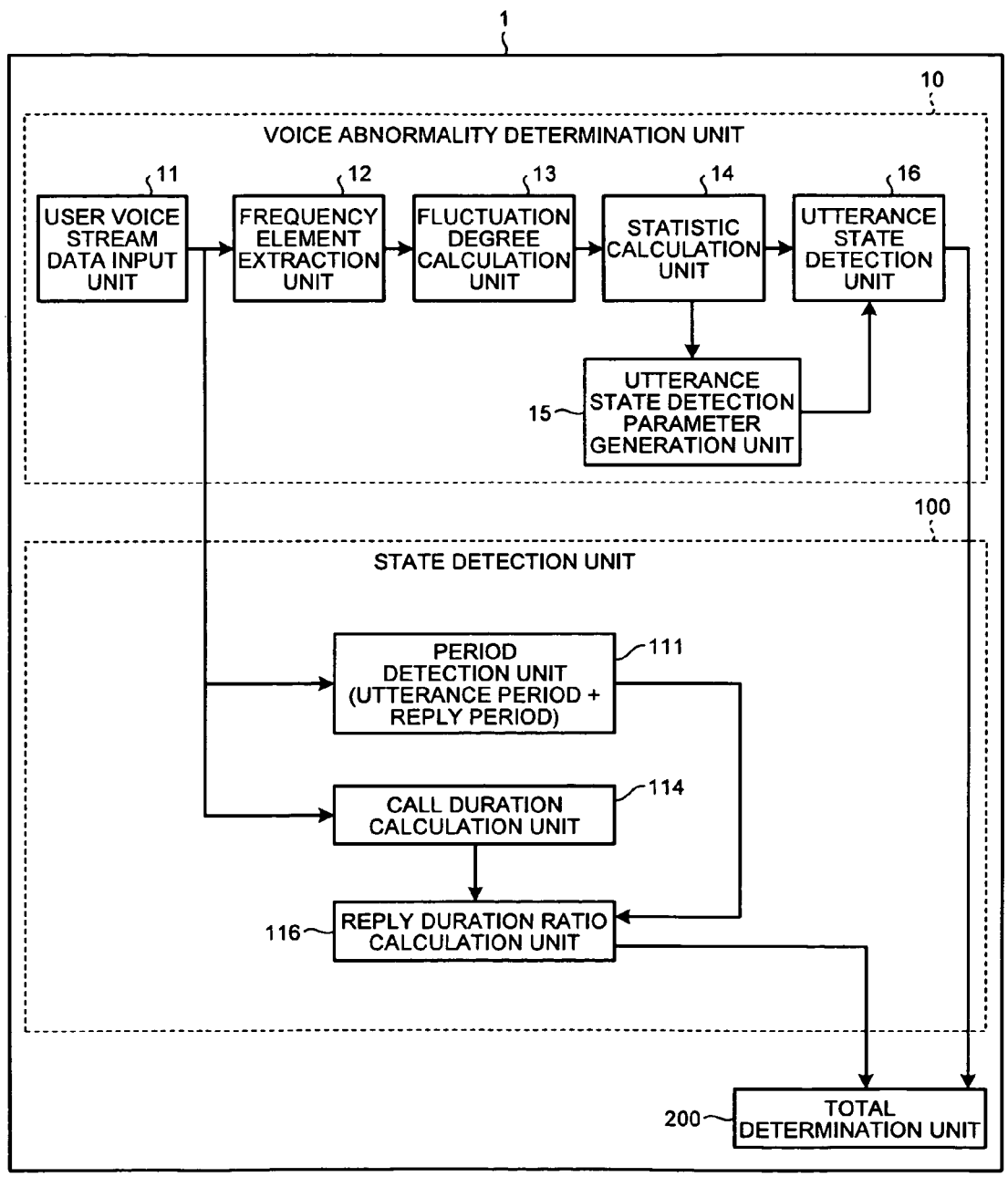
FIG. 36 is exemplary functional blocks of the utterance state detection device 1 that carries out detection by using a ratio of a reply duration to a call duration.

FIG. 36 is exemplary functional blocks of the utterance state detection device 1 that carries out detection by using a ratio of a reply duration to a call duration. The utterance state detection device 1 includes the period detection unit 111, the call duration calculation unit 114, and a reply duration ratio calculation unit 116. The period detection unit 111 corresponds to the period detection unit 111 of the fifth embodiment, and detects an utterance period and a reply period. The processing of the utterance state detection device 1 illustrated in FIG. 36, the period detection data 23c and the reply model data 23d that are stored in the memory 23 illustrated in FIG. 28 are not indispensable, for example. The processing can be done by only detecting an utterance state. The utterance state detection device 1 of the seventh embodiment may execute also processing of the state determination unit 112 of the fifth embodiment while the state determination unit 112 is not illustrated in FIG. 36.

The period detection unit 111 detects a reply period by the method of the fifth embodiment. For example, the period detection unit 111 detects an utterance period from call voice data (user voice stream data) and an period in which utterance periods estimated as replies and having a short period of time are continued as the reply period $I_2$ (refer to FIG. 16).

The call duration calculation unit 114 calculates a call duration from the summation of the input call voice data lengths in the same manner as the case illustrated in FIG. 35.

The reply duration ratio calculation unit 116 calculates a reply duration ratio $R_c$ by using an ratio of a reply duration $T_c$ that is the summation of the reply period durations detected by the period detection unit 111 to the call duration $T_a$ calculated by the call duration calculation unit 114 ($R_c=T_c/T_a$).

The total determination unit 200 calculates the total abnormal degree $R_t$ by using the abnormal degree R calculated by the sound abnormality determination unit 10, and the utterance duration ratio $R_b$ calculated by the call duration ratio calculation unit 115, and determines whether a user is likely to make a call intending to lead the user into a fraud. For example, the total determination unit 200 calculates the total abnormal degree $R_t$ by formula (4). In the calculation, a statistic of an input voice of a user of the utterance state detection device 1 is used as the call abnormal degree R. The statistic is calculated by the sound abnormality determination unit 10 with a predetermined parameter.

Total abnormal degree $Rt$=call abnormal degree $R*1.2,(0.7<R_c)$

=call abnormal degree $R*1.1,(0.5<R_c\leq0.7)$

=call abnormal degree $R*1.0,(R_c\leq0.5)$ (4)

In other words, the total determination unit 200 determines that a caller has the initiative of a dialogue when the reply duration ratio $R_c$ calculated by the call duration ratio calculation unit 115 is large, thus a user is likely to make a call intending to lead the user into a fraud, as illustrated in formula (4). In contrast, the total determination unit 200 determines that a user has the initiative of a dialogue when the reply duration ratio $R_c$ calculated by the call duration ratio calculation unit 115 is small, thus the user is less likely to make a call intending to lead the user into a fraud.

An alternative method to estimate that a caller has the initiative of a dialogue when replies are frequently made, a ratio of a reply duration to an utterance duration of a user can be used as the reply duration ratio, for example. Instead of the reply duration ratio, a reply frequency ratio can be used. In this case, a ratio of the detected reply frequency is calculated to a call duration or an utterance duration of a user.

[7-9. Detection Using Utterance Rate]

In the utterance state detection device 1 according to the seventh embodiment, a call intending to lead a user into a fraud may be detected by utilizing an utterance rate of a user as time information.

Figure 37:
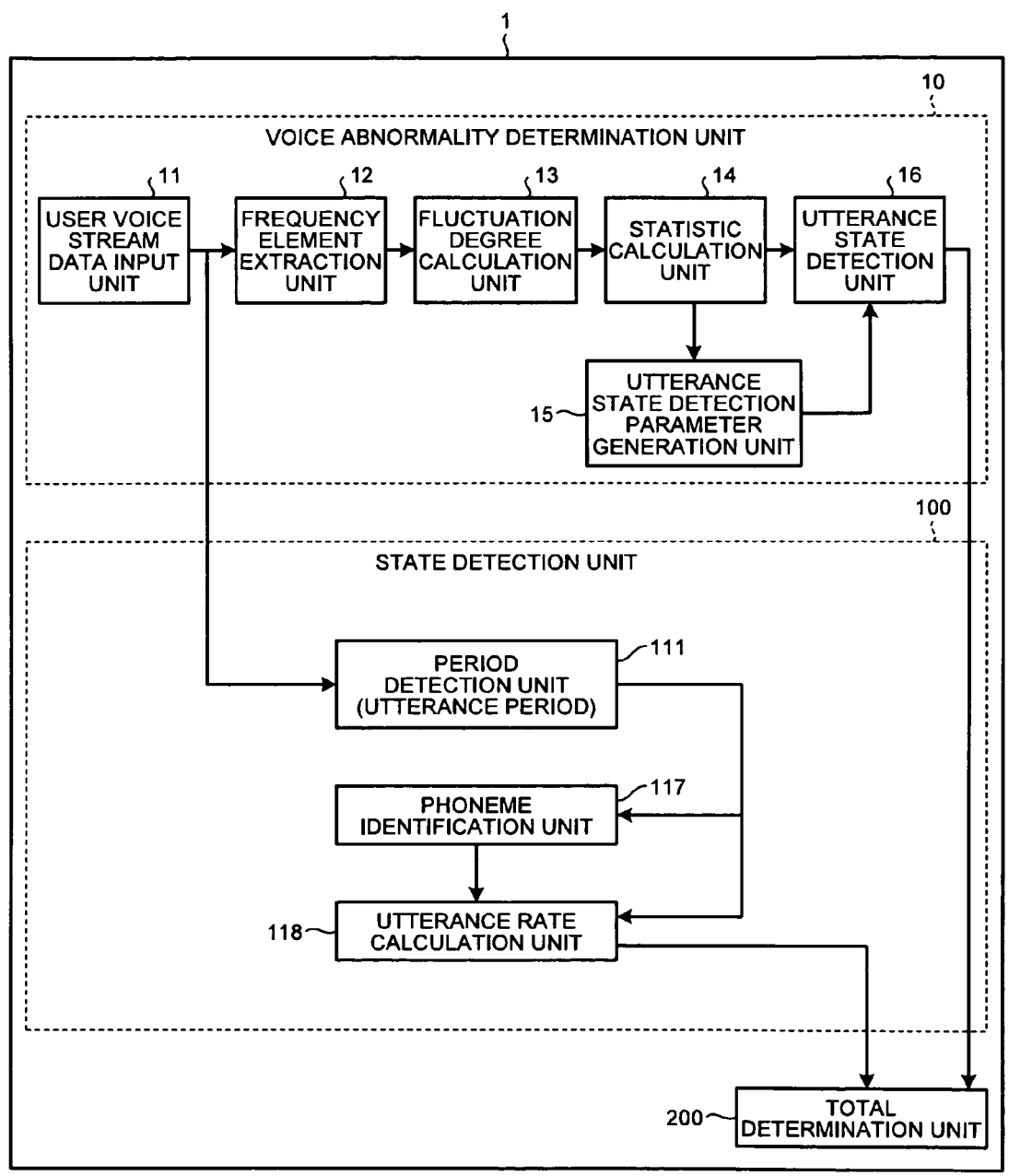
FIG. 37 is exemplary functional blocks of the utterance state detection device 1 that carries out detection by using an utterance rate.

FIG. 37 is exemplary functional blocks of the utterance state detection device 1 that carries out detection by using an utterance rate. The utterance state detection device 1 includes the period detection unit 111, a phoneme identification unit 117, and an utterance rate calculation unit 118. The period detection unit 111 corresponds to the period detection unit 111 of the fifth embodiment, and detects an utterance period.

The phoneme identification unit 117 receives voice data in an utterance period detected by the period detection unit 111, carries out continuous syllable identification, and outputs a syllable series (mora) corresponding to the input voice content.

The utterance rate calculation unit 118 calculates an utterance rate $R_p$ by using a ratio of a total number $N_p$ of syllable series output from the phoneme identification unit 117 to a summation T of the period lengths of utterance periods detected by the period detection unit 111 ($R_p = N_p/T$).

The total determination unit 200 calculates the total abnormal degree $R_t$ by using the abnormal degree R calculated by the sound abnormality determination unit 10, and the utterance rate $R_p$ calculated by the utterance rate calculation unit 118, and determines whether a user is likely to make a call intending to lead the user into a fraud. For example, the total determination unit 200 calculates the total abnormal degree $R_t$ by formula (5). In the calculation, a statistic of an input voice of a user of the utterance state detection device 1 is used as the call abnormal degree R. The statistic is calculated by the sound abnormality determination unit 10 with a predetermined parameter.

Total abnormal degree $Rt$=call abnormal degree $R*0.8, (5.5 < R_p)$

=call abnormal degree $R*1.0, (4.5 < R_b \le 5.5)$

=call abnormal degree $R*1.2, (R_b \le 4.5)$     (5)

An index based on phonemes or words can be used as an utterance rate in addition to the index based on syllables.

[7-10. Effects of the Seventh Embodiment]

As described above, the utterance state detection device 1 according to the seventh embodiment detects a call intending to lead a user into a fraud by comprehensively taking into consideration a caller, time and the day of the week of a call, a ratio of replies in a dialogue, and an utterance rate in a dialogue in addition to determine whether the user is in an unordinary state. Consequently, the utterance state detection device 1 according to the seventh embodiment can prevent the occurrence of false detection.

In the cases of using the call duration ratio illustrated in FIG. 35 and the reply duration ratio illustrated in FIG. 36, the call duration ratio and the reply duration ratio can be included in the call information described by using FIGS. 33 and 34 as information. In this case, weighting ratio used for adding the call duration ratio or the reply duration ratio by the total determination unit 200 is updated by a server that uploads the call information. This structure promises improvement of detection accuracy of a call intending to lead a user into a fraud.

8. Eighth Embodiment

It is known that occurrence of frauds such as so-called "billing frauds", "it's me frauds", and refund frauds is concentrated in a specific area because a defrauder often utilizes an illicitly acquired regional phonebook or name list of a school. In such an area where the occurrence of frauds is concentrated, detection sensitivity of a fraud detection device is increased so as to detect frauds. If a defrauder gets the detection device, the defrauder can estimate an area for which the detection sensitivity of the detection device is set high. As a result, the defrauder can seek out an area for which the detection sensitivity of the detection device is set low, and target the area for committing frauds after the detection device is tried to be used in several areas. In an eighth embodiment, a device that can prevent detection sensitivity of a detection device from being found by a defrauder is described below with reference to FIGS. 38 to 42.

[8-1. Functional Blocks]

Figure 38:
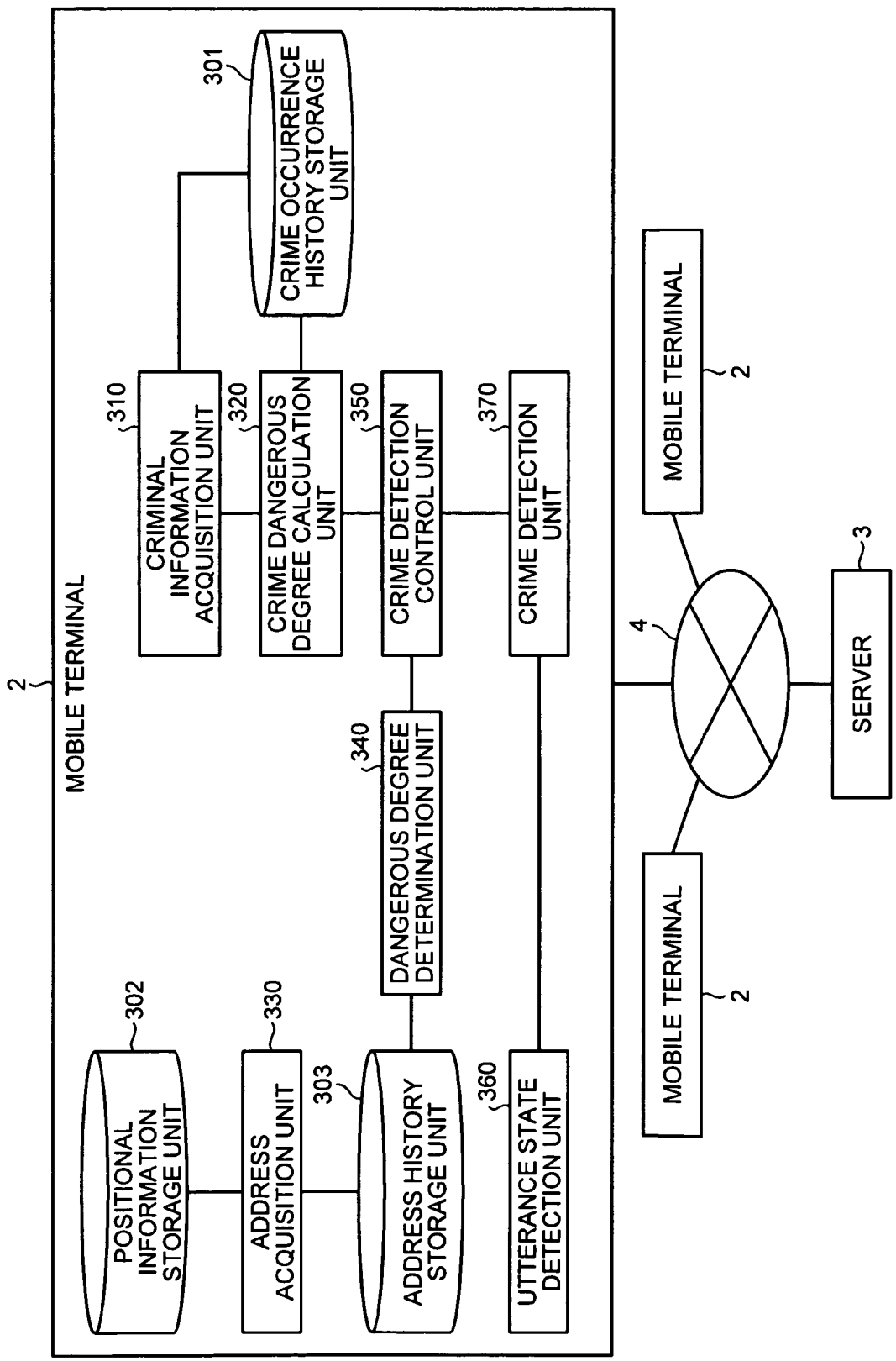
FIG. 38 is a schematic illustrating exemplary functional blocks of a mobile terminal according to an eighth embodiment.

FIG. 38 is a schematic illustrating exemplary functional blocks of a mobile terminal according to the eighth embodiment. Mobile terminals 2 are coupled with a server 3 through a network 4 so as to be able to communicate with each other and with the server 3. As illustrated in FIG. 38, the mobile terminal 2 includes a crime occurrence history storage unit 301, a positional information storage unit 302, and an address history storage unit 303. As illustrated in FIG. 38, the mobile terminal 2 includes a criminal information acquisition unit 310, a crime dangerous degree calculation unit 320, an address acquisition unit 330, a dangerous degree determination unit 340, a crime detection control unit 350, an utterance state detection unit 360, and a crime detection unit 370. The mobile terminal 2 can be structured by using portable electronic equipment such as a cell-phone and a smartphone.

The crime occurrence history storage unit 301 stores therein crime occurrence information and a result calculated by the crime dangerous degree calculation unit 320, which is described later, so as to correspond to each other. The crime occurrence history storage unit 301 may limit the information stored therein to information of crimes having occurred in the same or a neighboring area of the user's home by using home address information of a user. Hereinafter, the term "home" means a home of a user.

The positional information storage unit 302 stores therein regional information corresponding to positional information. For example, a name of a municipality and map data divided into proper areas may be used as the regional information.

Figures 39, 40:
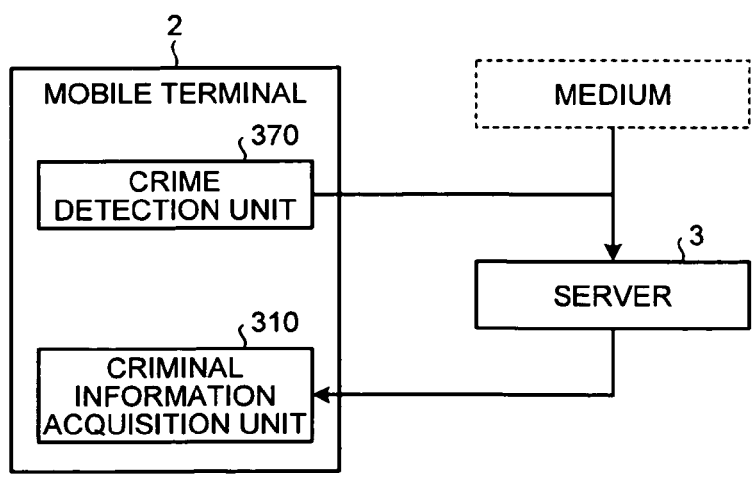
FIG. 39 is a schematic illustrating exemplary data stored in an address history storage unit.
FIG. 40 is a schematic illustrating an exemplary detection method of criminal information by a criminal information acquisition unit.

The address history storage unit 303 stores therein home information acquired at a predetermined frequency by the address acquisition unit 330, which is described later, and an acquired date of the home information so as to correspond to each other. The data (address history) stored in the address history storage unit 303 is used for estimating information frequently appearing in the information acquired by the address acquisition unit 330, which is described later, as a home location, and does not indicate the correct home location. FIG. 39 is a schematic illustrating exemplary data stored in the address history storage unit. As illustrated in FIG. 39, in the address history storage unit 303, home information (estimated home address) acquired by the address acquisition unit 330 and the date (estimated date) acquired by the address information acquisition unit 330 are stored so as to correspond to each other.

The criminal information acquisition unit 310 acquires crime occurrence information. For example, the criminal information acquisition unit 310 acquires occurrence time and location of a damage of a crime such as a so-called "billing fraud", "it's me fraud", and refund fraud, as crime occurrence information. FIG. 40 is a schematic illustrating an exemplary detection method of criminal information by the criminal information acquisition unit. As illustrated in FIG. 40, the criminal information acquisition unit 310 receives criminal information from the server 3 through the network, for example. The server 3 receives and acquires criminal information transmitted from the mobile terminal 2 (the crime detection unit 370) through the network, or takes in and acquires criminal information from a criminal information providing medium such as incident news on the Web and the police. The server 3 may be provided with address history information of each user, and receive and acquire information from a limited user who lives for a specified period of time The criminal information acquisition unit 310 may acquire criminal information delivered from the server 3 that is structured to periodically deliver crime occurrence information to the mobile terminal 2.

The crime dangerous degree calculation unit 320 calculates a dangerous degree based on crime occurrence information acquired by the criminal information acquisition unit 310, crime occurrence history stored in the crime occurrence history storage unit 301, or home information stored in the address history storage unit 303. For example, the crime dangerous degree calculation unit 320 determines a level of dangerous degree from levels of six stages from zero to five based on a positional relationship between a crime occurrence area in crime occurrence information and a home indicating by home information. The levels set from zero to five as dangerous levels are examples. The scale of dangerous degree can be properly changed.

For example, the crime dangerous degree calculation unit 320 determines the dangerous degree as three when a home address (estimated home address) is included in the same town in which a billing fraud has occurred. For example, the crime dangerous degree calculation unit 320 determines the dangerous degree as two when a town in which a billing fraud has occurred is adjacent to the town in which a home address (estimated home address) is included. For example, the crime dangerous degree calculation unit 320 determines the dangerous degree as one when a town in which a billing fraud has occurred is located to the town in which a home address (estimated home address) is included with at least one town interposed therebetween. The crime dangerous degree calculation unit 320 may evaluate a positional relationship between a crime occurrence area and a home indicated by home information by using a distance calculated based on a gravity distance between the towns.

The crime dangerous degree calculation unit 320 may revise the dangerous degree determined to one of levels from zero to five in the manner described above depending on occurrence time and occurrence frequencies of crimes. For example, the crime dangerous degree calculation unit 320 lowers the dangerous degree by one when occurrence time is a week or more before. For example, the crime dangerous degree calculation unit 320 increases the dangerous degree by one when a town whose crime occurrence frequency is five times or more within three days is adjacent to a home. For example, the crime dangerous degree calculation unit 320 increases the dangerous degree by one when a crime notification is detected by a user's terminal. The crime dangerous degree calculation unit 320 may set the dangerous degree to low when there are a plurality of home address candidates estimated as a home.

The address acquisition unit 330 acquires home information by comparing a location of the mobile terminal 2 with regional information stored in the positional information storage unit 302 by using a positional information acquisition device such as the global positioning system (GPS). The address acquisition unit 330 may use any pre-existing method as long as the method can provide information estimating a home. When acquiring home information, the address acquisition unit 330 stores the acquired date and the home information in the address history storage unit 303 so as to correspond to each other.

The dangerous degree determination unit 340 determines whether an area estimated as a home is highly likely to be involved in a crime, and determines whether a detection threshold is adjusted according to the determination result. For example, the dangerous degree determination unit 340 refers to data (address history) stored in the address history storage unit 303 when being at an operation timing of dangerous degree determination. Subsequently, the dangerous degree determination unit 340 determines whether the data includes home information (estimated home address) since three months or more before, and a ratio of home information (estimated home address) of recent date to the home information (estimated home address) to date is 90% or larger. As a result, if the ratio is 90% or larger, the dangerous degree determination unit 340 determines that a detection threshold is adjusted. In contrast, if the ratio is less than 90%, the dangerous degree determination unit 340 determines that a detection threshold is not adjusted. In other words, if an area in which a home is highly likely included is estimated and recognized, a user's activity area is highly likely to be concentrated around the home. The dangerous degree determination unit 340, thus, causes the crime detection control unit 350 to adjust a detection threshold.

As described above, when detecting that a user has stayed in an area for long time from data (address history) stored in the address history storage unit 303, the dangerous degree determination unit 340 determines that a detection threshold is adjusted according to the area. A defrauder tends to move from hiding place to hiding place. Therefore, a detection threshold adjustment is not carried out in the mobile terminal 2 gotten by a defrauder. Consequently, even if a defrauder gets the mobile terminal 2 and tries to estimate an area for which a detection threshold (crime detection sensitivity) is set low, the defrauder cannot estimate the area.

The crime detection control unit 350 adjusts a detection threshold (crime detection sensitivity) in such a manner that the larger the dangerous degree value calculated by the crime dangerous degree calculation unit 320 the easier a crime is detected, based on the determination by the dangerous degree determination unit 340.

The utterance state detection unit 360 corresponds to the utterance state detection device 1, which is described in the above-described embodiments, and executes various processing executed by the utterance state detection device 1. For example, the utterance state detection unit 360 outputs information relating to a state of a user in making a call (an ordinary state or unordinary state) to the crime detection unit 370.

The crime detection unit 370 detects a crime based on a detection threshold adjusted by the crime detection control unit 350, and information relating to a user's state acquired from the utterance state detection unit 360.

Processing of the mobile terminal 2 according to the eighth embodiment is described below.

[8-2. Processing Carried Out by Dangerous Degree Determination Unit]

Figure 41:
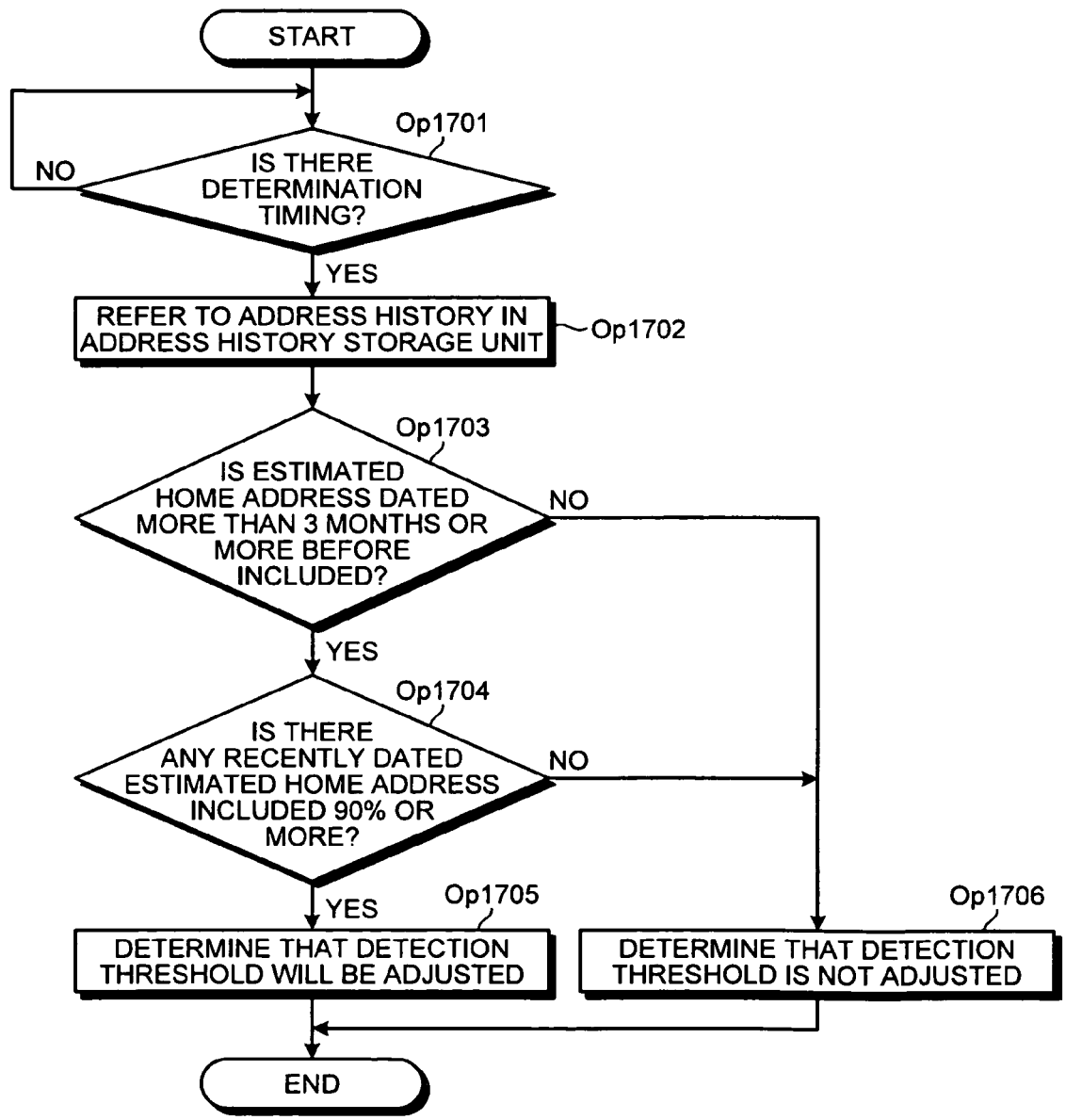
FIG. 41 is an exemplary operational chart illustrating operation by a dangerous degree determination unit.

FIG. 41 is an exemplary operational chart illustrating the processing by the dangerous degree determination unit. As illustrated in FIG. 41, the dangerous degree determination unit 340 determines whether there is an operation timing of dangerous degree determination (Op 1701). If there is not an operation timing of dangerous degree determination (No at Op 1701), the dangerous degree determination unit 340 repeats the determination at Op 1701 until there is an operation timing of dangerous degree determination.

If there is an operation timing of dangerous degree determination (Yes at Op 1701), the dangerous degree determination unit 340 refers to data (address history) stored in the address history storage unit 303 (Op 1702). Subsequently, the dangerous degree determination unit 340 determines whether home information (estimated home address) dated three months or more before is included in the data (Op 1703).

As a result of the determination, if home information (estimated home address) dated three months or more before is included in the data (Yes at Op 1703), the dangerous degree determination unit 340 carries out the following determination. The dangerous degree determination unit 340 determines whether any home information in recently dated home information (estimated home address) is included by 90% or more in home information (estimated home address) up to now (Op 1704). As a result of the determination, if a home address is included by 90% or more (Yes at Op 1704), the dangerous degree determination unit 340 determines that a detection threshold will be adjusted (Op 1705), and ends the processing. In contrast, if no home address included by 90% or more is found (No at Op 1704), the dangerous degree determination unit 340 determines that a detection threshold is not adjusted (Op 1706), and ends the processing.

If home information (estimated home address) dated three months or more before is not included in the data (No at Op 1703), the processing proceeds to Op 1706, at which the dangerous degree determination unit 340 determines that a detection threshold is not adjusted, and the dangerous degree determination unit 340 ends the processing.

[8-3. Processing Carried Out by Crime Detection Control Unit]

Figure 42:
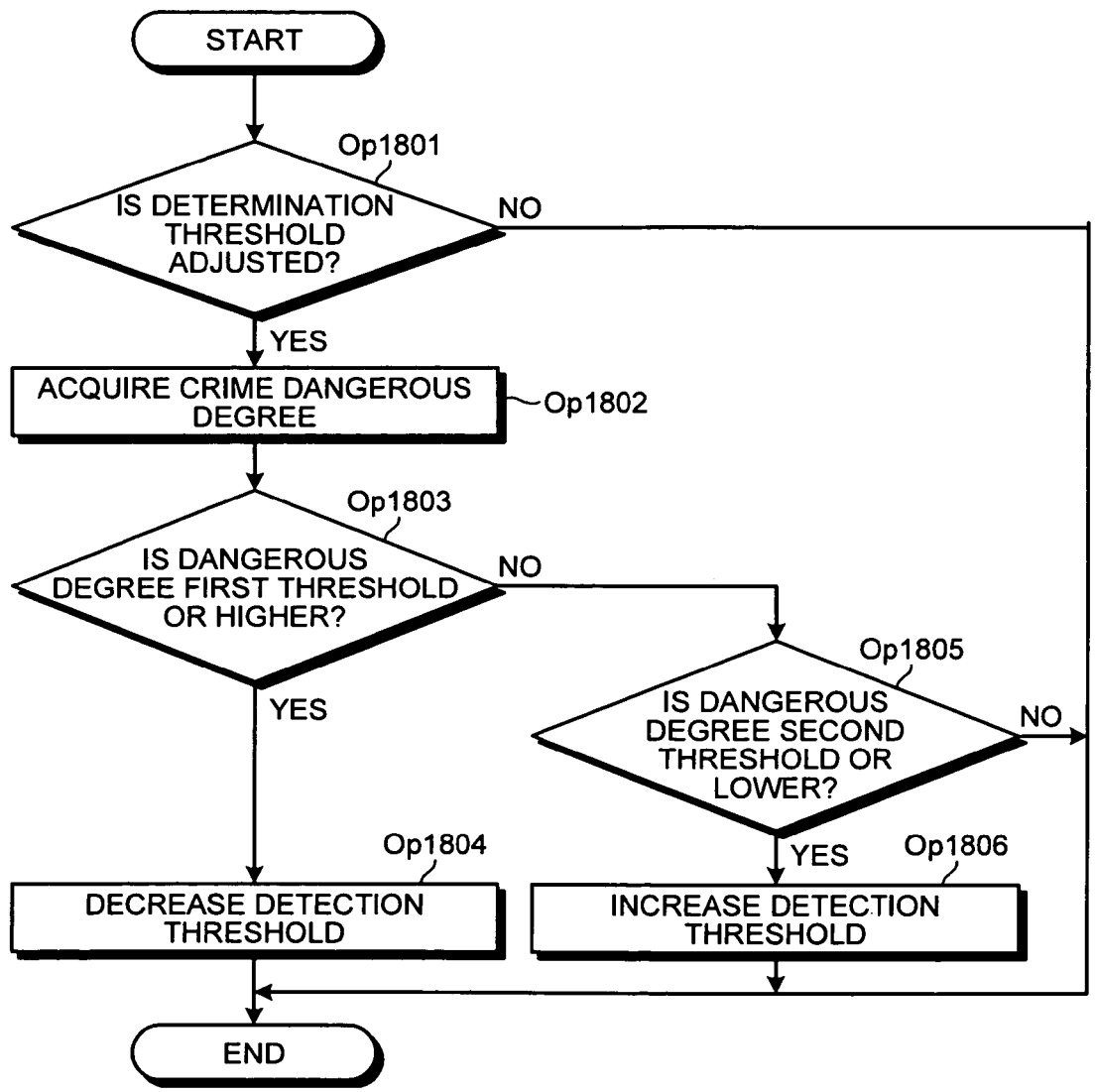
FIG. 42 is an exemplary operational chart illustrating operation by a crime detection control unit.

FIG. 42 is an exemplary operational chart illustrating the processing by the crime detection control unit. As illustrated in FIG. 42, the crime detection control unit 350 determines whether the dangerous degree determination unit 340 has determined that a detection threshold is adjusted (Op 1801). As a result of the determination, if it has been determined that a detection threshold is adjusted (Yes at Op 1801), the crime detection control unit 350 acquires a dangerous degree calculated by the crime dangerous degree calculation unit 320 (Op 1802).

Subsequently, the crime detection control unit 350 determines whether the dangerous degree acquired at Op 1802 is a first threshold or higher (Op 1803). If the dangerous degree is the first threshold or higher (Yes at Op 1803), the crime detection control unit 350 decreases the detection threshold so that a crime is easily detected (Op 1804), and ends the processing. In contrast, if the dangerous degree is not the first threshold or higher (lower than the first threshold) (No at Op 1803), the crime detection control unit 350 determines whether the dangerous degree is a second threshold or lower (Op 1805). As a result of the determination, if the dangerous degree is the second threshold or lower (Yes at Op 1805), the crime detection control unit 350 increases the detection threshold so that a crime is hardly detected (Op 1806), and ends the processing. In contrast, if the dangerous degree is not the second threshold or lower (No at Op 1805), the crime detection control unit 350 ends the processing without adjusting the detection threshold.

If determination of adjusting a detection threshold is not made at Op 1801, i.e., it is determined that a detection threshold is not adjusted (No at Op 1801), the crime detection control unit 350 ends the processing without adjusting the determination threshold.

[8-4. Effects of the Eighth Embodiment]

As described above, in the eighth embodiment, a livelihood base (home) of a user of the mobile terminal 2 is estimated and crime detection sensitivity is dynamically changed according to crime occurrence information on the user's livelihood base. According to the eighth embodiment, fraud detection sensitivity (a threshold) set for each area is not estimated by a defrauder. As a result, a call intending to lead a user into a fraud can be prevented from being not detected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An utterance emotional state detection device, comprising:
   a memory that stores a reply model including statistically processed information relating to a reply of a user in a normal state; and
   a processor coupled to the memory, wherein the processor executes a process comprising:
   acquiring user voice stream data of a specified user;
   extracting high frequency elements from the user voice stream data by frequency-analyzing;
   first calculating a fluctuation degree of the extracted high frequency elements for every unit of time;
   second calculating a statistic for every certain interval in the user voice stream data based on a plurality of fluctuation degrees in the every certain interval, the statistic being a representative value obtained from the fluctuation degrees in the every certain interval;
   determining that an utterance in the user voice stream data is a reply when a time length of the utterance is smaller than a first predetermined threshold; and
   determining an utterance emotional state of the specified user based on the statistic and the reply obtained from the user voice stream data of the specified user, wherein the determining of the utterance emotional state includes determining the utterance emotional state of the specified user in a reply period, wherein the reply period is determined from a plurality of replies that continuously appear in the user voice stream data, wherein each reply in the plurality of replies being smaller than the first predetermined threshold and where each reply of the plurality of replies in the reply period are compared to the reply model stored in the memory.

2. The utterance emotional state detection device according to claim 1, wherein the detecting includes detecting whether the utterance state of the specified user is in an ordinary state or in an unordinary state by using an utterance state detection parameter calculated based on the statistic obtained from user voice stream data generated when an unspecified user is making an utterance in a known utterance state.

3. The utterance emotional state detection device according to claim 2, wherein the process further comprises producing the utterance state detection parameter based on the statistic obtained from user voice stream data generated when an unspecified user is making an utterance in a known utterance state.

4. The utterance emotional state detection device according to claim 1, wherein the high frequency elements are extracted so as to include no first formant.

5. The utterance emotional state detection device according to claim 1, wherein the high frequency elements have a frequency of 2 kHz or higher.

6. The utterance emotional state detection device according to claim 1, wherein the first calculating includes calculating the fluctuation degree based on a formula:

fluctuation degree=log(a geometric mean of power spectra of high frequency elements)/log(an arithmetic mean of power spectrum of high frequency elements).

7. The utterance emotional state detection device according to claim 1, wherein the first calculating includes calculating the fluctuation degree based on a formula:

fluctuation degree=log(a geometric mean of residual power spectra of high frequency elements)/log (an arithmetic mean of residual power spectrum of high frequency elements).

8. The utterance emotional state detection device according to claim 1, wherein the first calculating includes calculating the fluctuation degree based on a formula:

fluctuation degree=a geometric mean of power spectra of high frequency elements/an arithmetic mean of power spectrum of high frequency elements.

9. The utterance emotional state detection device according to claim 1, wherein the first calculating includes calculating the fluctuation degree based on a variance of residual power spectra of high frequency elements.

10. The utterance emotional state detection device according to claim 1, wherein the first calculating includes calculating the fluctuation degree based on a quartile range of residual power spectra of high frequency elements.

11. The utterance emotional state detection device according to claim 1, wherein the process further comprises third calculating an SN ratio of the user voice stream data, wherein the detecting includes detecting an utterance state when the SN ratio is larger than a threshold in the certain period of time in which the statistic is calculated.

12. A non-transitory computer readable storage medium containing an utterance emotional state detection program for detecting an utterance state of an user that, the utterance emotional state detection program causing a computer to perform a process comprising:
acquiring user voice stream data of a specified user;
extracting high frequency elements from the user voice stream data by frequency-analyzing;
calculating a fluctuation degree of the extracted high frequency elements for every unit of time;
calculating a statistic for every certain interval in the user voice stream data based on a plurality of fluctuation degrees in the every certain interval, the statistic being a representative value obtained from the fluctuation degrees in the every certain interval;
determining that an utterance in the user voice stream data is a reply when a time length of the utterance is smaller than a first predetermined threshold; and
determining an utterance emotional state of the specified user based on the statistic and the reply obtained from the user voice stream data of the specified user, wherein
the determining of the utterance emotional state includes determining the utterance emotional state of the specified user in a reply period, wherein the reply period is determined from a plurality of replies that continuously appear in the user voice stream data, wherein each reply in the plurality of replies being smaller than the first predetermined threshold and where each reply of the plurality of replies in the reply period are compared to the reply model stored in the memory.

13. An utterance emotional state detection method, comprising:
acquiring user voice stream data of a specified user;
extracting high frequency elements from the user voice stream data by frequency-analyzing;
calculating a fluctuation degree of the extracted high frequency elements for every unit of time;
calculating a statistic for every certain interval in the user voice stream data based on a plurality of fluctuation degrees in the every certain interval, the statistic being a representative value obtained from the fluctuation degrees in the every certain interval;
determining that an utterance in the user voice stream data is a reply when a time length of the utterance is smaller than a first predetermined threshold; and
determining an utterance emotional state of the specified user based on the statistic and the reply obtained from the user voice stream data of the specified user, wherein
the determining of the utterance emotional state includes determining the utterance emotional state of the specified user in a reply period, wherein the reply period is determined from a plurality of replies that continuously appear in the user voice stream data, wherein each reply in the plurality of replies being smaller than the first predetermined threshold and where each reply of the plurality of replies in the reply period are compared to the reply model stored in the memory.

14. The utterance emotional state detection device according to claim 1, wherein the detecting includes determining an ordinary degree of the reply period using at least one of the number of the replies in the reply period, a length of the reply period in an overall length of the user voice stream data, a length between the replies in the reply period, and a total length of the reply period.

15. The utterance emotional state detection device according to claim 1, wherein the process further comprises:
obtaining a call duration of a call made by the user; and
computing an utterance rate of the user based on a summation of interval lengths of voice intervals in the call and a summation of syllable series in the call, wherein the detecting includes determining an ordinary degree of the reply period using at least one of a ratio of the summation of interval lengths of voice intervals to the call duration, a ratio of a summation of interval lengths of the reply period to the call duration, and the utterance rate.

16. The utterance emotional state detection device according to claim 1, wherein the process further comprises:
  obtaining a call duration of a call made by the user; and
  computing an utterance rate of the user based on a summation of interval lengths of voice intervals in the call and a summation of syllable series in the call; and
  comprehensively determining the utterance state by using a result of the utterance state detected at the detecting and the utterance rate.

17. The utterance emotional state detection device according to claim 1, wherein the detecting includes extracting a specific statistic larger than a second predetermined threshold from a plurality of statistics calculated for the user voice stream data and detecting the utterance state by determining whether a ratio of the number of the specific statistics to the number of all statistics calculated for the user voice stream data is larger than a third predetermined threshold.

\* \* \* \* \*